US012011692B2

(12) United States Patent
Blomquist et al.

(10) Patent No.: US 12,011,692 B2
(45) Date of Patent: Jun. 18, 2024

(54) SEPARATION DEVICE

(71) Applicant: SPF Technologies LLC, Somerville, MA (US)

(72) Inventors: Erik O. Blomquist, Jamaica Plain, MA (US); Gaston De Los Reyes, Somerville, MA (US); Barry Gaiman, Belmont, MA (US)

(73) Assignee: SPF TECHNOLOGIES LLC, Somerville, MA (US)

( * ) Notice: Subject to any disclaimer, the term of this patent is extended or adjusted under 35 U.S.C. 154(b) by 0 days.

(21) Appl. No.: 17/861,290

(22) Filed: Jul. 11, 2022

(65) Prior Publication Data

US 2023/0029258 A1 Jan. 26, 2023

Related U.S. Application Data

(60) Provisional application No. 63/223,505, filed on Jul. 19, 2021.

(51) Int. Cl.
*B01D 63/08* (2006.01)
*B01D 61/14* (2006.01)

(52) U.S. Cl.
CPC ......... *B01D 63/082* (2013.01); *B01D 61/145* (2013.01); *B01D 63/088* (2013.01);
(Continued)

(58) Field of Classification Search
CPC .. B01D 63/082; B01D 61/145; B01D 63/088; B01D 2311/08; B01D 2313/16;
(Continued)

(56) References Cited

U.S. PATENT DOCUMENTS 4,411,792 A * 10/1983 Babb ................... A61M 1/3603
210/411
5,603,900 A * 2/1997 Clark ................... B29C 66/727
422/550
(Continued)

FOREIGN PATENT DOCUMENTS

JP H0576733 * 3/1993

OTHER PUBLICATIONS

English language machine translation of JPH0576733, 4 pages, No Date.*

*Primary Examiner* — Pranav N Patel
(74) *Attorney, Agent, or Firm* — Barry Gaiman

(57) ABSTRACT

Methods and devices are disclosed for a separation device. A separation device includes a separation module having a separation membrane separating an interior of the separation module into a retentate compartment and a permeate compartment. The retentate compartment includes at least one retentate channel, a feed port fluidly coupled to the at least one retentate channel and a retentate port. The permeate compartment includes at least one permeate channel disposed within the permeate compartment and a permeate port fluidly coupled to the at least one permeate channel. a retentate collector fluidly connected to the retentate port. The device further includes a feed reservoir, a permeate reservoir, a fluidic gate located between the feed reservoir and the separation module, a vent located between the retentate channel and the permeate channel end adjacent the retentate port and a pressure differential source applied across the separation module.

19 Claims, 42 Drawing Sheets

(52) U.S. Cl.
CPC ...... *B01D 2311/08* (2013.01); *B01D 2313/16* (2013.01); *B01D 2313/18* (2013.01); *B01D 2313/243* (2013.01)

(58) Field of Classification Search
CPC .......... B01D 2313/18; B01D 2313/243; B01D 2313/04; B01D 2313/54; B01D 63/084; B01D 63/087; B01D 2313/086; B01D 2313/14; B01D 2315/10; B01D 61/18; B01D 2315/16
See application file for complete search history.

(56) References Cited

U.S. PATENT DOCUMENTS

| | | | | |
|---|---|---|---|---|
| 2009/0145831 | A1* | 6/2009 | Manabe | B01D 71/14 |
| | | | | 210/232 |
| 2010/0307967 | A1* | 12/2010 | Clark | B01D 65/003 |
| | | | | 210/291 |
| 2011/0058983 | A1* | 3/2011 | Gadrat | A61M 5/165 |
| | | | | 422/44 |
| 2017/0095774 | A1* | 4/2017 | de los Reyes | B01D 61/147 |

* cited by examiner

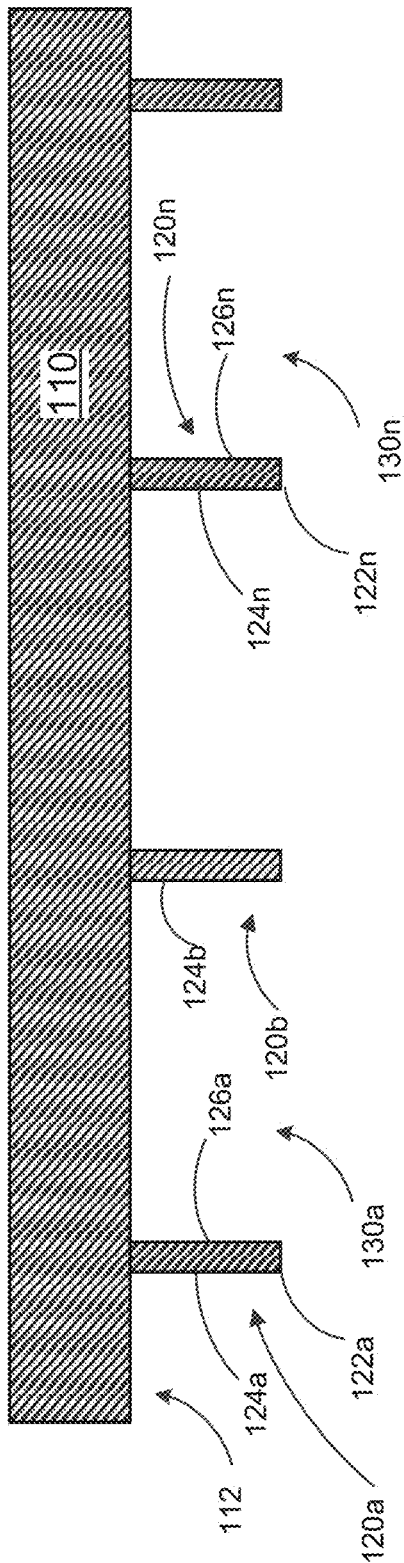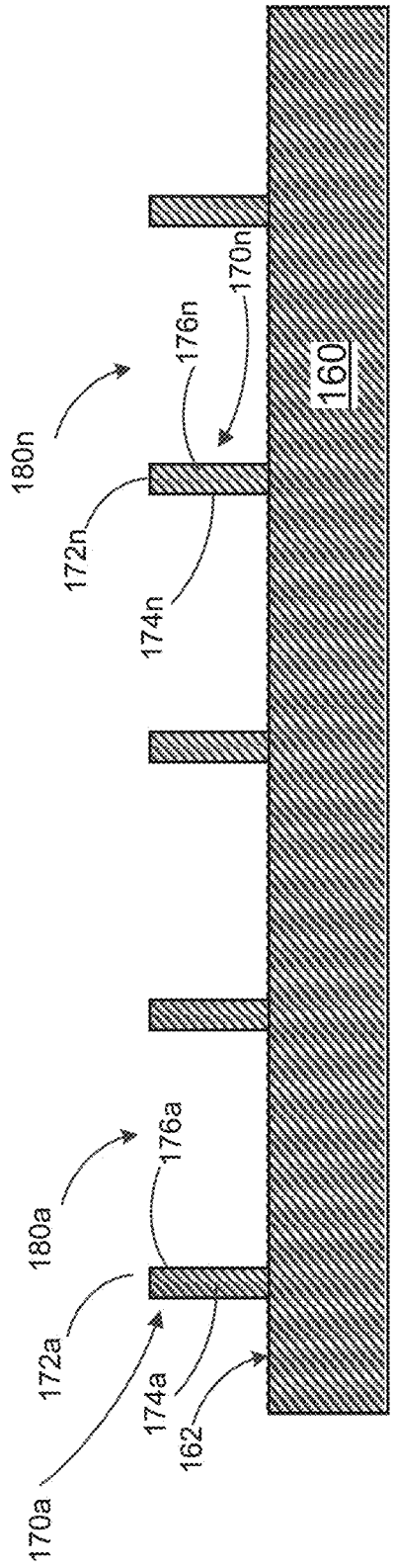

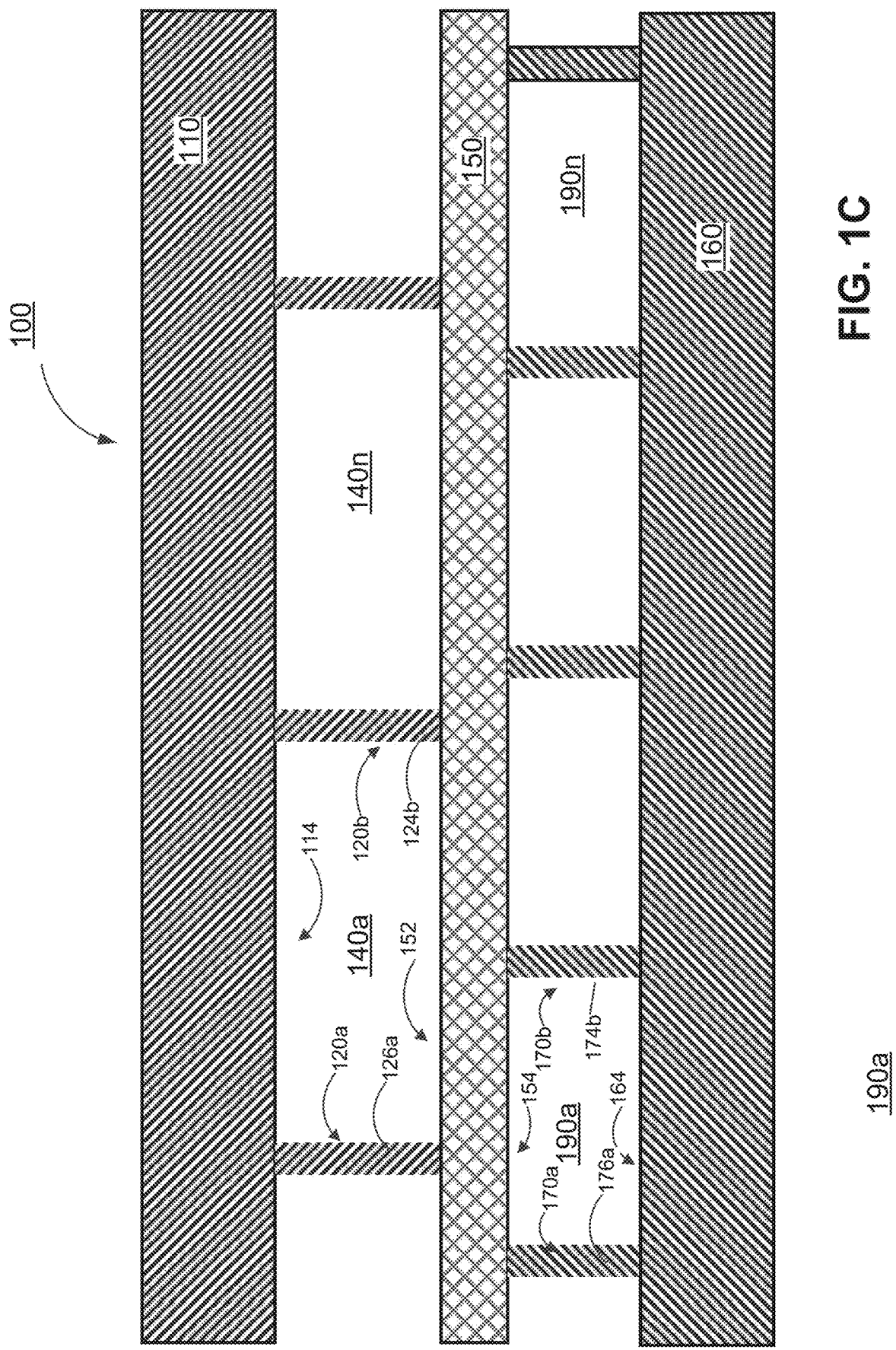

SEPARATION DEVICE

PRIORITY TO EARLIER FILED PROVISIONAL PATENT APPLICATIONS

This application claims the benefit of the filing date of: earlier filed United States Provisional Patent Application having Ser. No. 63/223,505 entitled "SEPARATION DEVICE", filed Jul. 19, 2021. The entire teachings and contents of this Patent Application are hereby incorporated by reference herein in their entirety.

FIELD OF THE INVENTION

The present invention relates to filter devices intended for the separation and purification of components from biological material and other fluids.

BACKGROUND OF THE INVENTION

The filtration world is vast in scale, economics and the myriad of characteristics that define a market. Within this filtration world, however, there is a class of applications that require fine control of the physical conditions in the neighborhood of the filtration medium. Such applications are generally referred to as high-performance applications or high-performance filtration processes. Furthermore, high-performance filtration processes utilize specialized filtration media called membrane filters. A membrane filter, also referred to as a membrane, is characterized by having very fine pores, typically smaller than a few microns, and by having a narrow pore size distribution. The rejection property of a membrane filter is further characterized by its pore size (e.g., a 1 μm membrane; a 0.2 μm membrane; etc.). When the pore sizes are much smaller than 0.1 μm membranes filters retain macromolecules and are, therefore, characterized by their Molecular-Weight-Cut-Off ("MWCO"), typically, the molecular weight of the protein that exhibits a rejection of 90%. And so, those skilled in the art would refer to a membrane that rejects proteins with a molecular weight greater than 100,000 Daltons as a "100K MWCO membrane," or simple as a "100K membrane." Membrane filters come in several forms: flat sheet membranes, tubular membranes, hollow fiber membranes and monolithic membranes. Finally, the need to control the physical conditions of the neighborhood of the membrane further demands that the flow passages containing the filtration medium, referred to as flow channels are relatively thin, typically smaller than 1 mm.

There are many applications that require high-performance separation devices. Tangential-flow filtration (TFF), in general, defines many of these applications: in manufacturing, research laboratories and clinical laboratories, including for blood fractionation, purification of biomolecules made by recombinant technology, concentration and diafiltration of cells and other biological tissues All of these high-performance filtration applications benefit from one or more of the following: thin and uniform flow channels in at least the retentate compartment; staging to control pressures, flow velocities and/or possibly the MWCO of the membrane in at least the retentate compartment; control of trans-membrane pressure, which may further require control of the cross-sectional area of retentate channels and possibly the permeate channels; control of pressures and velocities in the diafiltrate compartment; a large specific membrane area. Some of these applications are operated as continuous processes, whereby the feed stream is fed continuously to the separation device with the retentate stream withdrawn continuously from the separation device. Others are operated in batch or discontinuous mode, whereby a feed/fluid sample of a certain volume is fed to the separation device, with the retentate fraction accumulated within the flow channels, followed by recovery of the retentate fraction from the separation device. In some applications the stream of interest is the retentate stream; in other applications it is the permeate stream. Furthermore, some applications require diafiltration, a process requiring an additional feed stream to wash the retentate, or an additional permeation step in the case of batch processes. All of these applications may require high-performance filtration.

Regardless of the specific application, the fraction of interest, the number of compartments, the MWCO or pore size of the membrane, the need for diafiltration, etc., high-performance separation devices use a microfluidic array of flow channels in at least the retentate compartment and possibly in the permeate and diafiltration compartments. Integrating flat-sheet membranes, hereafter referred to as planar membranes, into a high-performance separation device requires the formation of controlled flow passages into plates or sheets having grooves embedded in them that create the flow passage when the membrane filter is pressed into tight contact against the ribs that define the groove. In other words, the walls of the flow passage are partly formed by the groove, with the rest of the wall being formed by the planar membrane. Alternatively, high-performance separation devices can be made with hollow fiber membranes wherein the rejective membrane is in the inside of the hollow fiber (i.e., within the lumen). In this case the permeate compartment is formed by the interstitial space, the space not occupied by the hollow fibers. Separation modules made with hollow fiber membranes can also include a diafiltration compartment comprised of a different set of hollow fibers.

Conventional concentration at the laboratory scale for volumes from 20 ml to 1 L is not currently fast or easy. When a volume of 100 ml needs to be concentrated it either needs to be split among several centrifugal devices or concentrated in a complicated scaled-down TFF process system. A centrifugal system requires that the sample be split among many aliquots. Typical spin times are long in addition to the time handling the splitting and recombining aliquots. There is limited control over the recovery volumes and concentrations. The scaled down TFF process systems, such as miniature TFF systems, are complicated to configure. They require expensive hardware including pumps and valves. There is also an upper limit on the final concentration dictated by the system volume.

Centrifugal lab ultrafiltration has the following drawbacks: requires multiple 15 mL devices; filtration rates are slow; concentrate recovery is slow and cumbersome (e.g., needs to be pooled from multiple devices); and a large centrifuge is required. Conventional Mini-TFF Systems are complicated in terms of setup and training; have hardware intensive requiring pumps, valves, gauges, reservoirs and tubing and generally have an upper limit on concentration factor (e.g., 20×).

BRIEF SUMMARY OF THE INVENTION

Embodiments of the present invention, including the VacuCon® concentrator offer simple and fast ultrafiltration concentration of sample volumes greater than 50 ml. Devices with 60 cm² of membrane area can quickly concentrate 50-100 mL to very high concentration factors, as high as 100-fold. All that is needed to operate the VacuCon concentrator is a vacuum or pressure source. Walk-away operation is possible so that once connected, the user can walk away from the concentrator. In some embodiments the device self-primes and terminates permeation automatically without operator intervention. When finished the vacuum/pressure source is disconnected and the retentate fraction is recovered, in some embodiments, with a syringe.

Buffer exchange or washing is possible in a (optional) subsequent operation with the VacuCon system. Examples of applications using a VacuCon include:
  BSA concentration—concentrate from 1 mg/mL to 100 mg/mL;
  Extracellular proteins, enzymes—concentrate 0.1 mg/mL to 10 mg/mL;
  IgG—concentrate up to 10 mg/mL;
  Monoclonal antibody in formulation buffer—concentration from 10-60 mg/mL to 200~250 mg/mL;
  Glycerol removal from antibodies (replacing overnight dialysis); and
  DNA and RNA in gene therapy and vaccine formulation development.

In one embodiment a separation device includes a separation module including: a separation membrane separating an interior of the separation module into a retentate compartment and a permeate compartment. The retentate compartment includes: at least one retentate channel disposed within the retentate compartment, a feed port fluidly coupled to the at least one retentate channel and disposed adjacent a first position of the retentate compartment and a retentate port fluidly coupled to the at least one retentate channel and disposed adjacent a second position of the retentate compartment. The permeate compartment includes: at least one permeate channel disposed within the permeate compartment, a permeate port fluidly coupled to the at least one permeate channel. The separation device further includes a retentate collector fluidly connected to the retentate port, a feed reservoir fluidly coupled to the feed port, a permeate reservoir fluidly coupled to the permeate port, a fluidic gate disposed between the feed reservoir and the separation module, a vent disposed between the retentate port and the permeate port and a pressure differential source applied across the separation module.

Such a device having a membrane of approximately 60 cm$^2$ one can concentrate 100 mL to 1 mL in less than one hour, effect buffer exchange possible in situ, and run the process without operator intervention except adding the feed sample (also referred to as a fluid sample), connecting the pressure differential source and collecting the retentate fraction.

In a further embodiment, the vent is a phobic vent and is disposed in one of: the separation module between the retentate compartment and the permeate compartment, and outside the separation module coupled between the retentate port and the permeate port, and wherein the fluidic gate is a hydrophilic gate and is disposed in one of: at a bottom of the feed reservoir; and outside the feed reservoir disposed between feed reservoir and the feed port; wherein the retentate collector is a syringe; and wherein the pressure differential source is one of a vacuum source coupled to the permeate reservoir and a pressure source coupled to the feed reservoir.

Embodiments disclosed herein are separation devices utilizing planar membranes fabricated without having to bond the planar membrane to the ribs defining the microfluidic array of channels. These separation devices are fabricated to reliably maintain the dimensions of the channel formed by the grooves on the planar sheet and the planar membrane and prevent substantial cross-leakage between the channels particularly when the channels are very thin. These separation devices are manufactured using low-cost fabrication methods.

In a further embodiment, the flooded phobic vent is integrated into the separation membrane. In a further embodiment, the retentate collector includes: a retentate vial; a flooded phobic vent disposed between the retentate vial and the permeate port and one of: a retentate valve disposed between the retentate port and the retentate vial, and a vacuum modulating valve disposed between the retentate vial and the vacuum source. In a further embodiment, the retentate valve is an adjustable valve.

In a further embodiment, the separation device further includes: a second feed reservoir fluidly connected to the retentate port and a retentate valve disposed between the retentate port and the second feed reservoir.

In a further embodiment, the separation device further includes first and second 3-way valves where the first 3-way valve is fluidly connected to the feed reservoir, to the feed port and to the second 3-way valve, and the second 3-way valve is fluidly connected to the retentate collector, to the retentate port and to the first 3-way valve.

In a further embodiment, the retentate collector includes a retentate vial and a retentate pump disposed between the retentate port and the retentate vial. In a further embodiment the retentate compartment further includes a grooved plate disposed adjacent the separation membrane. In a further embodiment, the separation module accepts at least one of a replaceable separation membrane and a replaceable philic gate. In a further embodiment the vent is a replaceable phobic vent coupled to the replaceable separation membrane.

An exemplary technique for processing a fluid sample includes: providing a separation device having: a separation module including a feed reservoir and a permeate reservoir; supplying a fluid sample to the feed reservoir; attaching a vacuum source to the permeate reservoir; inducing permeation and fluid flow in at least one retentate channel in the separation module and consuming the fluid sample and concentrating a retained species within a retentate compartment of the separation module; venting air from the retentate channel; closing the gate between the feed reservoir and retentate chamber by consuming the feed sample; and where the concentration is an unattended operation. Such a technique provides an easy-to-fabricate high-performance separation device. Since the device is vacuum-driven, a vacuum permeates the fluid compartments of the separation device, which results in the atmospheric pressure compressing the membrane stack and ensuring tight contact between the ribs in the first sheet and the planar membrane.

A further technique includes disconnecting the vacuum source when the fluid sample has been consumed and recovering a retentate fraction with a retentate collector. A further technique includes supplying diafiltration/wash buffer into the feed reservoir, inducing permeation and fluid flow in the at least one retentate channel in the separation module,
  consuming the wash buffer and washing in-situ the retentate fraction within a retentate compartment of the separation module, disconnecting the vacuum source when the diafiltration/wash buffer has been consumed and recovering the washed retentate fraction with a retentate collector.

In another embodiment a separation device includes a separation element having at least one membrane stack, the membrane stack includes: a first planar sheet having a first inner surface and a first plurality of grooves embedded in said first inner surface forming a first plurality of ribs each rib having a pair of sidewalls and an end; a second planar sheet having a second inner surface and a second plurality of grooves embedded in said second inner surface forming a second plurality of ribs with the second inner surface, each rib having a pair of sidewalls and an end; a planar membrane disposed between the first and second inner surfaces and having a first surface, a second surface and a sidewall; at least one retentate channel formed by a portion of the first inner surface, sidewalls of two different ones of the first plurality of ribs and a portion of the planar membrane disposed between the first plurality of ribs, at least one permeate channel formed by a portion of the second inner surface, sidewalls of two different ones of the second plurality of ribs and a portion of the planar membrane disposed between the second plurality of ribs. The embodiment further includes: a first peripheral seal disposed between the first planar sheet and the second planar sheet and surrounding the planar membrane by enclosing a planar membrane sidewall; a second peripheral seal disposed between the planar membrane and at least one of the first inner surface and the second inner surface; a feed inlet passageway coupled to a first end of the retentate channel; and at least one permeate outlet passageway coupled to the permeate channel.

Such a separation device has numerous practical advantages for processing fluids, including, but not limited to, the following: inexpensive to fabricate, requiring only three main pieces that are easy to manufacture and assemble; facilitates the permeation of a large fraction of sample fluid; and reduces losses of the permeated fraction to pores of the membrane and in permeate channels.

In a further embodiment, the separation device further includes: at least one permeate port in fluid communication with the at least one permeate outlet passageway, a feed port in fluid communication with the feed inlet passageway and a retentate port in fluid communication with a retentate outlet passageway. In a further embodiment, the feed port and the retentate port are disposed in the first planar sheet; and the at least one permeate port is disposed in the second planar sheet. In a further embodiment, the separation device further includes a vacuum source and the first planar sheet and the second planar sheet are relatively thin and pliable to allow intimate contact of the planar membrane to the first and second planar sheets by hydrostatic forces induced by the vacuum source. In a further embodiment, the first planar sheet, the second planar sheet and planar membrane are laminated together, a lamination forming the first and second peripheral seals. In a further embodiment, the membrane stack further includes a staged array of retentate channels thereby serializing retentate flow through the separation element.

Advantageously, such separation devices and techniques, for example, are able to yield very high concentration factors, as high as 50- or 100-fold depending on the concentration of the retained solute in the feed sample with the convenience of a vacuum source and without the need of centrifuges. Furthermore, such separation devices can be manufactured at a low cost making it possible to be used once and discarded. Alternatively, the separation device can be manufactured with replaceable membrane and associated vents and gates. Moreover, separation can be operated in a single pass mode without the complexity of ancillary equipment such as centrifuges or pumps and/or tanks and/or recirculation loops.

BRIEF DESCRIPTION OF THE SEVERAL VIEWS OF THE DRAWINGS

The foregoing and other aspects, embodiments, objects, features and advantages of the present teachings can be more fully understood from the following description in conjunction with the accompanying drawings. In the drawings, like reference characters generally refer to like features and structural elements throughout the various figures. The drawings are not necessarily to scale, emphasis instead being placed upon illustrating the principles of the present teachings. The following drawings are illustrative of embodiments of the invention and are not meant to limit the scope of the invention as encompassed by the claims.

FIG. 1A is a schematic cross section of an exemplary first planar sheet, according to one embodiment of the invention disclosed herein;

FIG. 1B is a schematic cross section of an exemplary second planar sheet, according to one embodiment of the invention disclosed herein;

FIG. 1C is a schematic cross section of exemplary membrane stack incorporating the planar sheets of FIGS. 1A and 1B and a planar membrane sandwiched between the two planar sheets;

DETAILED DESCRIPTION OF THE INVENTION

Figure 2A:
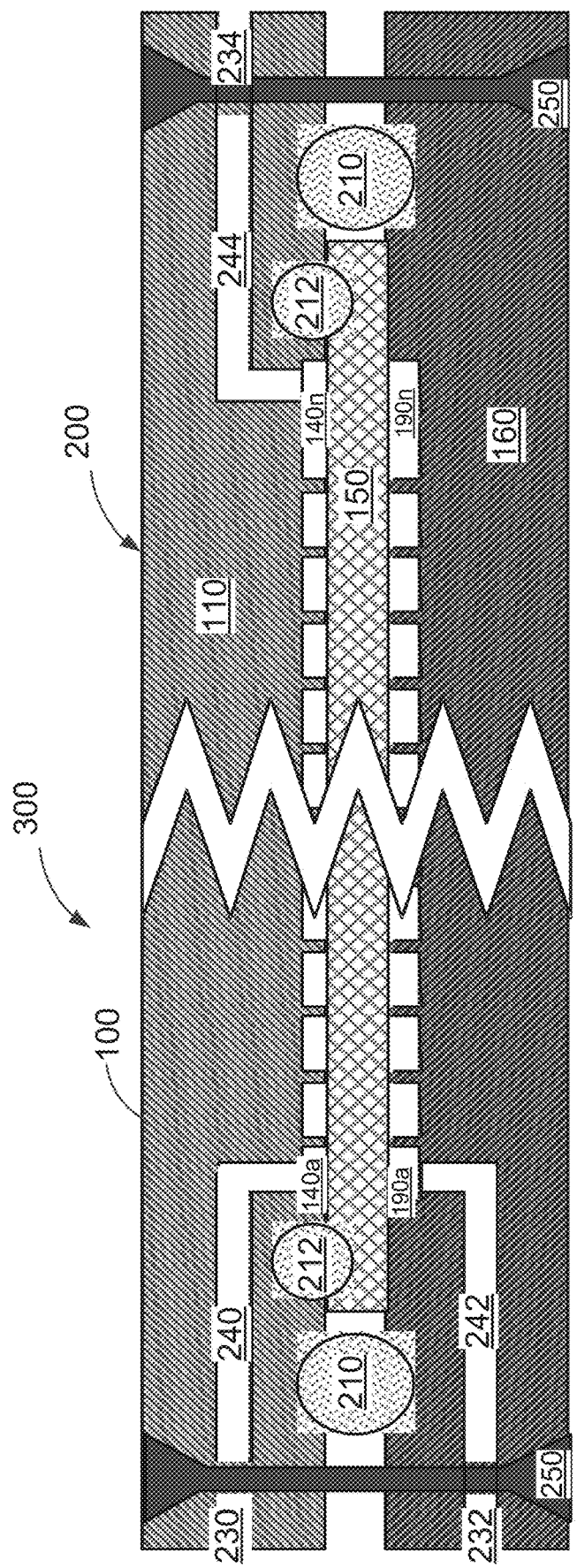
FIG. 2A is a schematic cross section of an exemplary separation device incorporating an exemplary separation module including the membrane stack of FIG. 1C.

The separation modules and separation devices of embodiments disclosed herein are directed to both planar membranes and hollow fiber membranes. For embodiments based on planar membranes, these are sandwiched by planar sheets suitable for high-performance filtration requiring thin channels (referred to as membrane stacks). The channels are formed by grooves embedded on the inner surface of the planar sheets abutting the planar membrane in tight contact with the ribs on the sidewalls of the grooves. Such channels are characterized by having membrane on only one portion of the channel, and therefore, by a depth dimension given by the depth of the groove relative to the end of the ribs defining the groove. In certain embodiments, thin channels are channels having a depth dimension of less than one millimeter, more typically less than 0.5 millimeter, and possibly smaller than 0.1 millimeter.

FIGS. 1A-1C show side cross-section views, perpendicular to the flow directions, of components of an exemplary membrane stack 100. The membrane stack 100 includes a first planar sheet 110 (FIG. 1A) having a first inner surface 112 and a first plurality of grooves 130a-130n embedded in the first inner surface 112 forming a first plurality of ribs 120a-120n (collectively referred to as rib(s) 120) or collectively a grooved plate. Each rib 120a-120n includes a pair of sidewalls 124a and 126a-124n and 126n, ends 122a-122n, respectively. A second planar sheet 160 (FIG. 1B) includes a second inner surface 162. The second planar sheet 160 further includes a second plurality of grooves 180a-180n embedded in the second inner surface 162 forming a second plurality of ribs 170a-170n (collectively referred to as rib(s) 170). Each rib 170a-170n includes a pair of sidewalls 174a and 176a, 174n and 176n and ends 172a-172n, respectively.

Now referring to FIG. 1C, the membrane stack 100 further includes a planar membrane 150 disposed between the first and second inner surfaces 112 and 162. The membrane stack 100 includes retentate channel segments 140a-140n (also referred to as retentate channels and collectively referred to as at least one retentate channel 140), which are fluidly combined as described below. The retentate channel 140 is formed by a portion of the first inner surface 114, sidewalls 126a and 124b of two different ones of the first plurality of ribs 120a and 120b and a portion of the planar membrane 152 disposed between two different ones of the first plurality of ribs 120a and 120b. The ends of the ribs 122a-122n sealingly contact the planar membrane 150.

The membrane stack 100 further includes permeate channel segments 190a-190n (also referred to as permeate channels and collectively referred to as at least one permeate channel 190) which are fluidly combined as described below. The permeate channel 190 is formed by a portion of the first inner surface 164, sidewalls 176a and 174b of two different ones of the first plurality of ribs 170a and 170b and a portion of the planar membrane 154 disposed between two different ones of the first plurality of ribs 170a and 170b. The ends of the ribs 172a-172n sealingly contact the planar membrane 150. In other words, the retentate compartment further includes a grooved plate disposed adjacent the separation membrane.

In one embodiment, the ends of the plurality of ribs are coplanar with the planar membrane 150 in order to maintain fluid integrity of the retentate channel 140 and the permeate channel 190.

Now referring to FIG. 2, the membrane stack 100 further includes a first peripheral seal 210 disposed between the first planar sheet 110 and the second planar sheet 160 having a planar membrane sidewall surrounding the planar membrane 150 and a second peripheral seal 212 disposed between the first planar sheet 110 and the planar membrane 150.

An exemplary separation module 200 includes the membrane stack 100 and further includes a feed inlet passageway 240 at a first end of the retentate channel 140 and a retentate outlet passageway 244 at a second end of the retentate channel 140 and an at least one permeate outlet passageway 242 at a first end of the permeate channel 190.

An exemplary separation device 300 includes the separation module 200 and additionally includes a feed port 230 disposed in the first planar sheet 110 in fluid communication with the feed inlet passageway 240 of the at least one retentate channel 140, a retentate port 234 disposed in the first planar sheet in fluid communication with the retentate outlet passageway 244 of the retentate channel 140 and a permeate port 232 disposed in the second planar sheet in fluid communication with the permeate outlet passageway 242 of the at least one permeate channel 190.

Figure 2B:
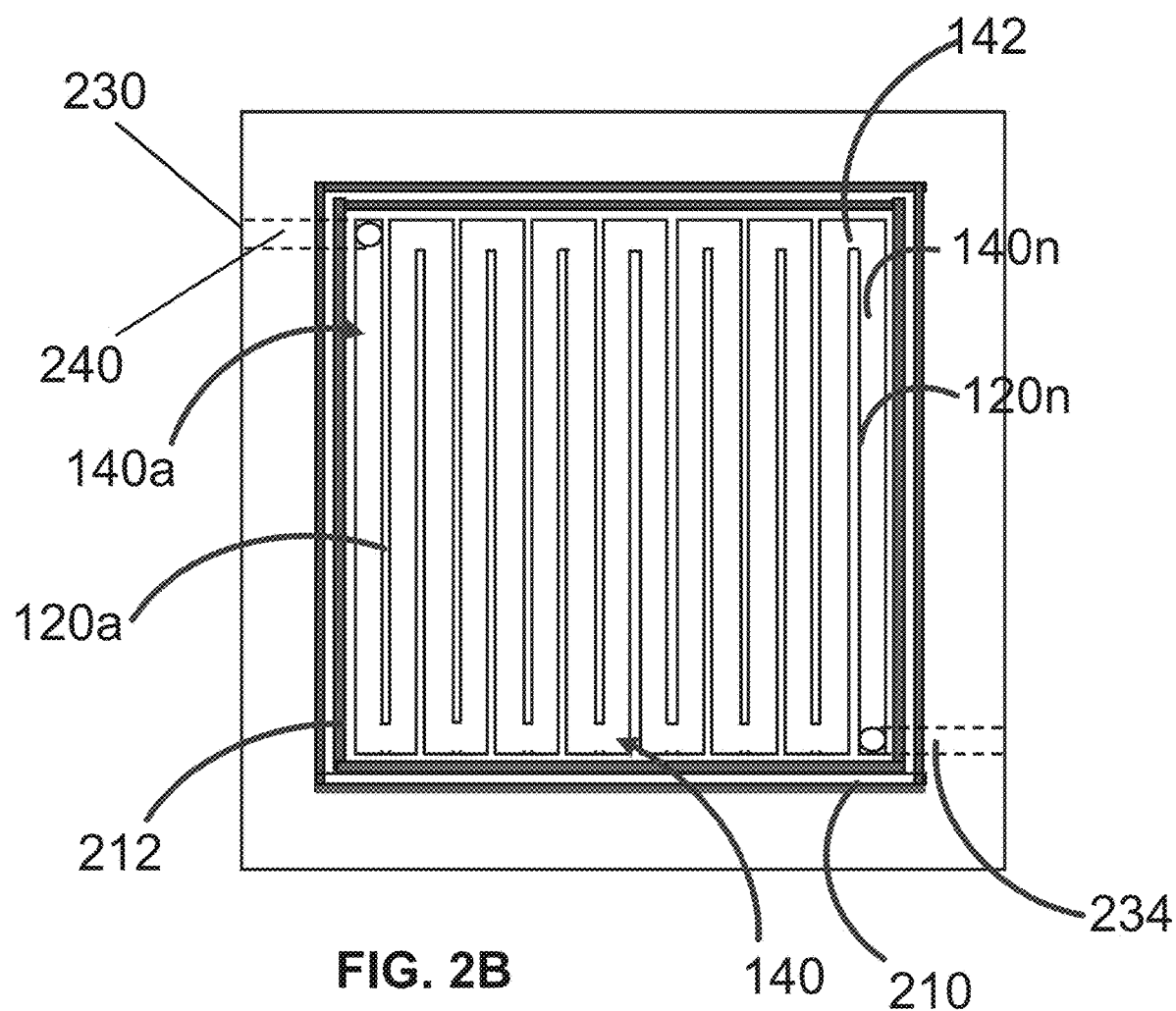
FIG. 2B is a top plan view of the separation device of FIG. 2A.

Now referring to FIG. 2B, a plan view illustrates how channel segments 140a-140n are combined in one embodiment of the membrane stack 100 to form a retentate channel 140. The ribs 120 alternate with a connection in the first inner surface 112 of the first planar sheet. In this configuration adjacent channel segments, for example segments 140a-140b, are coupled at position 142. In this manner a longer channel is provided in a space that has a relatively small dimension. Also shown is second peripheral seal 212 contained within first peripheral seal 210.

Figure 3:
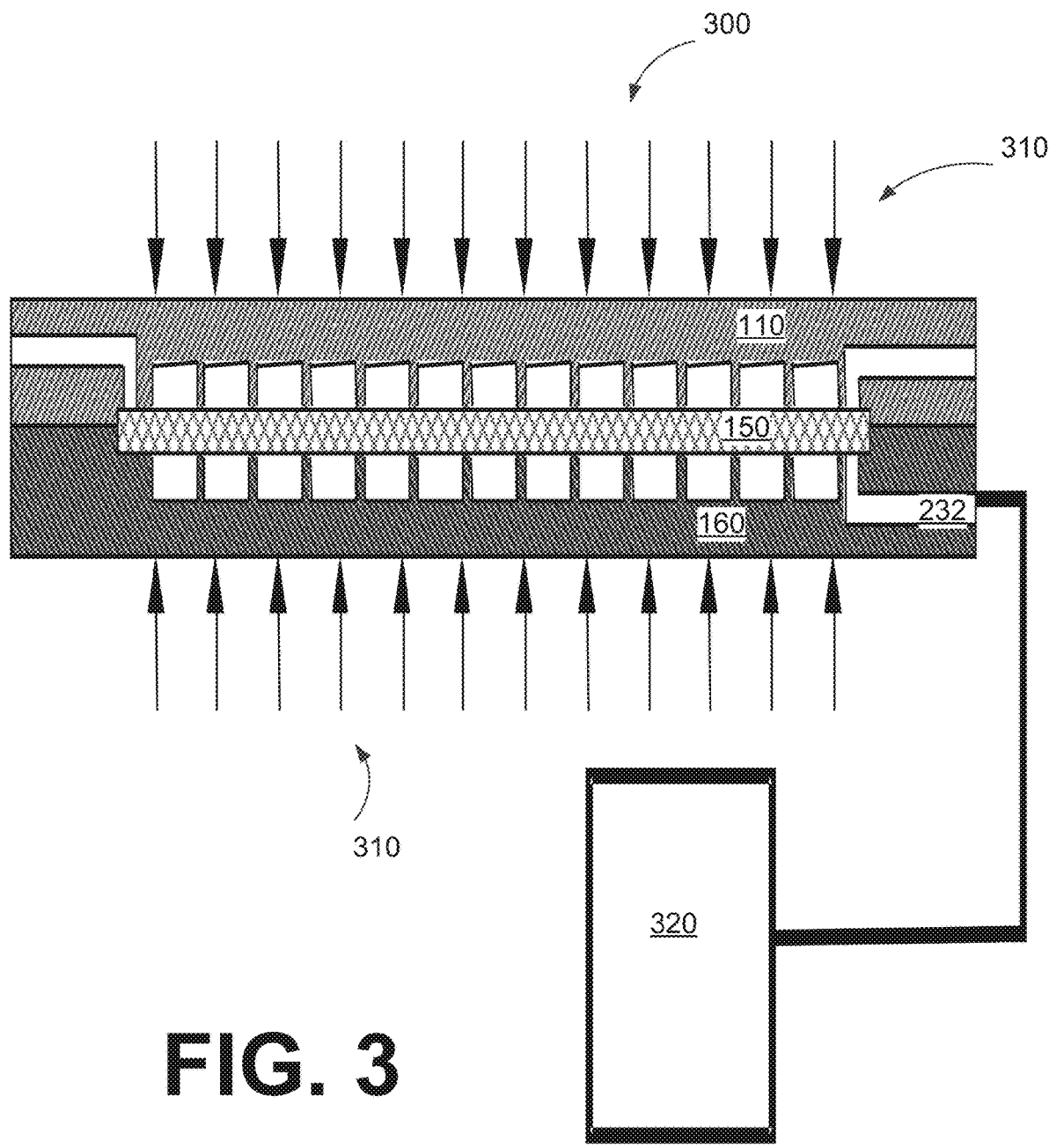
FIG. 3 is a schematic cross section view of the separation device of FIG. 2A including a vacuum source and illustrating forces imposed on the membrane stack by the application of the vacuum source.

Now referring to FIG. 3, in one embodiment the separation device further includes a vacuum source 320 coupled to the permeate port 232. The arrows 310 represent the force exerted by the differential pressure between the atmospheric pressure surrounding the membrane stack 300 and the vacuum induced within the retentate and permeates compartments as a result of vacuum source 320. The compressive force 310 ensures an effective sealing of the ribs 120 and 170 against the planar membrane 150 to form a well-defined channel with dimensions given by the grooves embedded in the planar sheets.

In one embodiment the first planar sheet 110 and the second planar sheet are made from molded plastic. In this embodiment, tie rods 250 hold the membrane stacks 100 together. In another embodiment the first planar sheet 110 and the second planar sheet are formed using a lamination and die cut process where the grooves 130 and 180 are embossed onto rolls of plastic with the planar membrane in roll form sandwiched in the middle, and the layered structure is then assembled by heat, pressure, welding, or adhesives.

In operation a fluid sample is supplied to the separation device at substantially atmospheric pressure, the vacuum source 320 is coupled to permeate port and a vacuum is applied to the permeate channel. The vacuum in the permeate compartment induces a vacuum in the retentate compartment that creates a compressive force 310 that further enhances the sealing of the first planar sheet 110 to a second planar sheet 160 with a first peripheral seal 210. The planar membrane 150 is disposed between the first planar sheet 110 and the second planar sheet 160. The compressive force 310 also enhances the sealing of the planar membrane 150 to the first planar sheet 110 with a second peripheral seal 212. It is noted that the first peripheral seal 210 and second peripheral seal 212 need to be effective even without the vacuum, otherwise it is not possible to create an initial vacuum within the membrane stack. The vacuum induces fluid-tight contact between the planar membrane 150 and the first plurality of ribs 120 by further sealing the sheets and membranes together and the vacuum also induces permeation and fluid flow in the retentate channel 140. It is understood that there can be multiple retentate channels and permeate channels as well as multiple arrangements sizes and configurations: e.g., the channels can be long or short; thin, thinner or very thin; straight or with a convoluted path (e.g., zigzagging back and forth); the permeate channel may be oriented in the same direction, perpendicularly or at any angle relatively to the retentate channel. Channels may also be arranged in a staged configuration each channel having the same cross-sectional dimensions, or the channels may have a changing cross-sectional dimension along the flow path. In summary, the important aspect of the invention is that channels are formed by the planar sheets abutting the membrane and tight contact induced by the compressive forces 310 operating on each membrane stack.

The connection of a vacuum source to the permeate compartment induces a cascade of multiple effects as follows: (a) permeation, further inducing (b) flow of feed solution into the retentate compartment, said feed solution being substantially at atmospheric pressure, further inducing (c) a vacuum in the retentate compartment by virtue of the flow of fluid in the retentate channels, further inducing (d) a compressive force due to the differential pressure between the outside surfaces and the inside surfaces of the membrane stack, further inducing (e) fluid-tight contact between the planar membrane and the first plurality of ribs.

Figure 4:
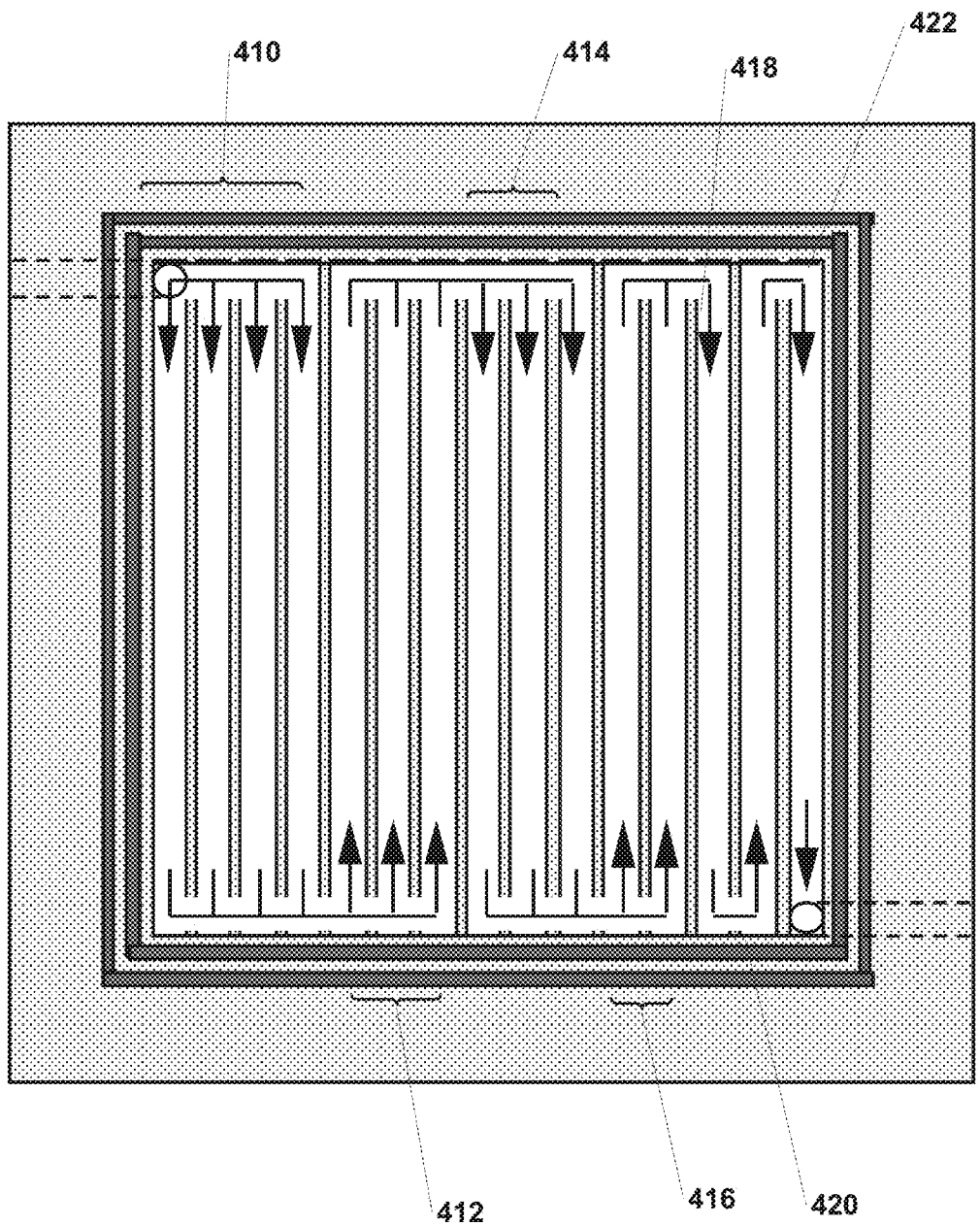
FIG. 4 is a plan view of the first sheet of an exemplary membrane stack having a staged configuration in the retentate compartment.

Now referring to FIG. 4, in one embodiment, a membrane stack includes a plurality of stages 410, 412, 414, 416, 418, 420 and 422 forming a retentate channel. Each stage has one or more retentate channel segments 140. For example, stage 410 (first stage) has four segments and stage 414 (second stage) has 3 segments. In some applications the retentate staging improves the performance of the separation process, including a flux enhancement and reduced concentration polarization. The staged retentate channel effectively serializes the retentate flow through the membrane stack. This embodiment shown has an effective channel length of seven channel segments in series in a 4|3|3|2|1|1|1 configuration. It is understood that the number of segments in each stage can differ, and the channels in each segment can be identical to those in the segments or can each segment can have different channel properties such as width, depth, shape (e.g., rectangular, semi-circular, triangular, etc.) or even membrane MWCO.

Figure 5:
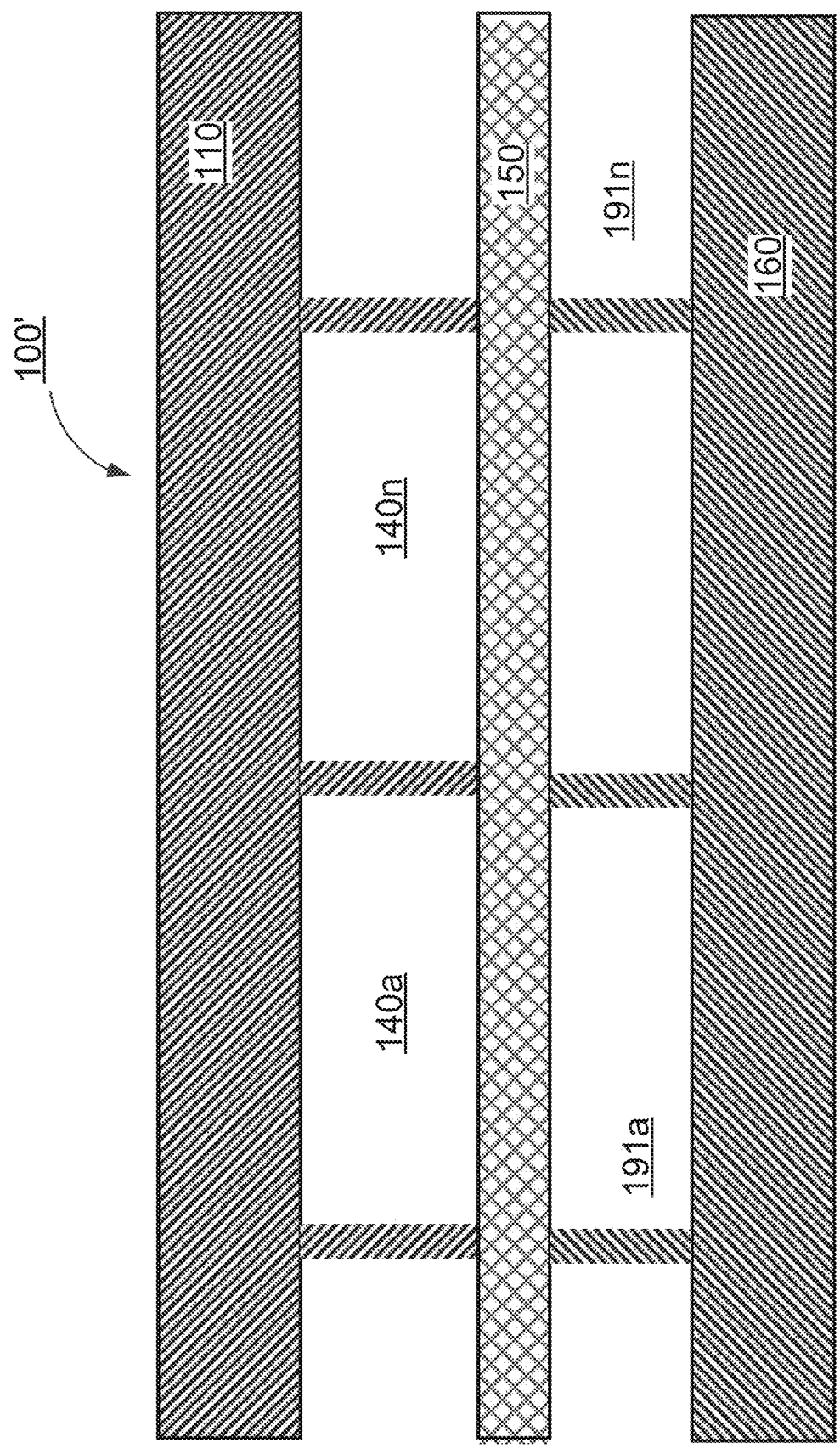
FIG. 5 is a schematic cross section view of an exemplary membrane stack having permeate channels follow the same path of the retentate channels according to one embodiment of the invention disclosed herein.

Now referring to FIG. 5, in one embodiment, a membrane stack 100' includes retentate channel segments 140a-140n which are substantially aligned to corresponding ones of the at least one permeate channel segments 191a-191n and having approximately the same length. Such embodiments are useful in controlling the flow velocities in both the retentate and permeate channels and enable the control of the trans-membrane pressure (hereinafter TMP) during permeation. Such control may be especially important in some applications, e.g., in fractionation of whole blood, to obtain high recovery of the permeate fraction while preventing hemolysis. To illustrate in more detail how such an embodiment works, as permeation proceeds the volume of the feed stream decreases while simultaneously that of the permeate stream increases. In applications where it is important to control the TMP, one would align the retentate and permeate channels and provide for staging in both the retentate and permeate channels to increase the flow velocity of the retentate channel while decreasing it in the permeate channel and in doing so maintain both high velocity in the retentate channel and a constant TMP.

Figure 6:
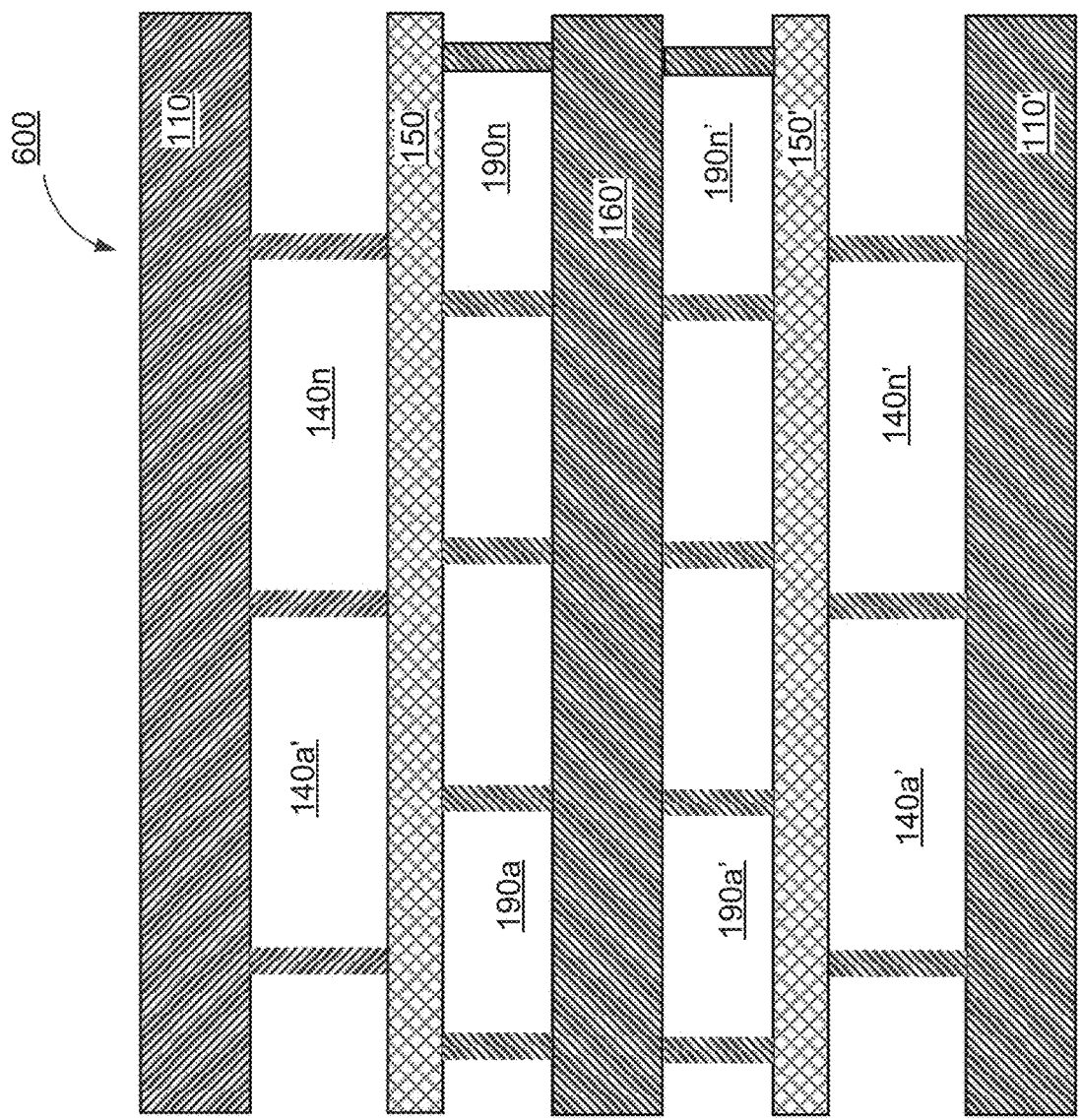
FIG. 6 is a schematic cross section view of an exemplary double-sided membrane stack according to one embodiment of the invention disclosed herein.

Now referring to FIG. 6, a double membrane stack 600 includes a second planar sheet 160' which is a double-sided planar sheet having a second inner surface with an additional plurality of ribs. The membrane stack 600 further includes a second planar membrane 150' disposed in sealing contact with the additional plurality of ribs of the second side, a third planar sheet 110' having a plurality of ribs in sealing contact with the second planar membrane 150'. The second planar membrane 150' is disposed between the second inner surface and the third planar sheet. The membrane stack 600 further includes permeate channel segments 190a-190n (also referred to as permeate channels and collectively referred to as at least one permeate channel 190) and further includes permeate channel segments 190a-190n (also referred to as permeate channels and collectively referred to as at least one permeate channel 190'). A third peripheral seal (not shown) is disposed between the second inner surface of the double-sided planar sheet 160' and the third planar sheet 110'. A fourth peripheral seal (not shown) is disposed between the second planar membrane 150' and either the second surface or the inner surface of the third planar sheet 110'. In operation, this arrangement effectively provides double the membrane area in a package only slightly larger than a membrane stack fabricated from single-sided planar sheets.

Figure 7:
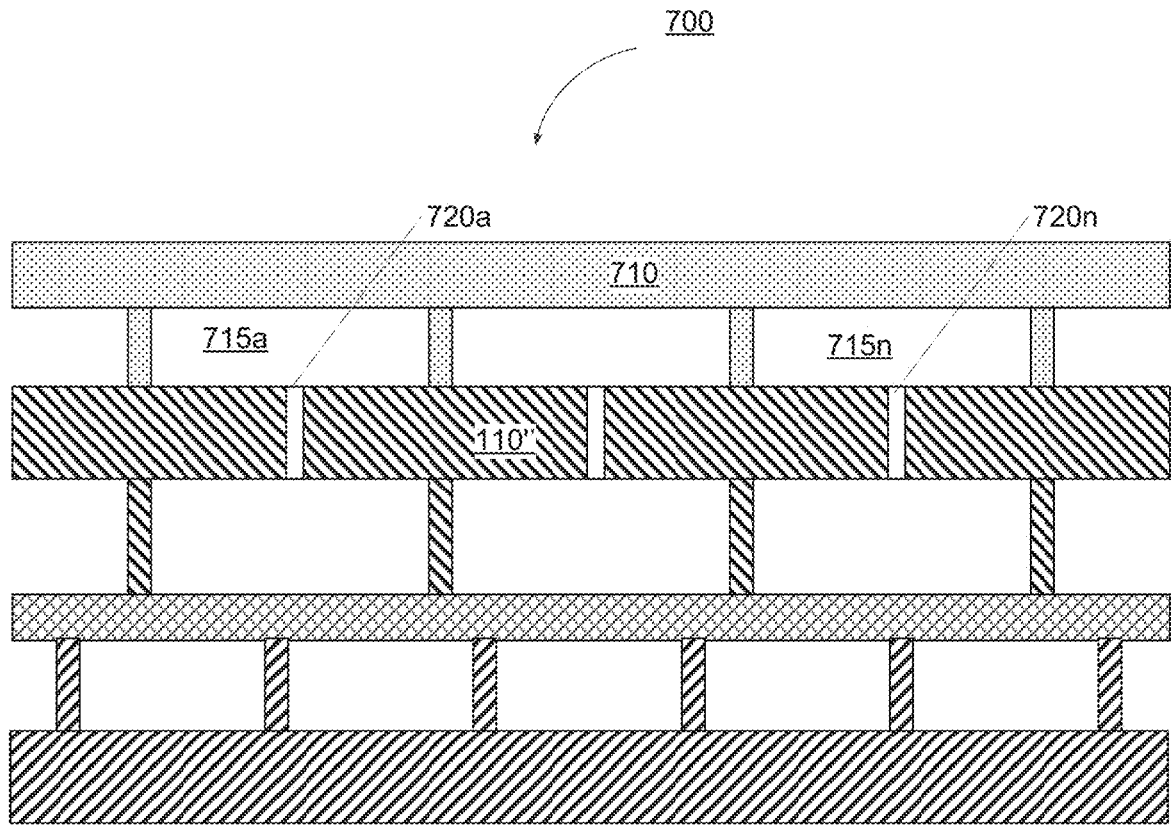
FIG. 7 is a schematic cross section view of an exemplary membrane stack including a diafiltration compartment comprising diafiltration channels in the form of a diafiltration distributor according to embodiments of the invention disclosed herein.

Now referring to FIG. 7, an exemplary membrane stack 700 suitable for diafiltration includes a diafiltration sheet 710 having diafiltration channels 715, a diafiltration seal (not shown for clarity) and diafiltration passageways 720a-720n disposed in a modified first planar sheet 110" creating a diafiltration distributor fluidly coupled to the retentate channel. The diafiltration distributor is fed with diafiltration stream (not shown) through diafiltration manifold similar to those used for the feed and retentate manifolds.

Figure 8:
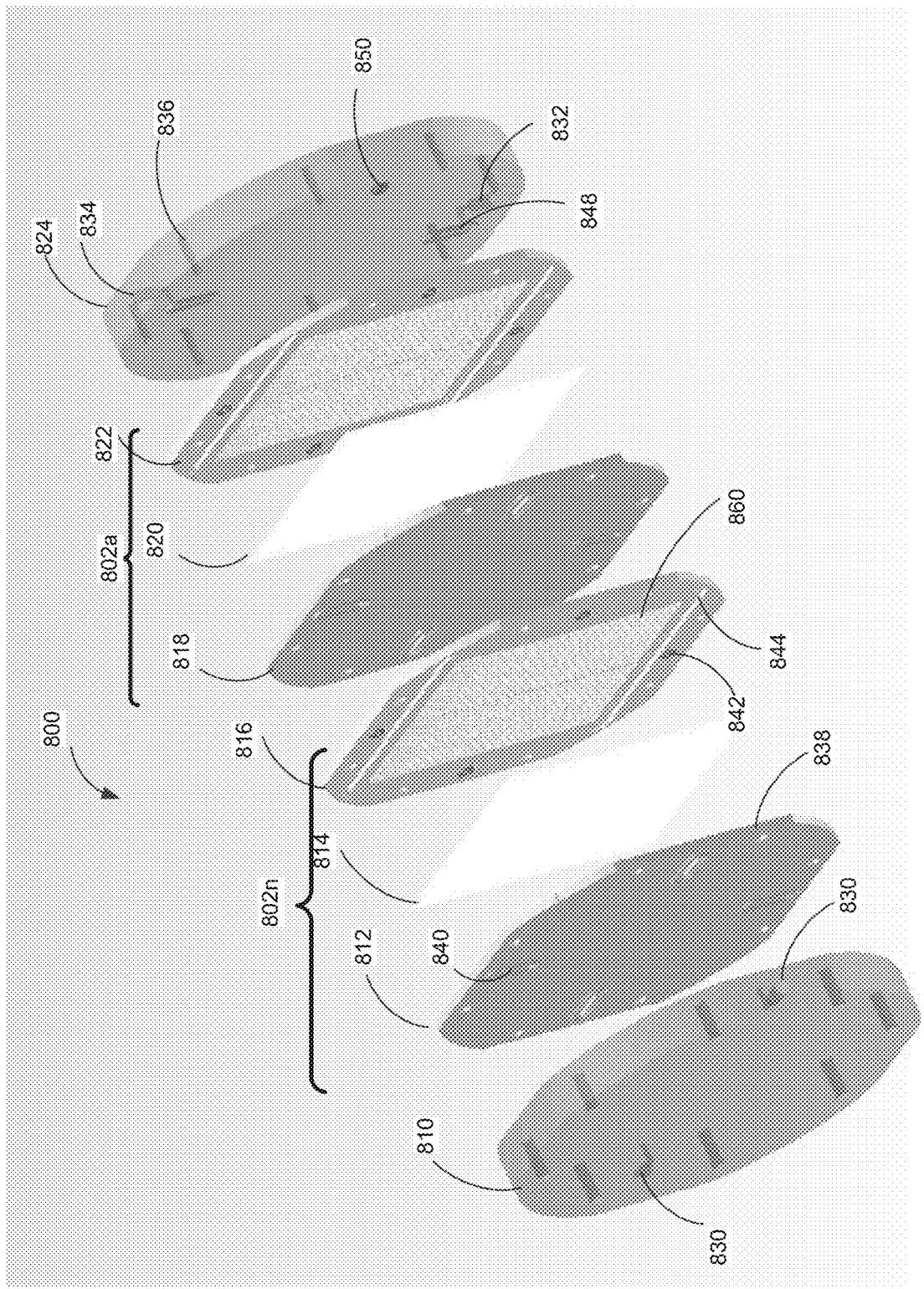
FIG. 8 is a perspective exploded view of an exemplary separation device having two single-membrane stacks and two end-caps according to embodiments of the invention disclosed herein.

Now referring to FIG. 8 an exemplary separation device 800 has a separation membrane, which includes a plurality of membrane stacks 802a-802n disposed in a stacked configuration. Separation device 800 includes a retentate manifold coupled to the retentate port, permeate manifold coupled to the permeate port and a feed manifold coupled to the feed port which are disposed through the sheets and sealed at various points to ensure fluid tightness. These manifolds are disposed outside the first peripheral seal (i.e., on the outer edges of the various sheet and membranes). The manifolds are described in further detail in conjunction with FIG. 13. As an example, the feed passageway is partly formed in this embodiment by feed slots 840 on the outer surface of second sheet 812, whereas retentate manifold is formed by inter-stack seals 842.

The separation device 800 further includes a first end cap 810 disposed at a first end of the stacked configuration and including one or more of the permeate, feed and retentate ports 830, 832 and 834, respectively. In the embodiment shown, first end-cap 810 includes two permeate ports 830. The separation device 800 further includes a second end cap 824 similar to end cap 810, comprising feed and retentate ports 832 and 834, respectively in the embodiment shown.

Figure 9:
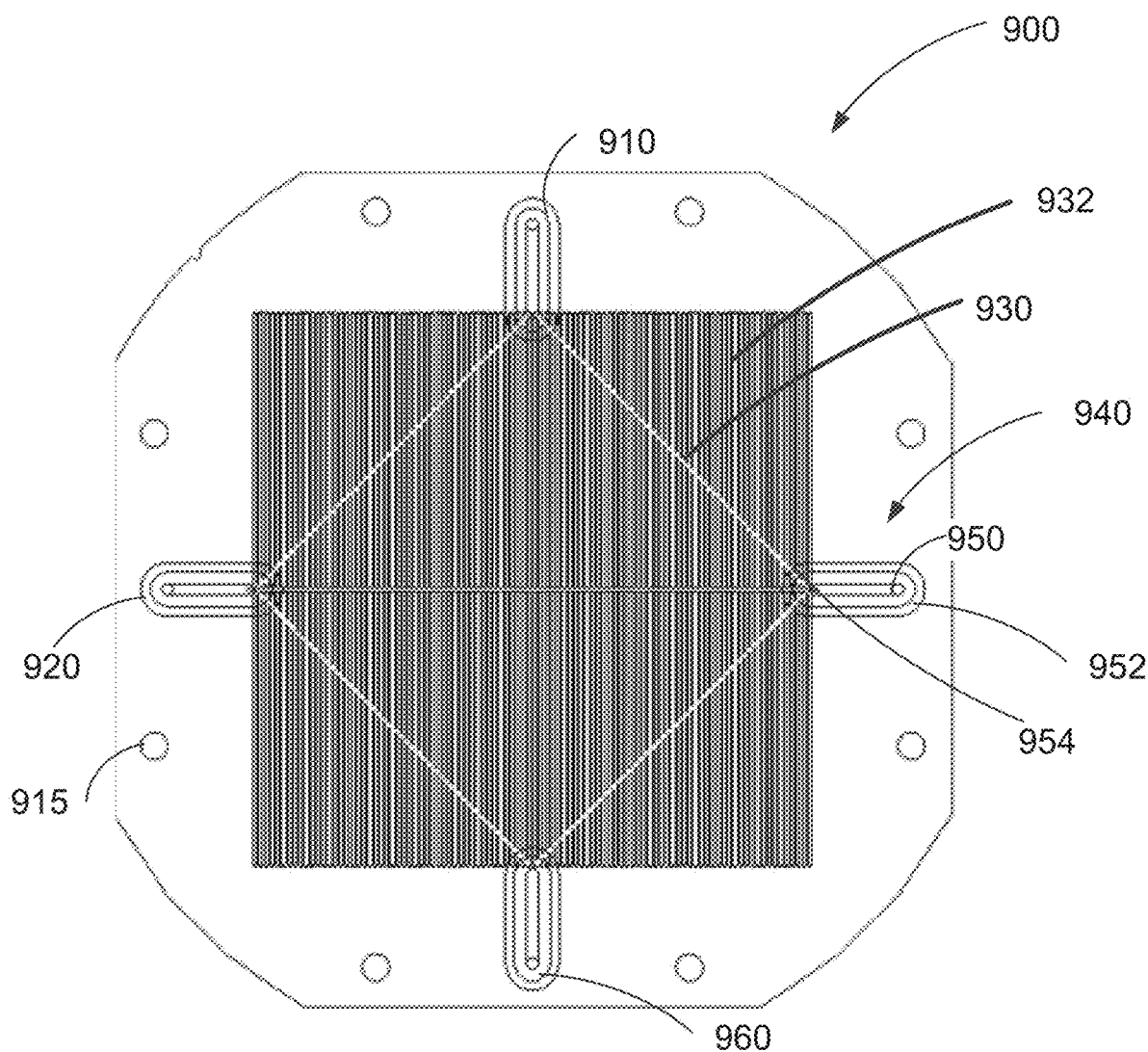
FIG. 9 is a schematic plan view of the inner surface of a permeate planar sheet of the separation device of FIG. 8.

Now referring to FIG. 9, a second sheet 900 includes permeate grooves 932, permeate drains 930, inter-stack seals 952 and permeate passageway 954 (both on the outer surface opposite the inner surface), tie rod holes 915 and permeate manifold passageway 950.

In operation, permeate fraction is collected in grooves 931 as it permeates the planar membrane (not shown) and is directed by permeate drains 930 to permeate passageway 954 routed along outer surface of second sheet 900, further directing it to permeate manifold 950. Permeate passageway 954 includes through-hole (not shown), which directs the permeate fraction collected on the inner surface to the outer surface of second sheet, and passageway 954 including a permeate slot on outer surface that directs the permeate fraction outside the active field (i.e., the region within the first peripheral seal). Inter-stack seal 952 seals permeate passageway 954 and permeate manifold 950. Tie rods are inserted in tie rod holes 915 to hold the stacked configuration together. It should be appreciated that there are many ways of routing the streams into and out of the active field, the region contained within the first peripheral seal, the important aspect being that the passageways need to be fluid tight. In these embodiments the passageways are routed on the outer surfaces of the second sheets.

Figure 10:
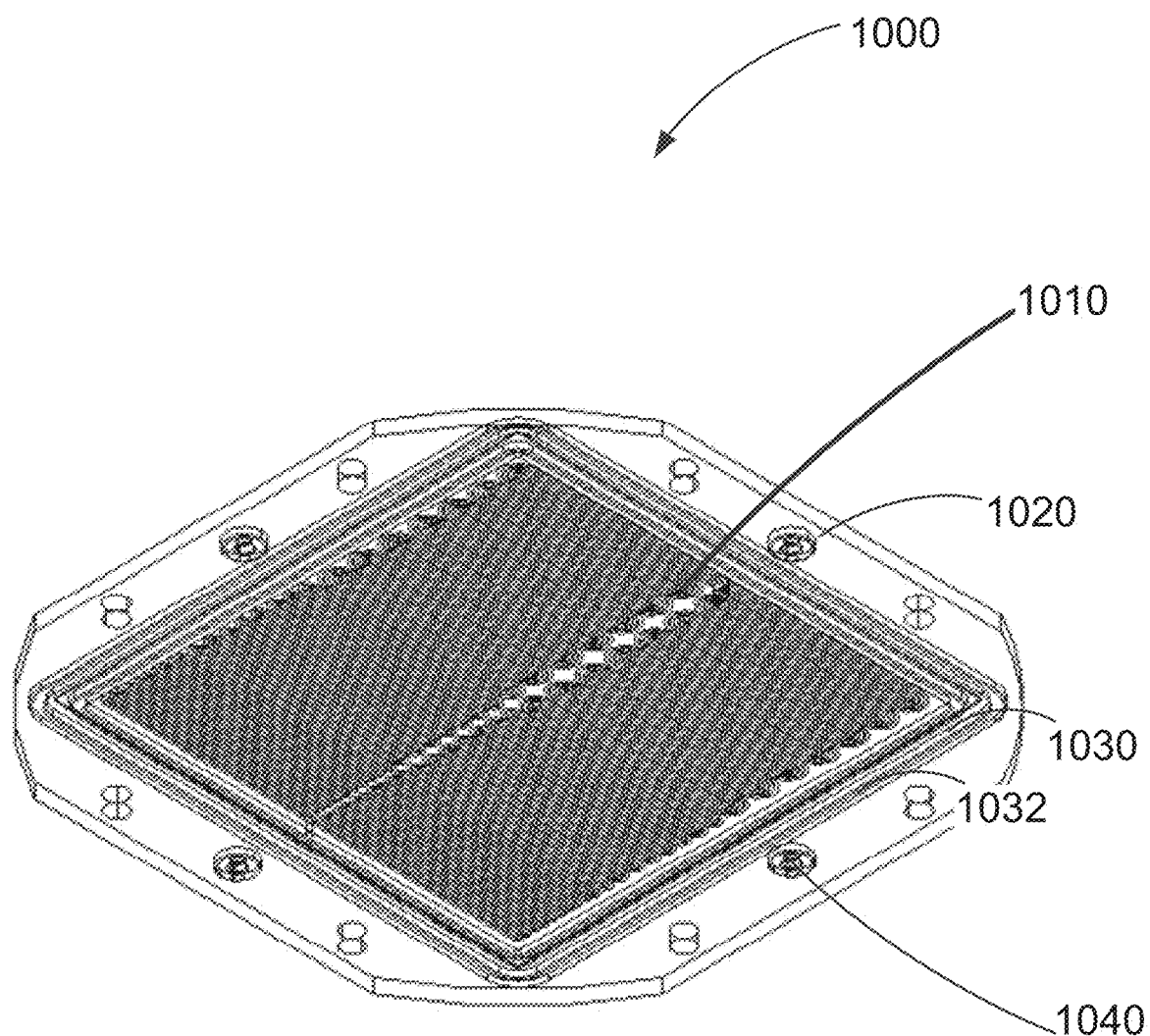
FIG. 10 is a perspective view of the inner surface of the retentate planar sheet of the separation device of FIG. 8.

FIG. 10 is a perspective view of a first (retentate) planar sheet 1000 of separation device 800 of FIG. 8. Retentate planar sheet 1000 is similar to the first planar sheet 110 described above but is configured to provide the retentate manifold, permeate manifold and feed manifolds. In this embodiment retentate planar sheet 1000 has two sets of retentate channels on either side of the active field, as well as manifold inter-stack seals 1020 and 1040. It is noted that the manifolds are disposed outside the first and second peripheral seals 1030 and 1032 (i.e., outside the active field).

Grooves 1010 embedded in inner surface form a staged array of retentate channels, in this case, in a 4|2|1 configuration (i.e., the feed solution is fed first to four channels in parallel with the retentate emanating from those four channels serially fed into two channels in parallel, which is further serially fed to one channel). Retentate grooves 1010 have ribs whose ends abut planar membrane (not shown). Feed solution is directed from feed manifold to retentate channels through feed passageway on the outer side of first sheet 1000 (not shown), whereas retentate fraction is collected on opposite side of first sheet through retentate manifold.

Figure 11:
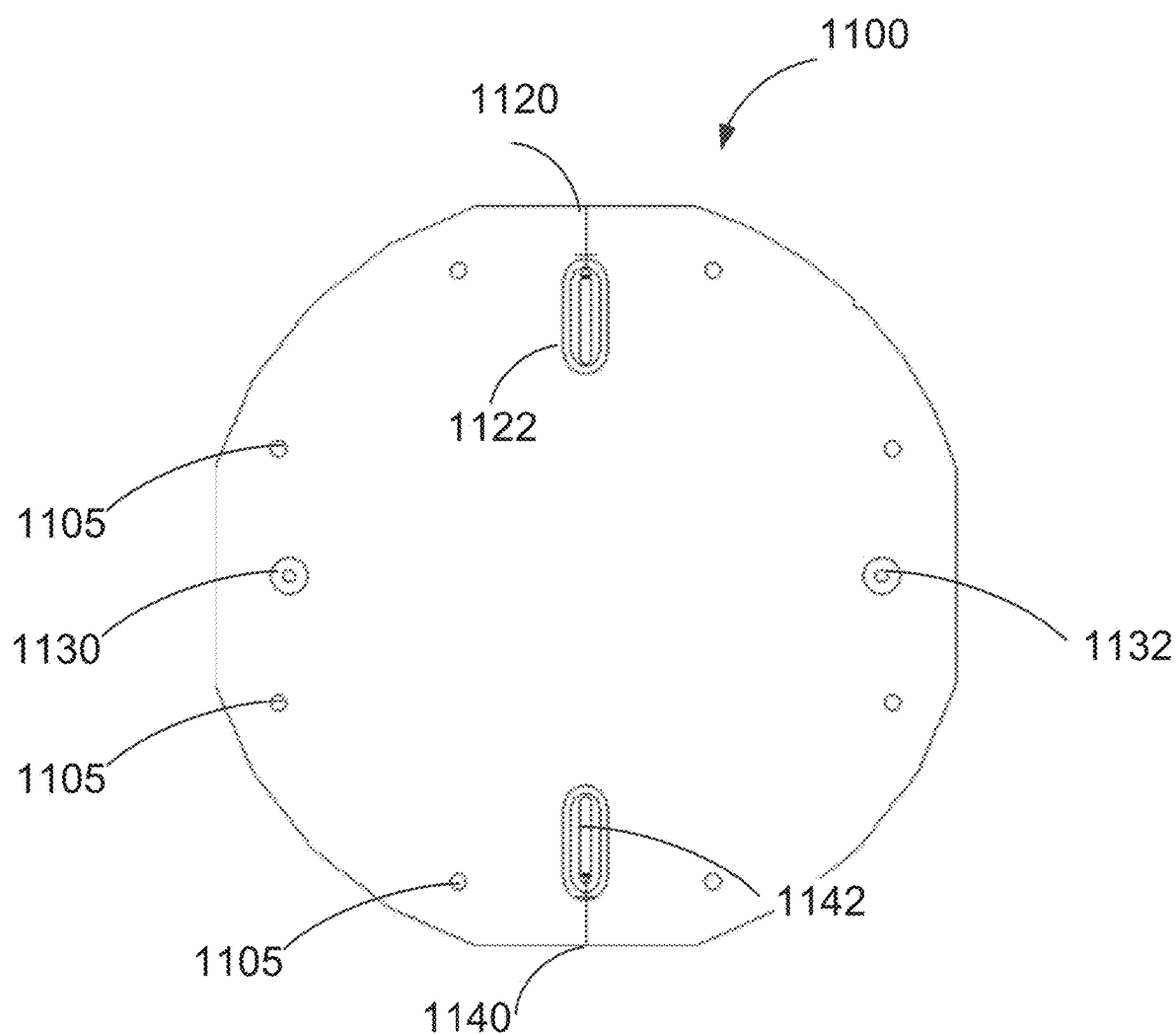
FIG. 11 is a top plan view of the inner surface of an end cap of the separation device of FIG. 8.

FIG. 11 is a top plan view of an end cap 1100 of the separation device 800. The end cap 1100 includes permeate inter-stack seals 1130 and 1132 effectively sealing the permeate manifold at its end, and a feed port 1120 coupled to the feed manifold. The end cap 1100 further includes retentate port 1140 coupled to the retentate manifold. Also shown is feed inlet passageway 1122 and retentate outlet passageway 1142 for the first membrane stack. Tie rods are inserted in tie rod holes 1105 to hold a stack assembly together (not shown) between end-cap 1100 and end-cap at the distal end of the stack assembly (not shown).

Figure 12:
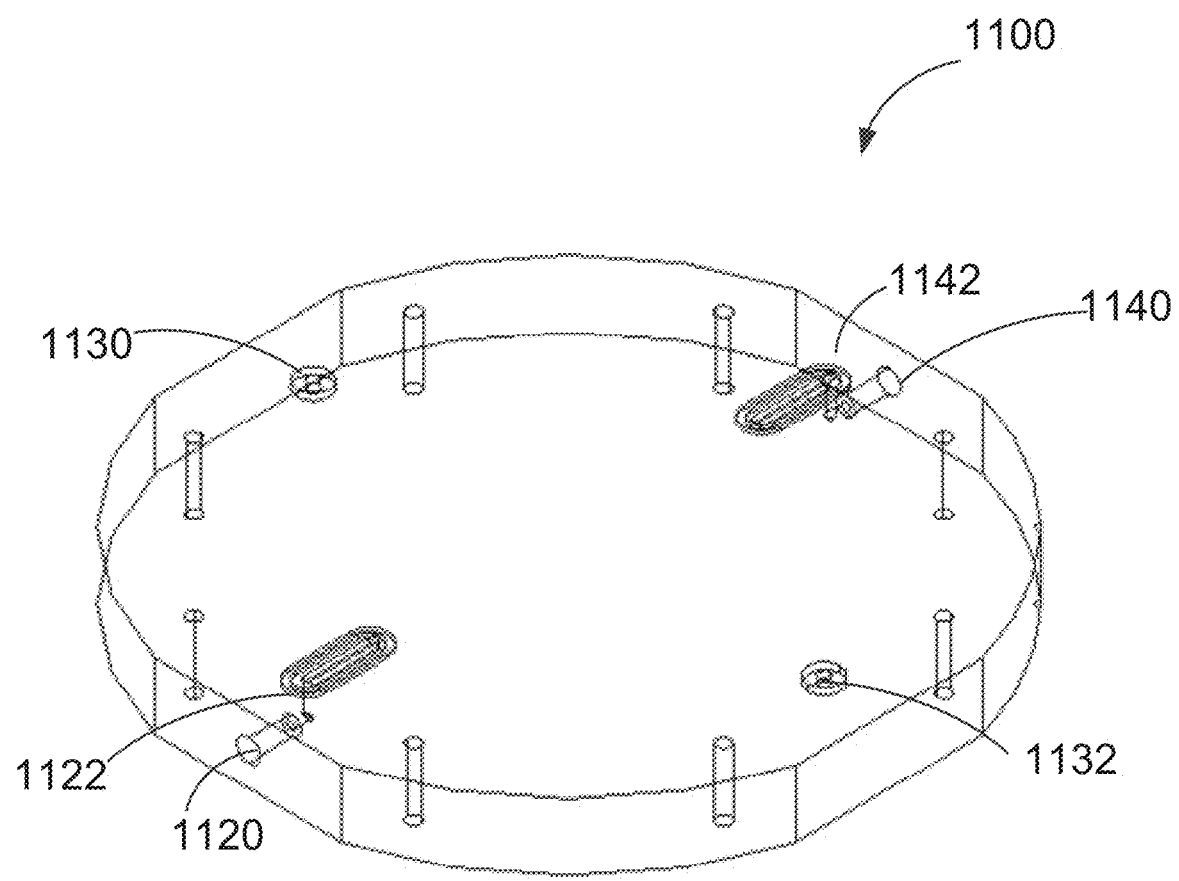
FIG. 12 is a perspective wireframe view of an end cap of the separation device of FIG. 8.
Figure 13:
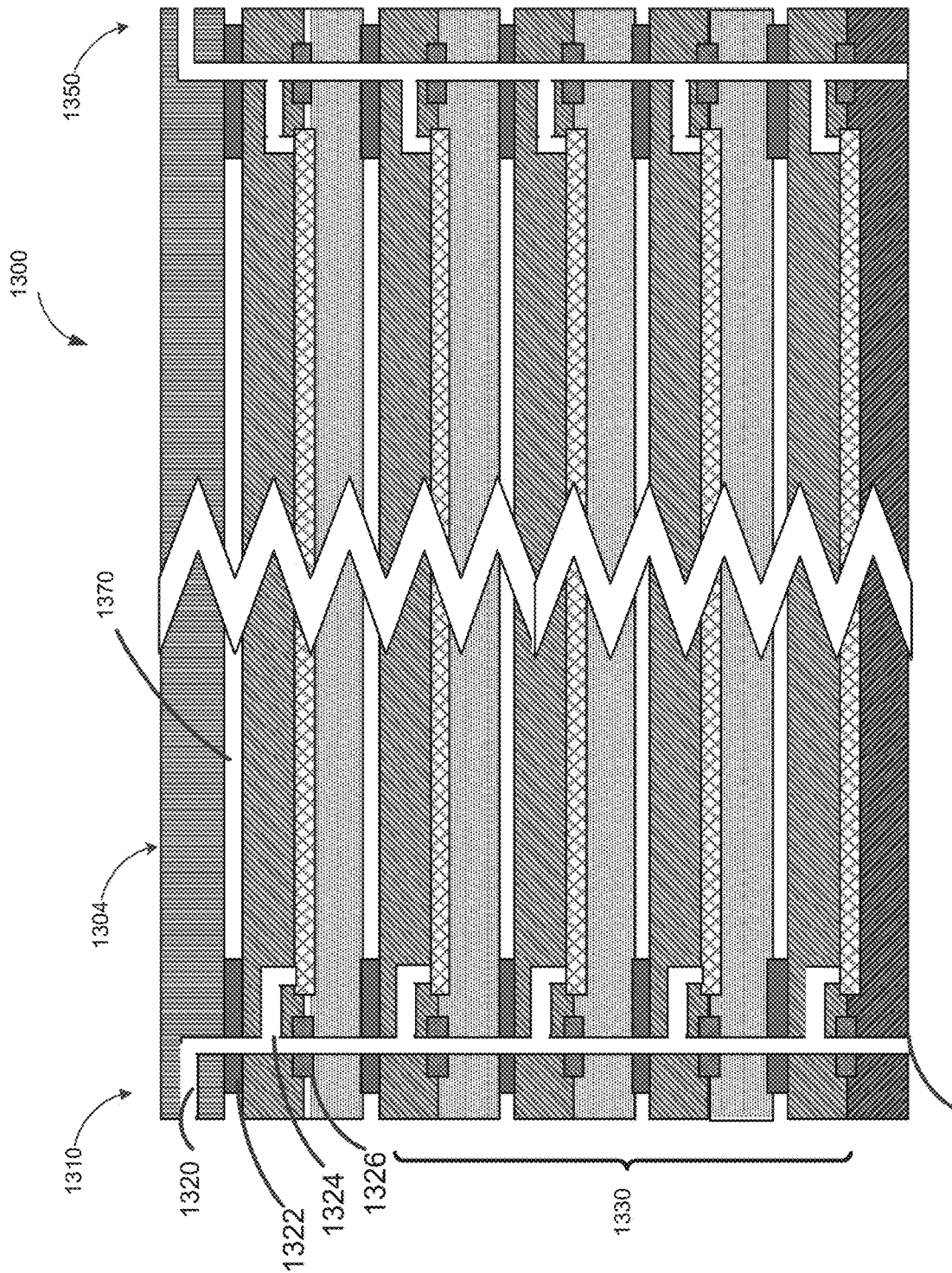
FIG. 13 is a schematic cross section view of the separation device of FIG. 8 having five single-membrane stacks and showing feed and retentate manifolds extending along the stack configuration and oriented perpendicularly to each membrane stack.

FIG. 12 is a perspective view of an end cap 1100 of FIG. 11 showing with more detail how the feed and retentate ports connect to the feed and retentate manifolds. FIG. 13 is a schematic cross section view of multi-stack separation device 1300 having five single-membrane stacks and showing feed manifold 1310 and retentate manifold 1350 extending along the stack configuration, each manifold oriented perpendicularly to each membrane stack. Multi-stack separation device 1300 is similar to device 800 of FIG. 8 showing that manifolds 1310 and 1350, which are similar to each other except that they are in fluid contact with the feed passageways and retentate passageways, respectively. These manifolds are also similar in structure, function and configuration to a permeate manifold (not shown) except that the latter is in fluid contact with the permeate passageways. Feed manifold 1310 is formed by passageways disposed through the planar sheets in the plurality of membrane stacks 1330, these passageways being sealed by inter-sheet seals 1326 and inter-stack seals 1322. These inter-sheet seals 1326 and the inter-stack seals 1322 can be elastomeric seals squeezed together by the same means that hold the stack assembly together, or can be formed by bonding together the sheets on each stack and by bonding the stacks to each other at the appropriate locations. Manifold 1310 is in fluid contact with a feed port 1320 disposed in end cap 1304 and with feed passageways 1324 in each stack. The manifold end 1328 can be individually plugged or a second end-cap can be added that simultaneously seal the ends 1328 of all the manifolds.

In operation, the vacuum induced in the feed channels by the vacuum source pulls the feed stream through feed port 1320, and is distributed to each membrane stack through manifold 1310. Inter-stack seals 1322 only seal the region in the neighborhood of the manifold passageways enabling atmospheric pressure to permeate cavity 1370 a space surrounding the exterior surfaces of each membrane stack. The differential pressure between cavity 1370 and the interior compartments of each membrane stack, all under vacuum during operation, compress each stack thereby ensuring tight contact between each planar sheet and its corresponding planar membrane thereby reliably creating the intended flow path of the retentate, permeate and diafiltration channels, as necessary.

Sheets and end-caps can be fabricated by molding or embossing processes well known to those skilled in the art, or by combinations thereof. The seals necessary to form separation modules comprising membrane stacks and multi-stack separation devices can be elastomeric seals sandwiched between the surfaces that require sealing or can be created by bonding together the surfaces. Bonds can be affected by adhesives or by fusing the plastic materials typically used in forming sheets and end-caps. Elastomeric seals can be standard or custom molded O-ring seals, or alternatively, can be molded directly into grooves embedded in the surfaces by over-molding processes known to those skilled in the art of fabricating separation devices.

The sealing of the membrane to the first or second planar sheet is not trivial but is well known to those skilled in the art. It is preferable to dispose the second peripheral seal between the membrane and the first planar sheet, particularly in separation modules utilizing ultrafiltration membranes. Furthermore, some membranes are either very difficult to bond to another surface without damaging the membranes, and in some instances practically impossible, for example regenerated cellulose membranes. Therefore, these membranes are best sealed with elastomeric seals. In some embodiments the peripheral seals may be integrated into a single sealing member. In other embodiments the second peripheral seal may be integrated into the membrane coupon; in still other embodiments the two or more peripheral seals may be integrated into the membrane coupon.

Membrane stacks can be held together by rivets or tie rods or by any suitable means that maintain the surfaces together. Multi-stack separation devices can be held together by similar means with tie rods, rivets, bonds or even by an external press. The important aspect is that the membrane stacks and multi-stack devices must be held together sufficiently such that a vacuum will be effectively induced within the compartments of the separation module when a vacuum source is connected to the permeate compartment.

FIGS. 14-21 are schematic diagrams of exemplary sample separation devices according to embodiments disclosed herein. Now referring to FIG. 14, in one embodiment of the purification devices (hereafter "devices"), device 1400 includes feed reservoir 1401 fluidly connected (hereafter "connected") to feed port 1403 of separation module 1404 through fluidic gate 1402. Retentate port 1405 on separation module 1404 is connected to retentate collector 1406. Vent 1407 further connects retentate port 1405 to permeate port 1408 of separation module 1404, which is further connected to permeate reservoir 1409. Here, feed port 1403 and retentate port 1405 are located on opposite ends of separation module 1404 ("opposite ends of separation module" are described in further detail below). Separation module 1404 is a membrane filtration unit having microporous or ultrafiltration membranes, requiring a trans-membrane pressure applied across the membrane to drive the feed sample from the feed port into the channels, through the membrane within the separation module 1404, ultimately collected in the permeate reservoir. Separation modules and membrane stacks are described above in conjunction with FIGS. 1-13.

Fluidic gate 1402 (hereafter "gate") is a fluidic device that only allows liquid to flow through it, but not gases. In its simplest embodiment it is a manual valve that the operator shuts off when the feed reservoir is empty; this embodiment requires operator attention and intervention. In other embodiments gate 1402 can be a fluidic passive device that does not require operator attention and intervention. In some embodiments gate 1402 is a passive valve having a float that opens the valve when liquid is present and shuts it off when gas enters it. In other embodiments gate 1402 is an electromechanical assembly comprising a liquid sensor and a solenoid valve, such that when the sensor detects that the liquid in feed reservoir 1401 is consumed the valve closes, and vice versa. In still other embodiments gate 1402 is a microporous hydrophilic membrane, which becomes airlocked by virtue of its capillarity when the liquid in feed reservoir 1401 is consumed and air hits the surface of the membrane. Fluidic gates comprising hydrophilic microporous membranes are hereafter referred to as "philic gates." Passive fluidic gates (e.g., float valves; sensor/solenoid valve assemblies; and philic gates) are desirable because they do not require operator attention/intervention.

Figure 14:
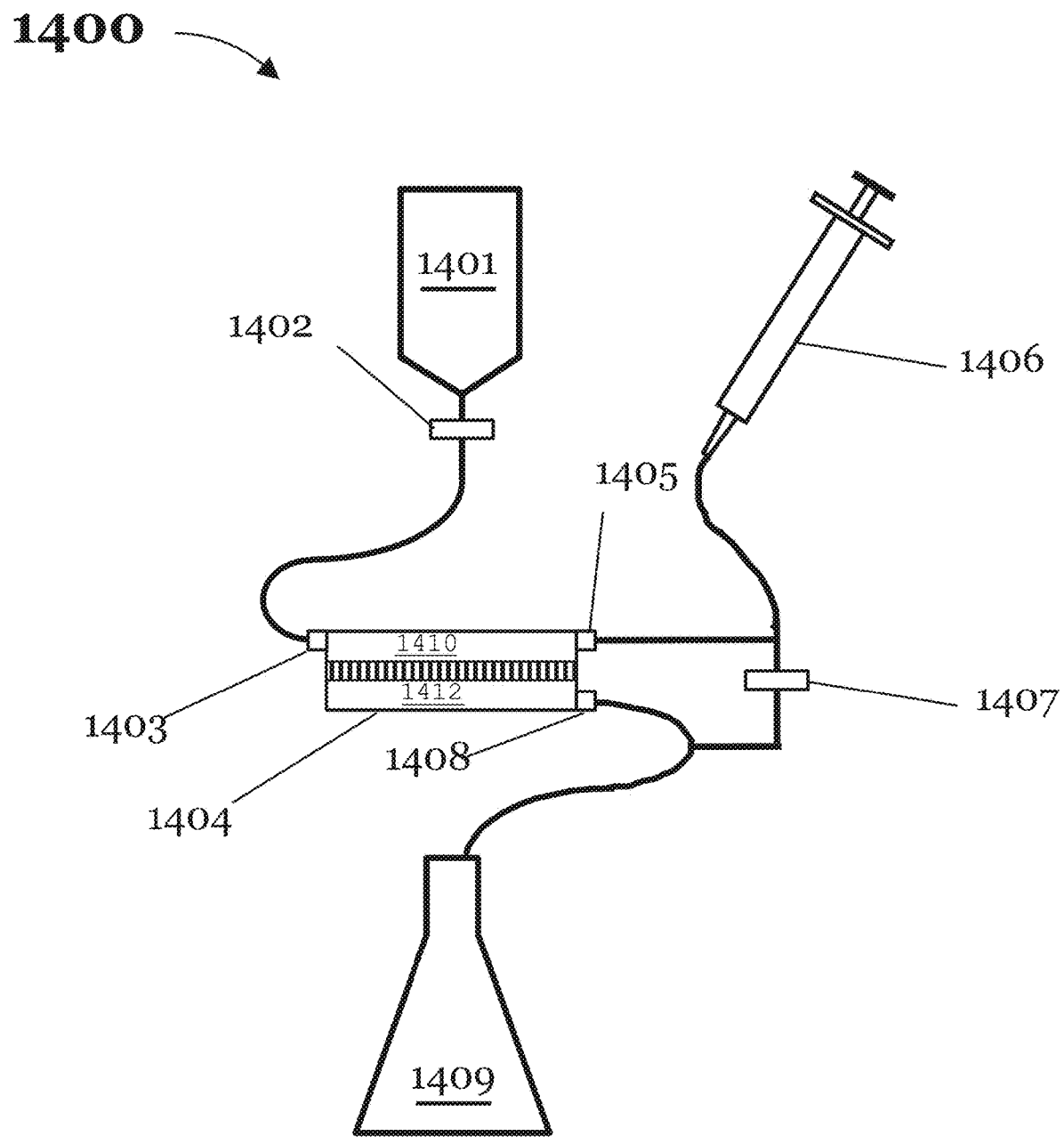
FIGS. 14-21 are schematic diagrams of exemplary sample separation devices according to embodiments disclosed herein.

Still referring to FIG. 14, vent 1407 is a fluidic device that only allows gas to flow through it, but not liquids, enabling the venting of gas otherwise trapped in the flow channels of the separation module. In its simplest embodiment vent 1402 is a manual valve that the operator opens when there is air in retentate port 1405 and closes it when the air is displaced; this embodiment requires operator attention and intervention. In some embodiments vent 1407 is a passive valve having a float that shuts off the valve when liquid is present and opens it when gas enters it allowing the gas to be expelled (i.e., vented). In still other embodiments vent 1407 is an electromechanical assembly comprising a liquid sensor and a solenoid valve, such that when the sensor detects the presence of gas at retentate port 1405 the valve is opened, and vice versa. In still other embodiments vent 1407 is a microporous hydrophobic membrane that is not wetted by the liquid but allows gas to freely flow through the membrane. Vents comprising microporous hydrophobic membranes are hereafter referred to as "phobic vents." Passive vents, float valves, sensor/solenoid valve assemblies; phobic vents are desirable because they do not require operator attention/intervention. Vents can be either at the level of the separation device (one vent per device) or the separation module (one vent per separation module, with multiple vents being deployed within a single device).

Although only a single feed port, a single retentate port and a single permeate port are shown in FIG. 14, other embodiments may include more than one port of each type. Furthermore, the connection between the different components shown in FIG. 14 as solid lines between the components are either in the form of external tubing or fluidic passageways integrated into one or more components of device 1400, or eliminated altogether is two contiguous components are integrated into each other, as will be described below.

Still referring to FIG. 14, the concentration process of device 1400 is driven by inducing a trans-membrane pressure or a pressure differential across the membrane either by connecting feed reservoir 1401 to a pressure source (not shown) or alternatively connecting permeate reservoir 1409 to a vacuum source (not shown), or to both.

To use device 1400 with a vacuum source, a feed sample is added to feed reservoir 1401 and a vacuum source (not shown) is connected to permeate reservoir 1409. The vacuum in permeate reservoir 1409 pulls air out of separation module 1405 through vent 1407 drawing sample in feed reservoir 1401 into the feed/retentate compartment 1410 of separation module 1405. Once the retentate compartment 1410 of separation module 1405 is primed with feed sample (i.e., the air has been displaced) the vacuum in the permeate compartment 1412 induces a TMP that drives permeation from the feed into the permeate compartment 1412 of separation module 1404, with the permeate ultimately collected in permeate reservoir 1409. This permeation process continues until the feed sample in feed reservoir 1401 is consumed and air enters gate 1402, at which point flow of feed stream into separation module 1404 stops, and permeation stops. During permeation the retained species (e.g., a protein) is concentrated in the retentate compartment 1410 of the separation module 1404, the volume of which is much smaller than the feed sample volume. A final step is to recover the concentrated retentate fraction by disconnecting the vacuum source from permeate reservoir 1409 and collecting the retentate fraction by withdrawing from the retentate port 1405 with retentate collector 1406, in this embodiment a syringe. In these embodiments, the process is fundamentally a batch process: feed sample is concentrated in the retentate compartment 1410 of separation module 1404 followed by collection of the retentate fraction. This batch process can be repeated multiple times if the sample is larger than a certain size. Washing of the retentate fraction can be optionally effected by adding buffer to the feed reservoir and permeating through the retentate fraction generating a washed retentate fraction; alternatively, washing can be affected by displacing the retentate fraction back into the feed reservoir 1401 by injecting buffer with the retentate collector, subsequently diluting the retentate fraction in the feed reservoir with buffer, and finally permeating it again. Other washing processes, described below, are possible. In other embodiments a check valve is added between permeate port 1408 and permeate reservoir 1409 to prevent back flow of permeate when recovering the retentate fraction.

Figure 15:
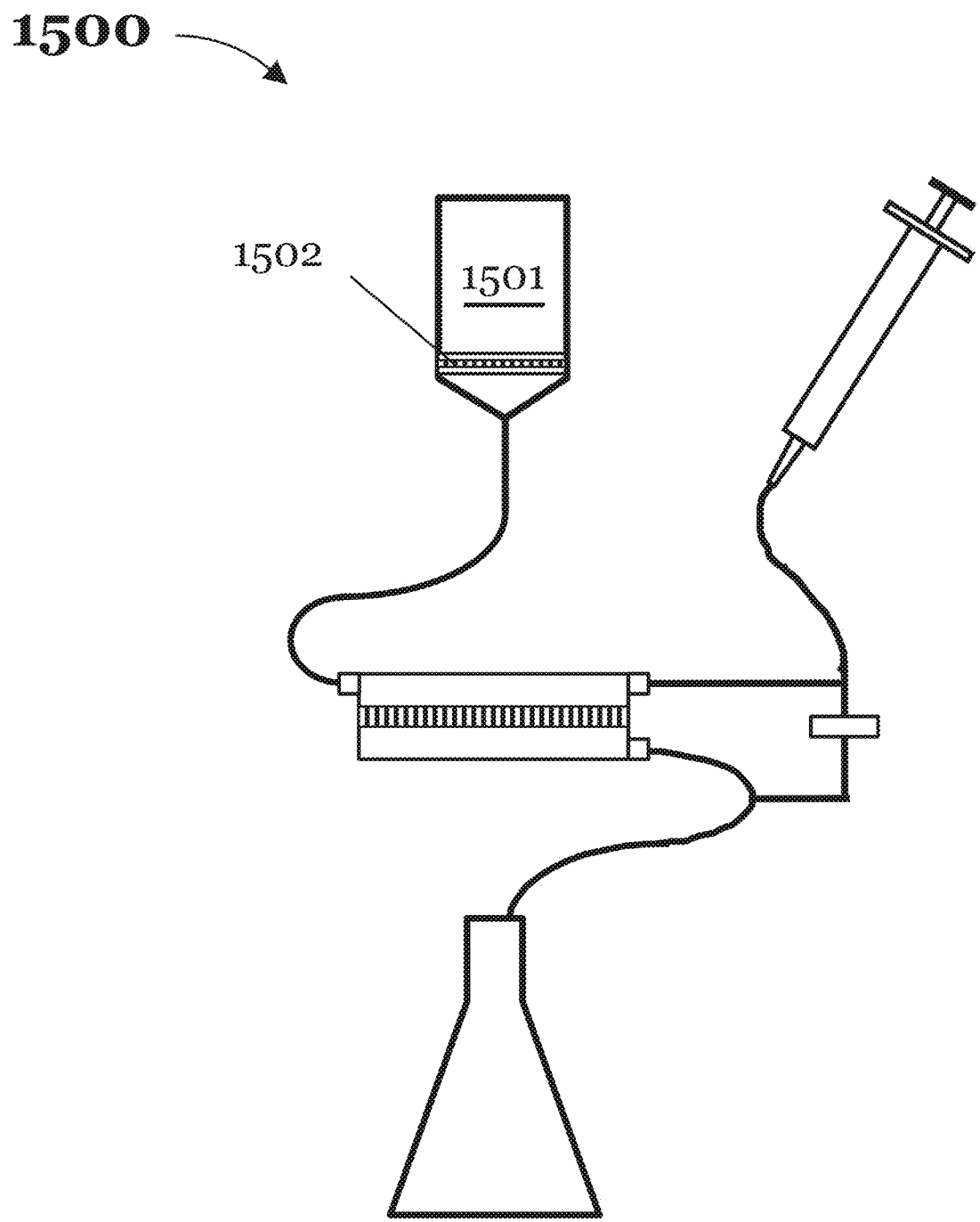

Now referring to FIG. 15, device 1500 has similar components as device 1400 of FIG. 14, except that the philic gate is a hydrophilic membrane filter 1502 that has been integrated into the feed reservoir. Device 1500 includes philic gate 1502 integrated into feed reservoir 1501, such that philic gate 1502 forms the bottom of feed reservoir 1501; the other components (shown, but not labeled) are similar to those in device 1400 of FIG. 14. The advantage of integrating philic gate 1510 into feed reservoir 1501 is that after the feed sample is consumed and permeation stops, permeation can be immediately resumed if additional sample or buffer is added to feed reservoir 1501. In this manner the operator can process a larger sample (increasing the concentration of the retained species in the retentate fraction), or alternatively wash the concentrated retentate fraction with a buffer. In contrast, device 1400 of FIG. 14 would not spontaneously resume permeation if additional liquid is added to feed reservoir 1401 unless the operator first primes (i.e., removes the air) from the fluidic conduits connecting feed reservoir 1401 to gate 1402.

Hydrophilic microporous filter 1502 acts as a gate (referred to as philic gate 1502) enabling the feed sample to flow into the separation device 1430 but preventing air from getting into the retentate compartment when the feed sample is consumed. Consuming the feed sample closes the philic gate 1502 between the feed reservoir and retentate chamber. In this manner the user does not have to continuously observe the progress of the permeation in order to remove the vacuum source at the moment that the feed sample is consumed. Thus, the separation device can be run unattended (i.e., unattended operation) without running the risk of overconcentration. In operation there is no need to continuously monitor the progress of the permeation; a user can simply start the permeation and return when convenient to remove the vacuum source and recover the retentate fraction whenever it is convenient.

Figure 16:
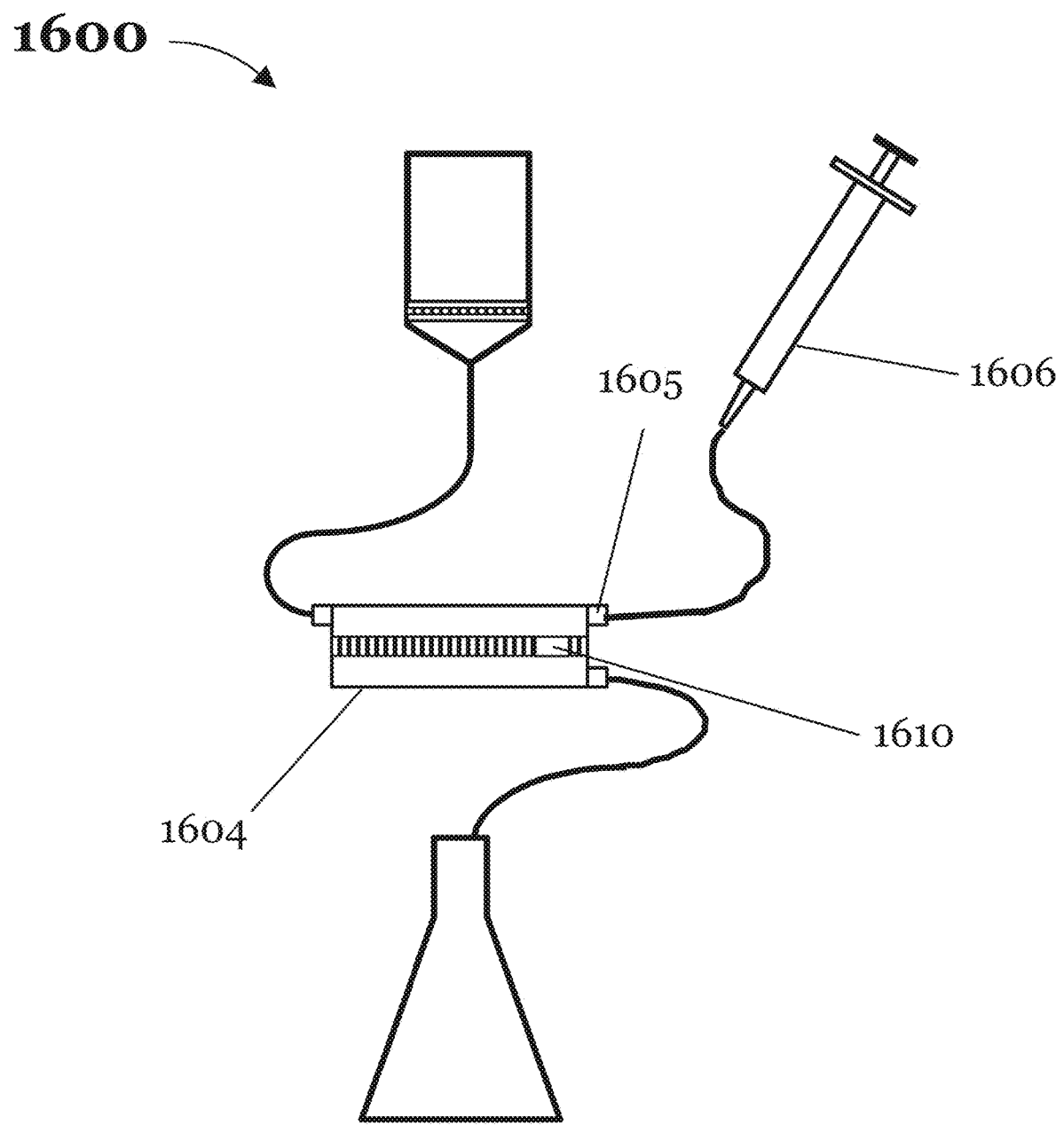

Now referring to FIG. 16, device 1600, similar to device 1500, has similar components as device 1500 of FIG. 15, except that the vent has been integrated into the separation module. Device 1600 includes hydrophobic membrane filter (phobic vent) 1610 integrated into the membrane of separation module 1604. In this embodiment, phobic vent 1610 is bonded to membrane of separation module 1604, enabling gas present in the retentate compartment to be vented into the permeate compartment. Retentate port 1605 is still connected to retentate collector 1606, but not to a vent external to separation module 1604 (since in this embodiment a phobic vent 1610 is integrated into separation module 1604). Phobic vent 1610 is located near the second end of the separation module adjacent to retentate port 1605 (and opposite to the feed end of the separation module 1604). As already mentioned, phobic vent 1610 is a passive component having no moving parts. The additional advantage of integrating the phobic vent 1607 into the separation module is that the phobic vent 1607 continues to effect venting even after the initial priming of the separation module, since phobic vent 1607 vents air spontaneously the instant air comes into contact with the hydrophobic membrane. In contrast to device 1400 of FIG. 14, exterior vent 1407 is equally effective venting air during priming of separation module 1404 at the start of permeation, but it may not be as effective in venting air bubbles generated during permeation since the connector between retentate port 1405 and vent 1407 becomes filled with liquid after the initial priming, preventing air bubbles from reaching vent 1407.

Figure 17A:
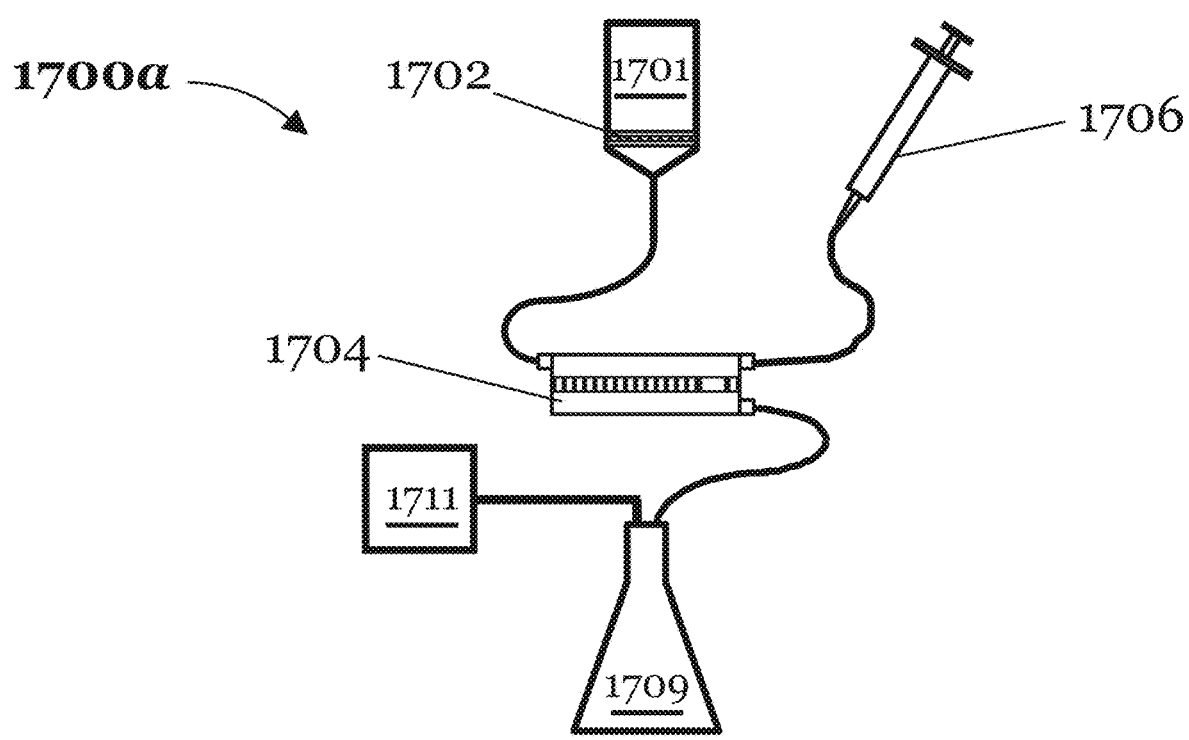
Figure 17B:
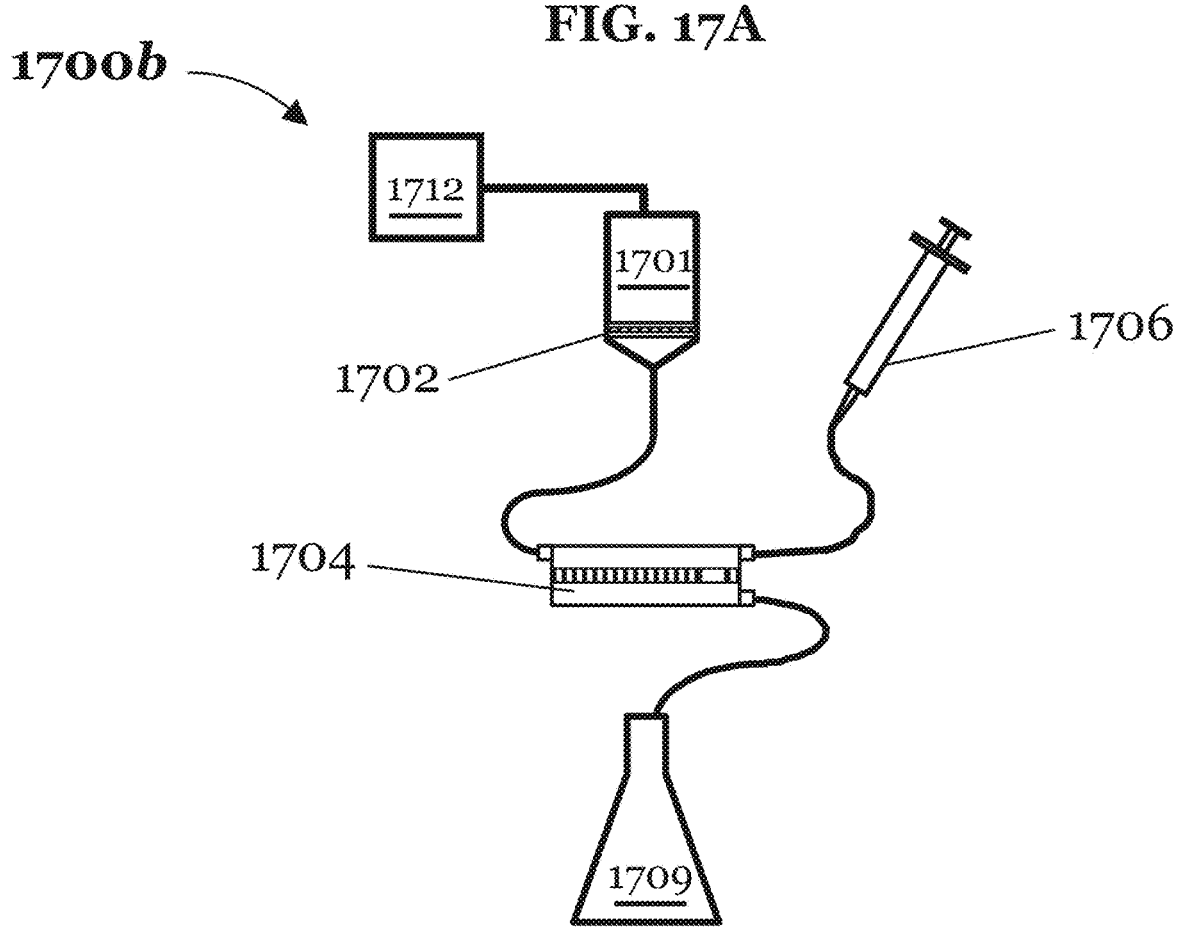

Referring now to FIG. 17A, device 1700*a* includes device 1600 of FIG. 16 connected to a vacuum source to induce a differential pressure on the separation module to induce permeation. Vacuum source 1711 is connected to permeate reservoir 1709. In operation, vacuum induced by vacuum source 1711 in permeate reservoir 1709 induces a pressure differential that primes (removes the air from) the retentate compartment of separation module 1704. Upon priming, the pressure differential induces permeation across the membrane in separation module 1704, concentrating the retained species in the retentate compartment of separation module 1704. When the feed sample is consumed, permeation spontaneously stops by a philic gate 1702 integrated into feed reservoir 1701. The operator then disconnects vacuum source 1711 from permeate reservoir 1709 and extracts the retentate fraction using retentate collector 1706. Referring now to FIG. 17B, device 1700*b* includes device 1600 of FIG. 16 connected to a pressure source to induce a differential pressure on the separation module to induce permeation. Pressure source 1712 is connected to feed reservoir 1701. In operation, pressure induced by pressure source 1711 in feed reservoir 1701 induces a pressure differential that primes (removes the air from) the retentate compartment of separation module 1704. Upon priming, the pressure differential induces permeation across the membrane in separation module 1704, concentrating the retained species in the retentate compartment of separation module 1704. When the feed sample is consumed, permeation spontaneously stops by philic gate 1702 integrated into feed reservoir 1701. The operator then disconnects pressure source 1712 from feed reservoir 1701 and extracts the retentate fraction using retentate collector 1706. Both embodiments are operated in a similar manner with similar results. The maximum possible differential pressure that can be induced in device 1700*a* is limited to atmospheric pressure (1 bar), whereas device 1700*b* is be able to induce higher differential pressures, and therefore, concentrate the feed sample faster. On the other hand, some of the components of device 1700b (e.g., feed reservoir 1701 and separation module 1704) are more rigid to be capable of withstanding the tensile stresses generated by their interior being at a pressure higher than the atmosphere surrounding it. In contrast, device 1700a is usually not under tensile stress. Device 1700a is usually under a compressive stress, enabling its components to have thinner walls, thereby having less material and a lower cost associated with their fabrication. Except for these differences in the strength of their components, devices 1700a and 1700b are functionally equivalent.

Figure 18:
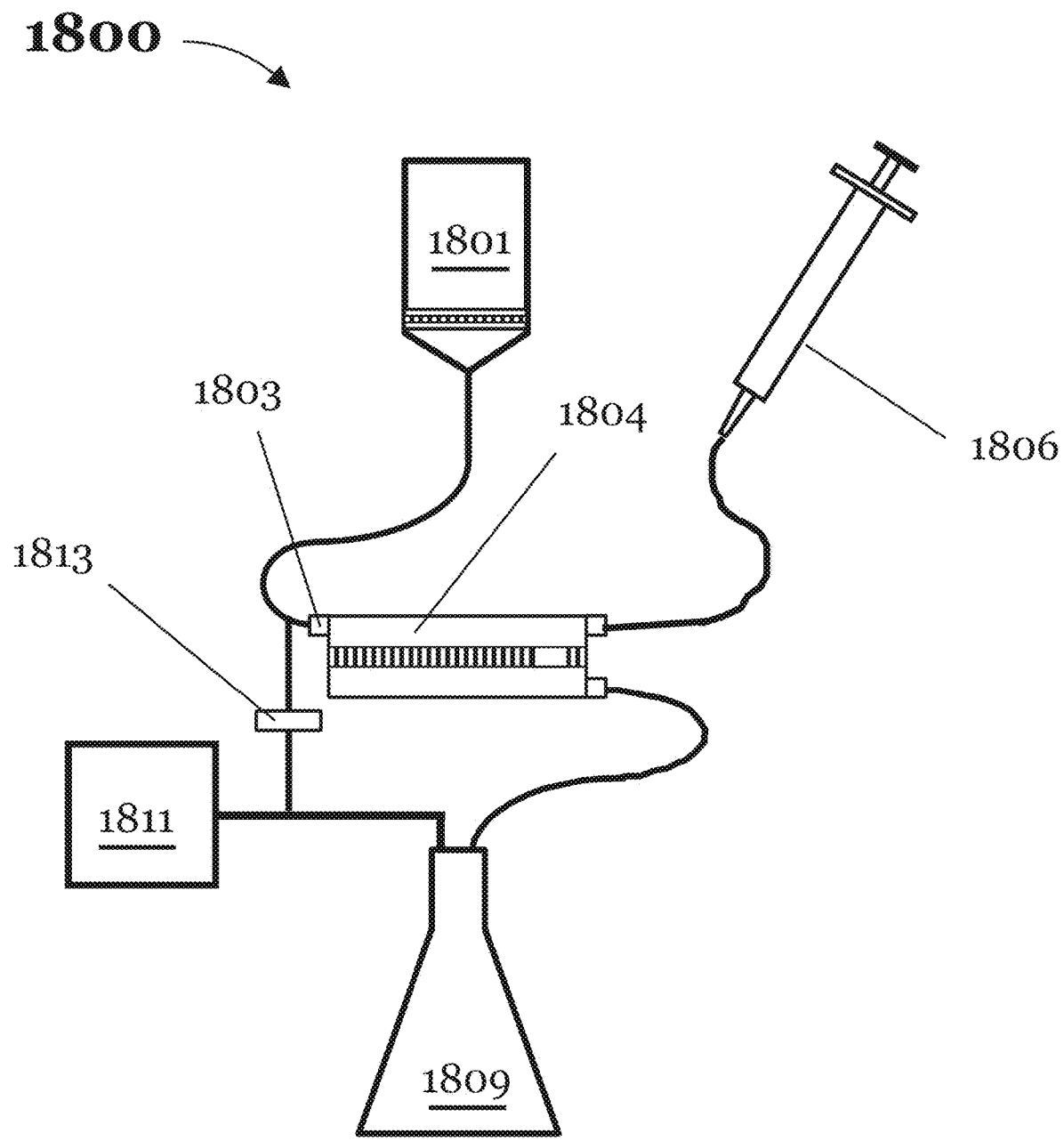

In some applications it may be advantageous to allow air to displace the retentate fraction to obtain a higher recovery. Referring now to FIG. 18, device 1800 is similar to device 1700a of FIG. 17A having similar components as device 1700a, except that a second phobic vent 1813 is connected between the feed port 1803 of the separation module 1804 and vacuum source 1811. Phobic vent 1813 helps vent air during priming as well as enabling air to enter the retentate compartment of separation module 1804 during the collection of the retentate fraction.

Figure 19:
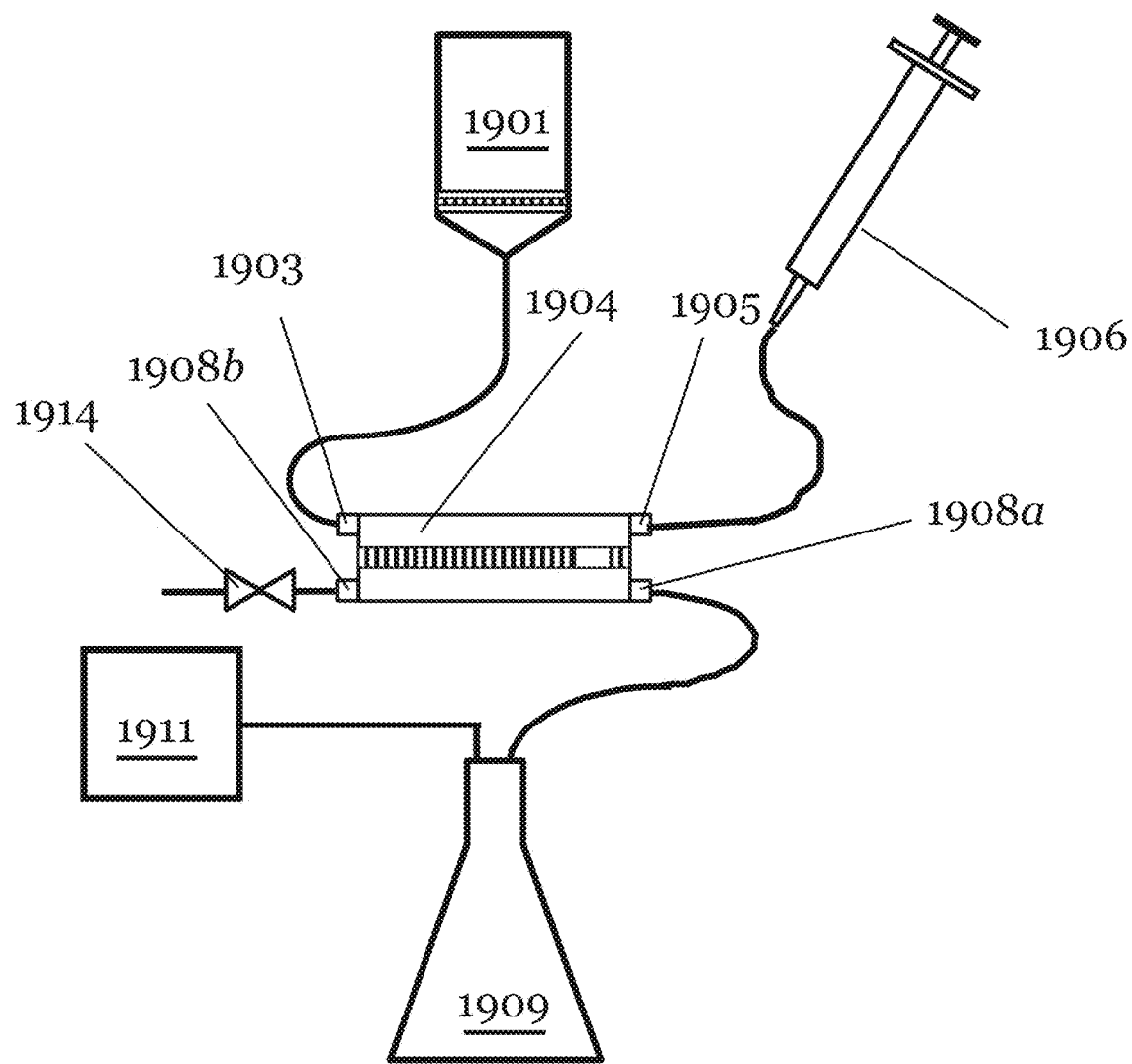

In some applications it may be advantageous to displace the permeate from the permeate compartment to obtain a higher recovery. Referring now to FIG. 19, device 1900 is similar to device 1700a of FIG. 17A except that the separation module 1904 has two permeate ports on opposite ends of the separation module. First permeate port 1908a adjacent to retentate port 1905 is connected to permeate reservoir 1809, which is further connected to vacuum source 1911. Second permeate port 1809b is disposed on opposite ends of the permeate compartment, adjacent to feed port of separation module 1904. In use, the process proceeds similarly to that described earlier, except that before the collection of the retentate fraction vent valve 1914 is opened to allow air to enter the permeate compartment thereby displacing the permeate occupying the permeate compartment. The removal of the permeate from the permeate compartment reduces the amount of reverse permeation that occurs during the collection of the retentate fraction; in some applications this operation is advantageous to recover a larger portion of the retentate fraction.

In some embodiments it may be advantageous to include a dip tube in the line connecting the permeate port to the permeate reservoir, said dip tube being dipped into the permeate pool that accumulates within the permeate reservoir to prevent air from being sucked into the permeate compartment when the retentate fraction is collected. In some embodiments it may be advantageous to include a check-valve in the connection between the permeate port and the permeate reservoir to prevent a net reverse permeation from the permeate compartment to the retentate compartment when collecting the retentate fraction.

Figure 20A:
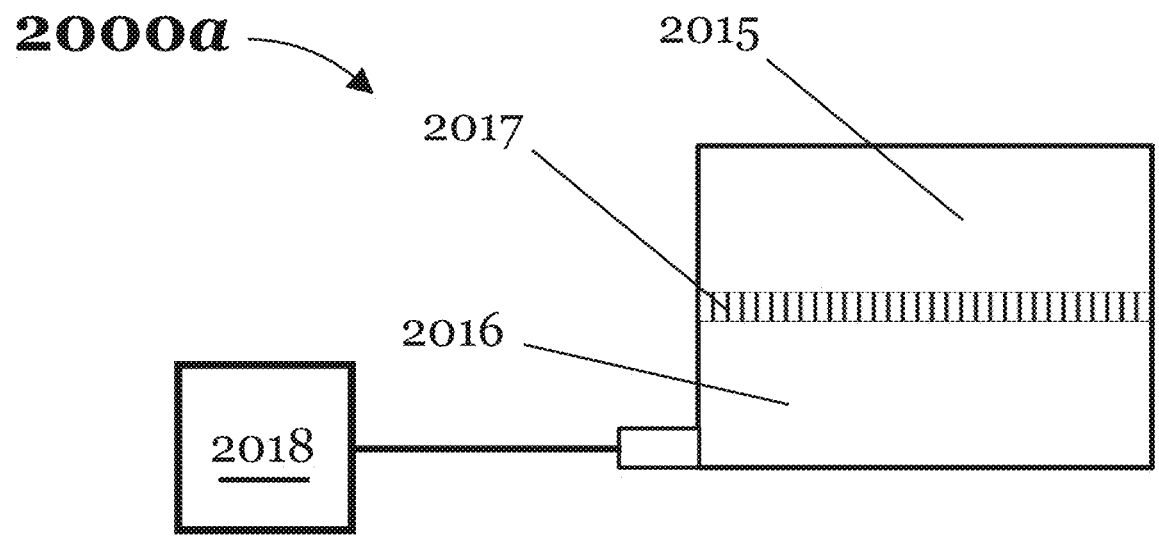
Figure 20B:
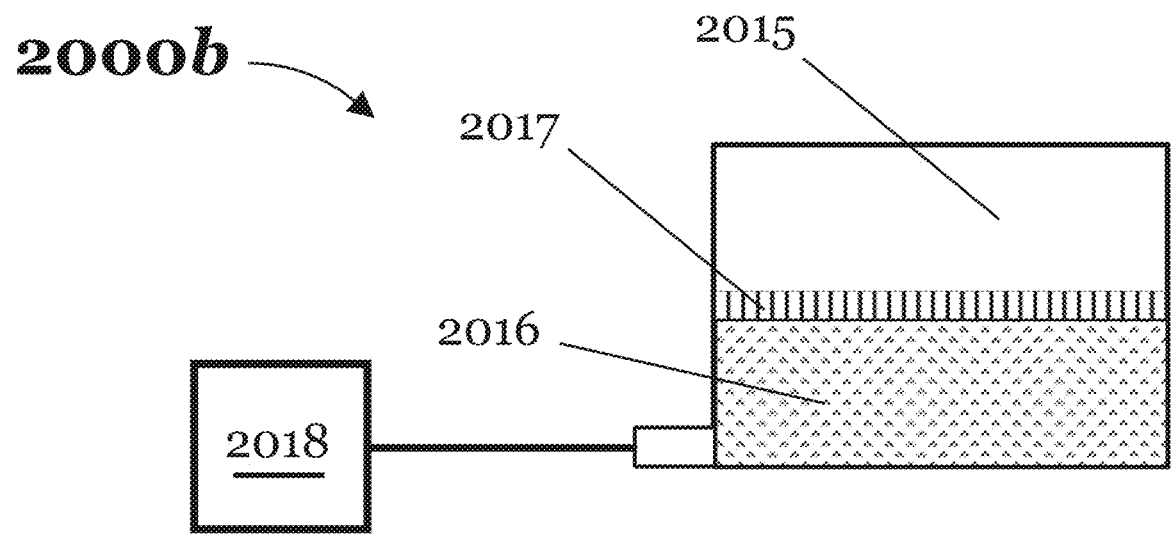

Phobic vents can be simple phobic vents, wherein air is always present in the downstream side of the hydrophobic microporous membrane filter, or can be flooded phobic vents, wherein liquid is present in the downstream side of the hydrophobic microporous membrane filter. Generally, a reference to "phobic vent" used without the term "flooded" refers to a simple phobic vent. A schematic representation of a simple and a flooded phobic vent is shown in FIGS. 20A and 20B respectively. Referring to FIG. 20A, phobic 2000a includes a hydrophobic microporous membrane 2017 separating retentate compartment 2015 from permeate compartment 2016. When permeate compartment 2016 is connected to vacuum source 2011 air present in retentate compartment 2015 is sucked into permeate compartment 2016 until all the air in permeate compartment 2015 is displaced by the feed stream (not shown). The collection of the retentate sample induces a negative differential pressure (i.e., the pressure on the retentate compartment is lower than that in the permeate compartment). Therefore, a simple phobic vent allows air to flow back from the permeate to the retentate compartment. This is undesirable, as it works against the objective of the retentate collection, reducing the amount of retentate that is collected. In contrast, flooded phobic vent acts as a one-way valve, preventing air present in the permeate compartment from being sucked back into the retentate compartment. Referring to FIG. 20B, phobic vent 2000b includes similar components as phobic vent 2000a, except that now liquid is occupying the space immediately downstream of the hydrophobic microporous membrane. In these embodiments, the permeate generated during permeation is directed to the region downstream of the phobic vent. In embodiments disclosed herein, it is advantageous for the phobic vents disposed on the retentate end of the separation module to be flooded phobic vents. In contrast, it is advantageous for the phobic vents disposed on the feed end of the separation module as that shown in device 1800 of FIG. 18 to be simple phobic vents.

Figure 21:
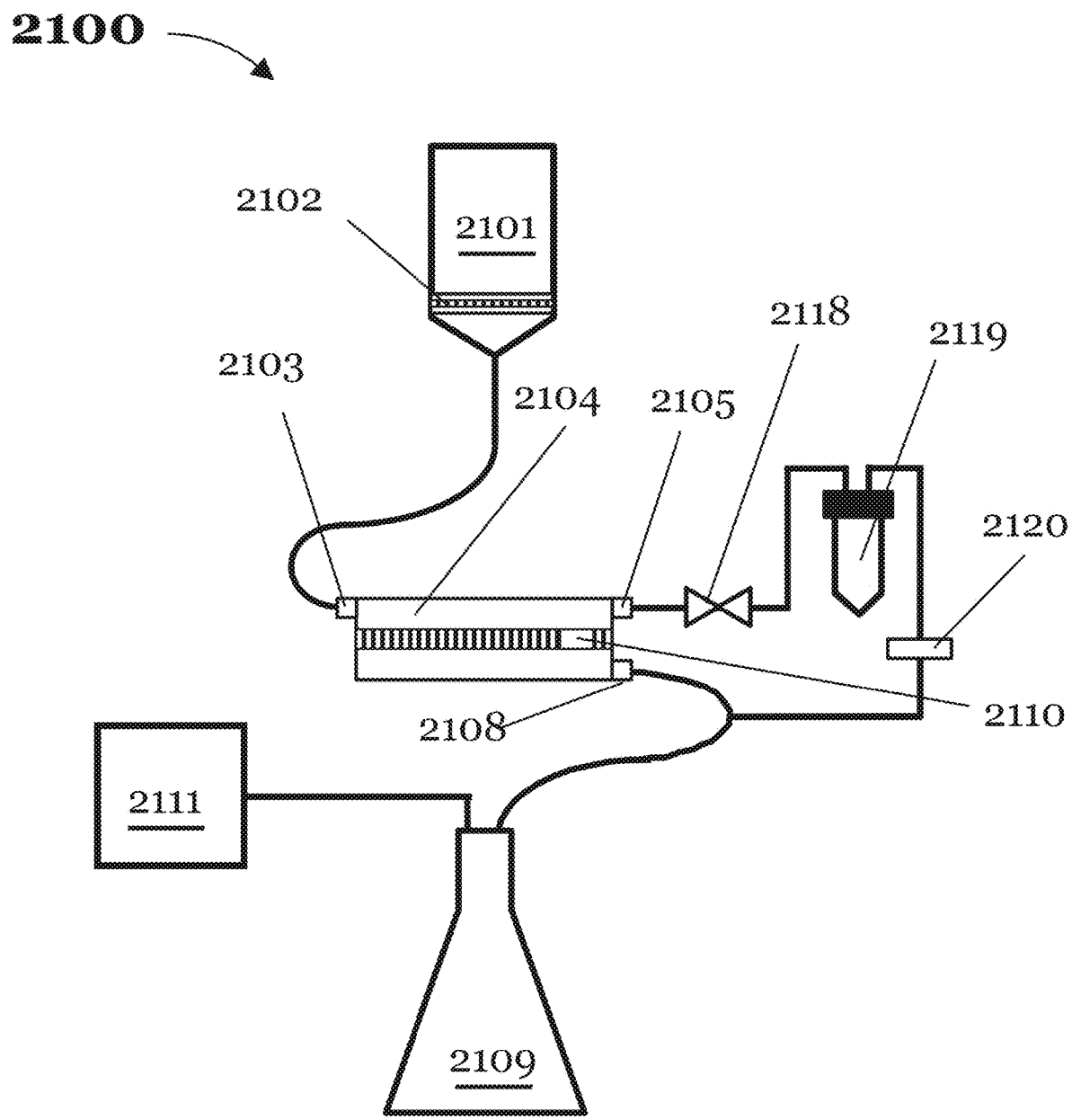

In another embodiment the syringe is replaced with a retentate collection vial with a shut-off valve to recover the retentate fraction. Referring now to FIG. 21, device 2100 is similar to device 1700a of FIG. 17, except that the syringe used as retentate collector 1706 is replaced with a retentate collection assembly comprising retentate valve 2118, retentate collection vial 2119 and flooded phobic vent 2120. In this embodiment, retentate collection vial 2119 is connected to retentate port 2105 by means of retentate valve 2118. During permeation a vacuum is induced within the retentate vial, the vacuum remaining in the retentate vial after the vacuum source is removed from the permeate reservoir. In use, vacuum source is connected to permeate reservoir 2109, followed by adding feed sample to feed reservoir 2101, inducing a pressure differential that first induces displacement of the air from the retentate compartment of separation module 2104 enabled by phobic vent 2110 integrated into separation module 2104, followed by permeation of the feed sample. During permeation the air in retentate receptacle 2119 has been withdrawn and a vacuum generated within by virtue of flooded phobic vent 2120. When the feed sample is consumed permeation stops by virtue of philic gate 2102 integrated into feed reservoir 2101, at which point operator disconnects vacuum source 2111 releasing the vacuum everywhere within device 2100 except that present in retentate vial 2119, which is maintained by virtue of flooded phobic vent 2120 (and hence a one-way valve). The retentate fraction is then collected by opening retentate valve 2118; the amount of retentate collected being controlled by the operator. In another embodiment the retentate vial is placed under vacuum by connecting it to the vacuum source through a check valve (not shown) instead of a flooded phobic vent that allows the air in the vial to be evacuated but does not allow air to flow back through it to the retentate vial. In still another embodiment the retentate vial may be hermetically sealed and delivered to the end-user preloaded with a vacuum.

In other embodiments a separation module is connected to a vacuum-driven microfiltration filter unit and corresponding receiving flasks in commercial filter units, for example, a Millipore Sigma Stericup® filter unit and corresponding receiving flask, or a Pall Corp. Acrodisc® filter unit and corresponding receiving flask, or a Sartorius Corp. Sartolab® filter unit and corresponding receiving flask.

Figure 22:
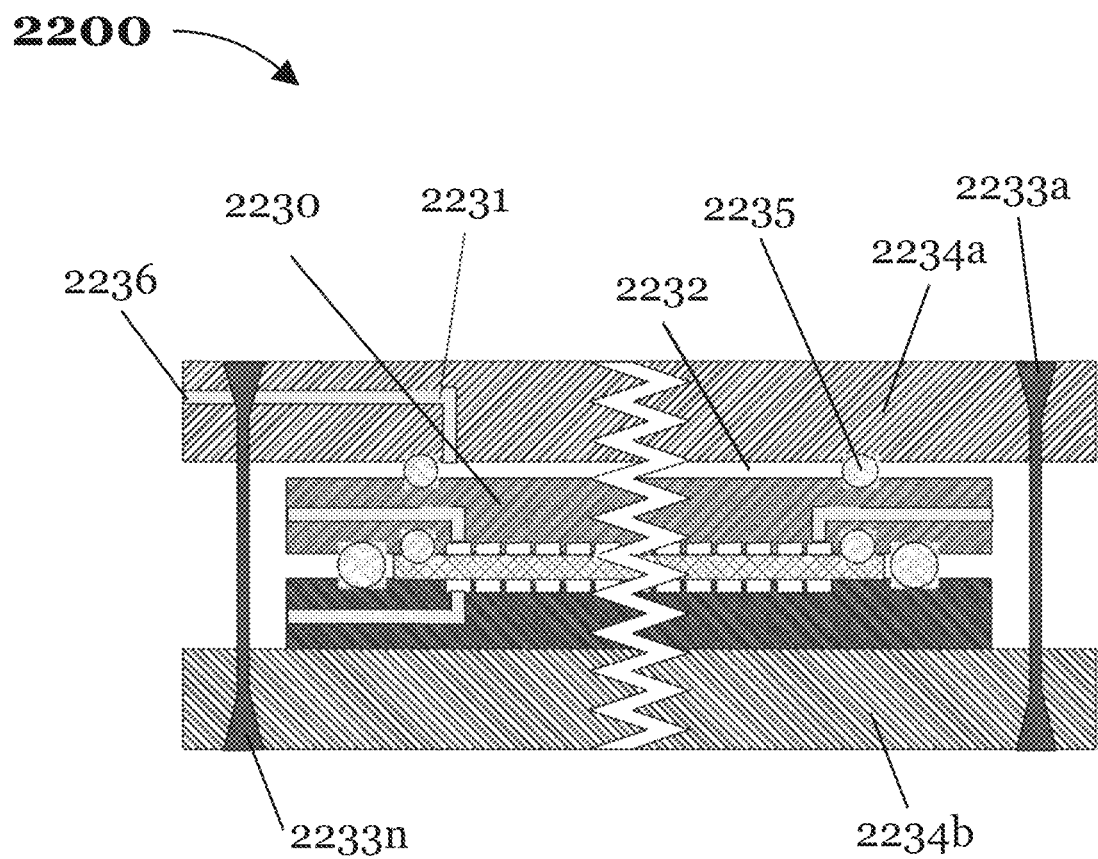
FIG. 22 is a schematic cross-sectional view of a separation module suitable for pressure-driven processing wherein a single membrane stack is hydraulically compressed, according to embodiments of the invention disclosed herein.

Many of the embodiments described herein rely on vacuum-driven operation to obtain the desired compression of the membrane stack induced by the pressure differential between atmospheric pressure on the outside of the stack and the compartments on the inside of the separation module, which are under vacuum. However, it may also be advantageous to operate the devices without vacuum, but rather with the feed stream under pressure. When using a pressure source each membrane stack has a device holder to support the device at both ends and thereby contain the forces created by the pressurized fluid, and may also have an additional compartment to contain a pressurized fluid. Now referring to FIG. 22, device 2200 for pressurized operation, includes membrane stack (separation module) 2230 further including compression chamber 2232, and corresponding peripheral seal 2235, pressurized fluid passageway 2231, pressurized fluid manifold (to interconnect multiple stacks to passageway 2231, not shown) and pressurized fluid feed port 2236. In operation, a source of pressurized fluid is first connected to pressurized fluid feed port 2236 before the feed stream under pressure is connected to the separation device. As long as the pressure of the pressurized fluid is greater than the pressure of the feed stream, membrane stack 2230 will be effectively compressed by the pressurized fluid and deliver tight contact between the membrane and the first sheet. The device holder may be in the form of end blocks 2234a and 2234b tied together with appropriate tie rods 2233a, . . . 2233n, or an external press capable of holding the forces created by the pressurized fluid in the compression chambers. The pressurized fluid may be a liquid or a gas. In some embodiments the pressurized fluid may be the feed stream. Device 2200 is separation module having a single stack. Other embodiments have separation modules comprising two or more stacks and compression chambers in each stack. In other embodiments having separation modules with two or more stacks a single compression chamber anywhere within the stack may suffice.

Figure 23A:
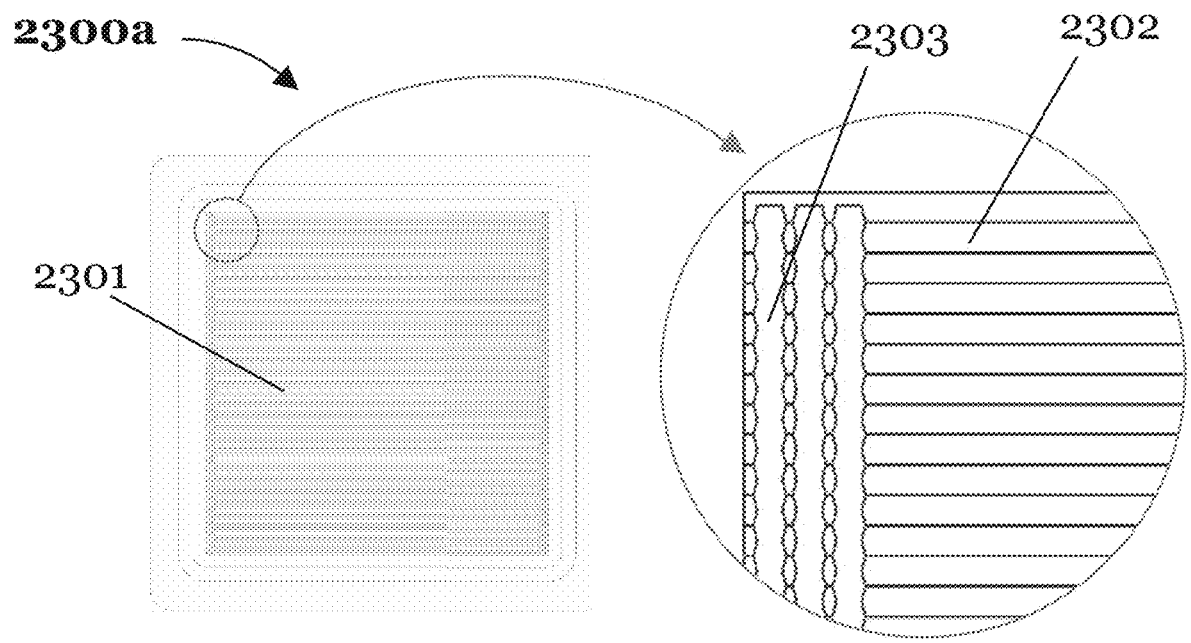
FIGS. 23A-23D are top views of exemplary planar sheets showing various retentate channel configurations, according to embodiments of the invention disclosed herein.

FIGS. 23A-23D show exemplary configurations of retentate channels of planar membrane modules. Referring to FIG. 23A, planar sheet 2300a includes array 2301 of straight parallel channels extending from a first end, the feed end (left side), to a second end, the retentate end (right side). Each end of planar sheet 2300a further includes two distributors 2303 on opposite ends of channels 2302, in this embodiment three straight channels perpendicular to channels 2302 and feeding channels 2302.

These embodiments include separation modules having at least one retentate channel and at least one permeate channel, generally an array of channels. Retentate channels have a first end, typically the inlet end, and a second end, generally the outlet end, said ends commonly described as being opposite each other. It should be understood that "opposite" means fluidly opposite, not necessary physically opposite. Likewise, a component (e.g., a phobic vent being adjacent to the retentate port) is understood to be fluidly adjacent. Generally, while fluidly adjacent means physically adjacent, fluidly opposite does not always mean physically opposite.

Figure 23B:
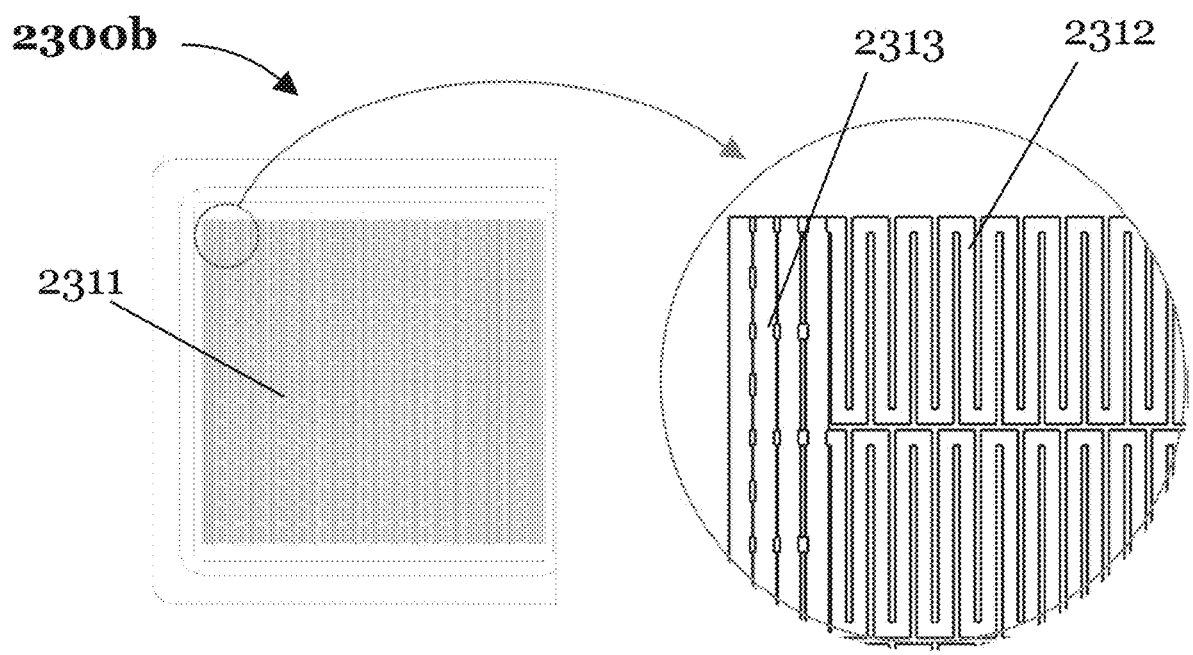

Referring now to FIG. 23B, planar sheet 2300b includes array 2311 of zigzagging parallel channels extending from a first end, the feed end (left side), to a second end, the retentate end (right side). Each end of planar sheet 2300b further includes two distributors 2313, in this embodiment four straight channels perpendicular to zigzagging channels 2312 and feeding channels 2312. Planar sheet 2300b have fewer but much longer channels 2312 compared to planar sheet 2300a.

Figure 23C:
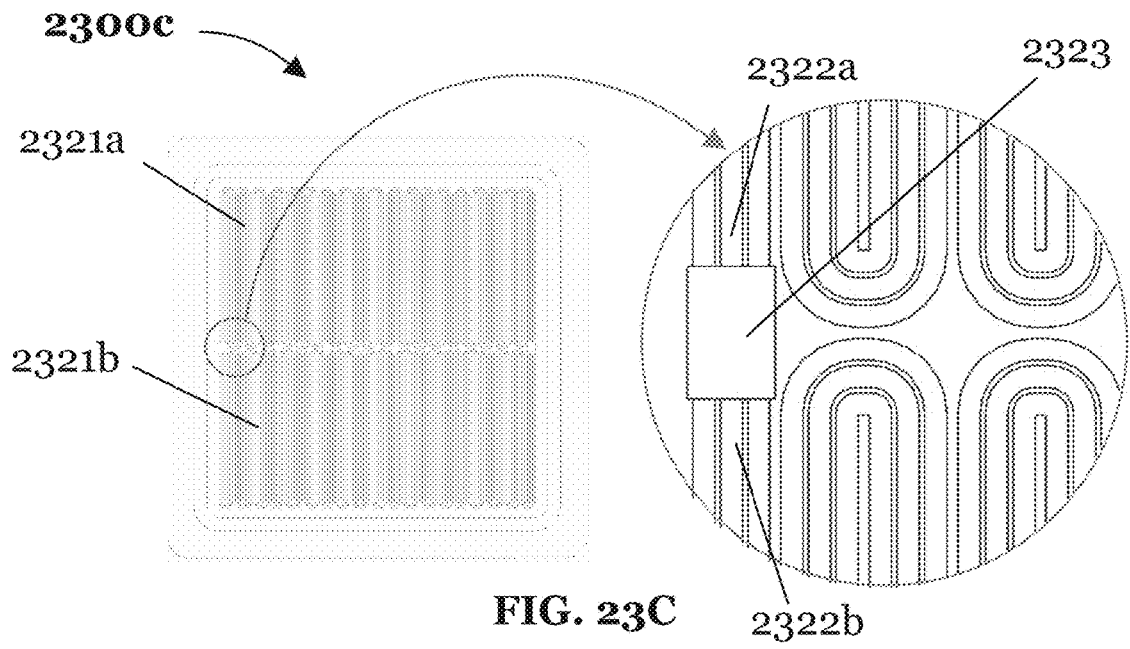

Referring now to FIG. 23C, planar sheet 2300c includes two symmetrical arrays 2321a and 2321b (collectively arrays 2321) of substantially parallel and straight channels extending from a first end, the feed end (left side), to a second end, the retentate end (right side). Each end of planar sheet 2300c further includes two distributors 2323, in this embodiment a rectangular well feeding channels 2322 feeding channels 2322a and 2322b (collectively channels 2322). Each array 2321 includes three substantially parallel channels 2322 that together zigzag from the center of planar sheet 2300c to the edge, forming a racetrack pattern as channels 2322 extend from the feed end to the retentate end. Planar sheet 2300c has still fewer and correspondingly longer channels 2322 compared to planar sheet 2300b.

Figure 23D:
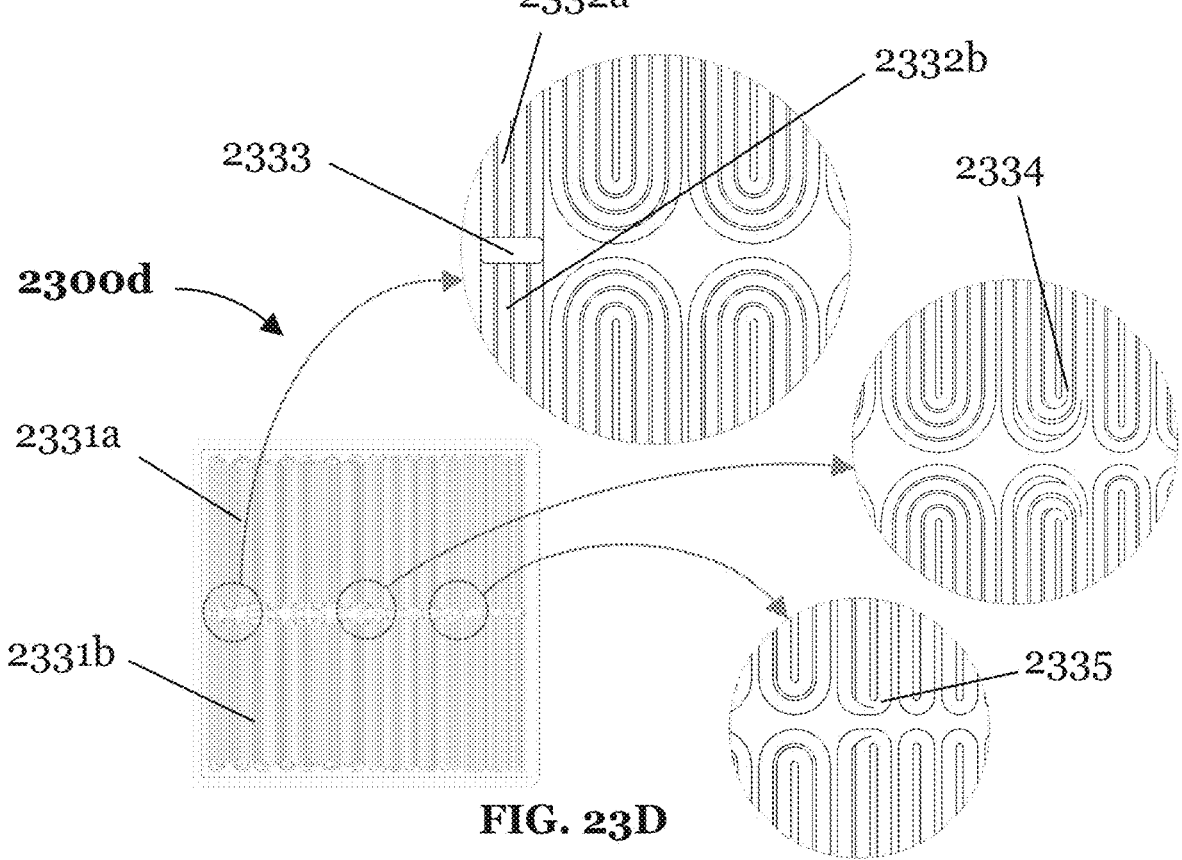

Referring now to FIG. 23D, planar sheet 2300d includes two symmetrical arrays 2331a and 2331b (collectively arrays 2321) of substantially parallel and straight channels extending from a first end, the feed end (left side), to a second end, the retentate end (right side). Each end of planar sheet 2300c further includes two distributors 2333, in this embodiment a rectangular well feeding channels 2332a and 2332b (collectively channels 2332). Each array 2331 includes four substantially parallel channels 2332 that together zigzag from the center of planar sheet 2300c to the edge, forming a racetrack pattern as channels 2332 extend from the feed end to the retentate end. In contrast to planar sheet 2300c, the channels 2332 in arrays 2321 of planar sheet 2300d converge from four to two channels in junction 2334, and from two to one channel in junction 2335, forming a "converging channel" array. In contrast to planar sheet 2300c, planar sheet 2300d has fewer and correspondingly longer channels 2322.

Separation devices of embodiments disclosed herein may have one or more retentate compartments and one or more permeate compartments separated by microfiltration or ultrafiltration membranes. Membranes used may be hollow fiber or flat-sheet membranes, made from the variety of polymers known to those skilled in the art: polysulfone; cellulose esters; PVDF; regenerated cellulose; polyamide; etc.

It should be understood that although the planar sheets shown in FIGS. 23A-23D do show that the first end of the channel is physically located opposite the second end of the channel, as shown by the physically opposite locations of the feed and retentate ports, that is not a necessary condition for suitable channels. In some embodiments feed and retentate ports may be physically adjacent to each other even though they are apart at the farthest possible location fluid-wise.

Separation devices of embodiments disclosed herein can be further characterized by certain quantitative parameters. To achieve high concentration factors, defined as the concentration of the species of interest in the retentate fraction divided by the concentration of that species in the feed sample, the volume of the retentate compartments of the separation modules of this invention, hereafter the "retentate volume," have a low volume relative to the feed reservoir volume. In some embodiments the feed reservoir volume to retentate compartment volume ratio, R, is at least 10, in other embodiments is at least 20, in still other embodiments is at least 30, and in some other embodiments is at least 50. Another quantitative parameter characterizing the retentate channels in the membrane module is the specific membrane area of the channel, defined as the membrane area available for permeation divided by the volume of the retentate channels. In some embodiments the specific membrane area of the retentate channels is greater than 20 $cm^{-1}$, in other embodiments greater than 40 $cm^{-1}$ and in still other embodiments greater than 60 cm$^{-1}$. Another quantitative parameter characterizing the retentate channels of the membrane module is the dimensionless length of the (retentate) channel, defined as the product of the length of the retentate channels and the specific membrane area of the channel. In some embodiments the dimensionless length of the is greater than about 1000, in other embodiments greater than about 3000 and in still other embodiments greater than about 5000.

Figure 24:
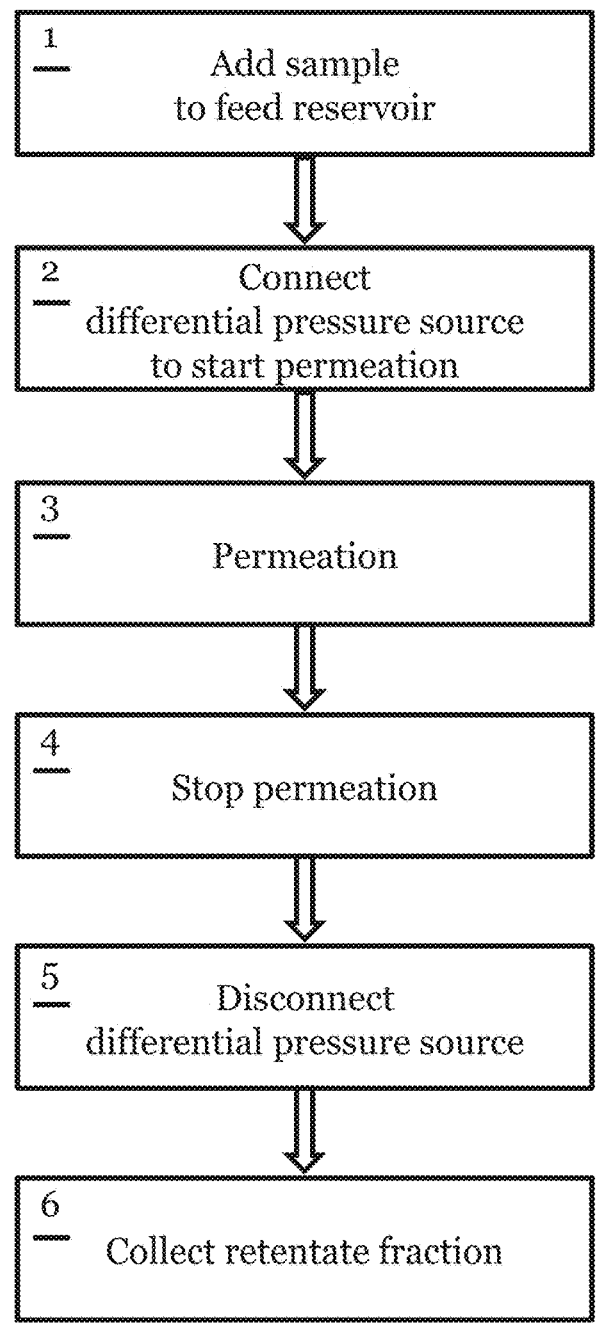
FIGS. 24-26 are flow diagrams of methods suitable for exemplary sample separation devices according to embodiments disclosed herein.
Figure 25:
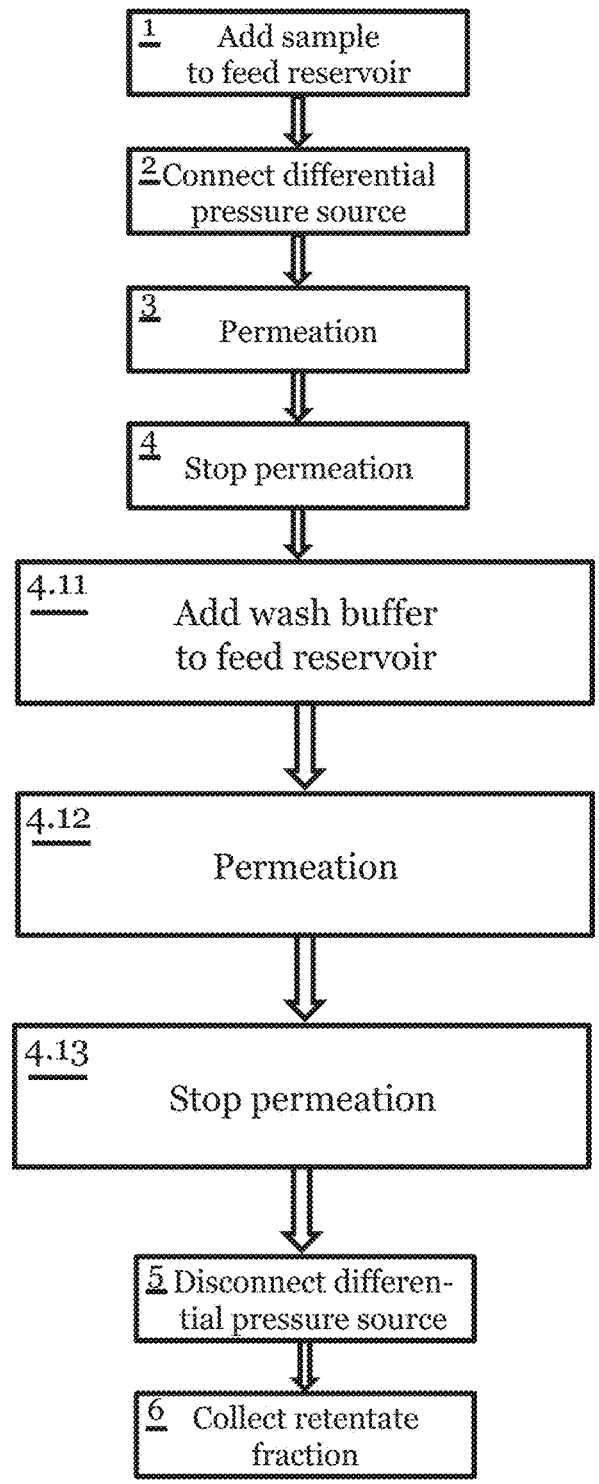
Figure 26:
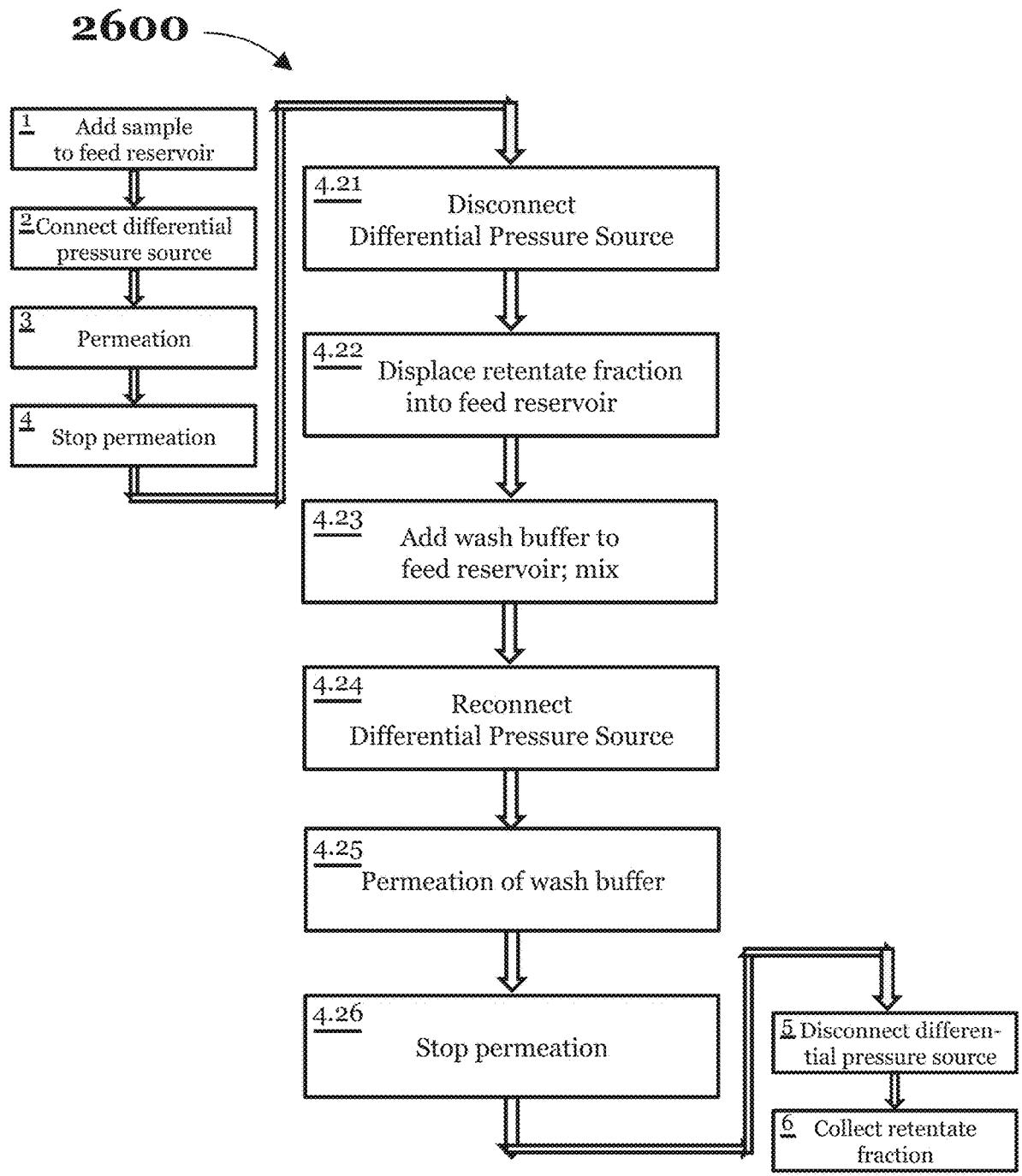

FIGS. 24-26 are flow diagrams of methods of some embodiments of this invention. Referring to FIG. 24, method 2400 proceeds as follows:

Step 1. Operator adds sample to feed reservoir.

Step 2. Operator connects differential pressure source to appropriate reservoir of device to start permeation. If a vacuum source, to the permeate reservoir; if a pressure source to the feed reservoir.

Step 3. Permeation proceeds without operator intervention.

Step 4. Permeation stops when feed reservoir is consumed. If a passive fluidic gate is included, then permeation stops spontaneously without operator intervention. If a manual valve is used as the fluidic gate, then operator must observe the feed reservoir and stop permeation when feed reservoir is consumed.

Step 5. Operator disconnects differential pressure source.

Step 6. Operator collects retentate fraction.

In some embodiments Steps 1 and 2 are reversed, wherein the operator connects the differential pressure source to the device before adding the sample to the feed reservoir. In other embodiments Steps 5 and 6 are reversed, wherein the operator collects the retentate fraction before disconnecting the differential pressure source from the device. In still other embodiments both Steps 1 and 2 and Steps 5 and 6 are reversed. In some embodiments optional washing steps may be added after the feed sample is consumed and permeation stops (Step 4).

Referring now to FIG. 25, method 2500 proceeds in these steps:

Steps 1 to 4. Similar to Steps 1 to 4 of method 2400 of FIG. 24.

Step 4.11. Add wash buffer to feed reservoir.

Step 4.12. Permeation of wash buffer proceeds without operator intervention.

Step 4.13. Permeation stops when feed reservoir is consumed. If a passive fluidic gate is disposed, then permeation stops spontaneously without operator intervention. If a manual valve is used as the fluidic gate, then the operator must observe the feed reservoir and stop permeation when feed reservoir is consumed.

Steps 5 to 6. Same as Steps 1 to 4 of method 2400 of FIG. 24.

In the same manner as method 2400 of FIG. 24, in some embodiments Steps 1 and 2 may be reversed; in still other embodiments Steps 5 and 6 may be reversed; and in still other embodiments both Steps 1 and 2 and Steps 5 and 6 are reversed.

In some embodiments optional washing steps may be added after the feed sample is consumed and permeation stops (Step 4). Referring now to FIG. 26, method 2600 proceeds in these steps:

Steps 1 to 4. Same as Steps 1 to 4 of method 2400 of FIG. 24.

Step 4.21. Disconnect differential pressure source from device.

Step 4.22. Displace retentate fraction into feed reservoir, by one of several alternative methods: injecting wash buffer into retentate port using a syringe; injecting permeate or wash buffer into permeate port using a syringe; injecting air into retentate port.

Step 4.23. Add wash buffer to feed reservoir.

Step 4.24. Reconnect differential pressure source to device.

Step 4.25. Permeation of wash buffer proceeds without operator intervention.

Step 4.26. Permeation stops when feed reservoir is consumed. If a passive fluidic gate is disposed, then permeation stops spontaneously without operator intervention. If a manual valve is used as the fluidic gate, then the operator must observe the feed reservoir to stop permeation when feed reservoir is consumed.

Steps 5 to 6. Same as Steps 1 to 4 of method 2400 of FIG. 24.

In the same manner as method 2400 of FIG. 24, in some embodiments Steps 1 and 2 may be reversed; in still other embodiments Steps 5 and 6 may be reversed; and in still other embodiments both Steps 1 and 2 and Steps 5 and 6 are reversed.

Figure 27A:
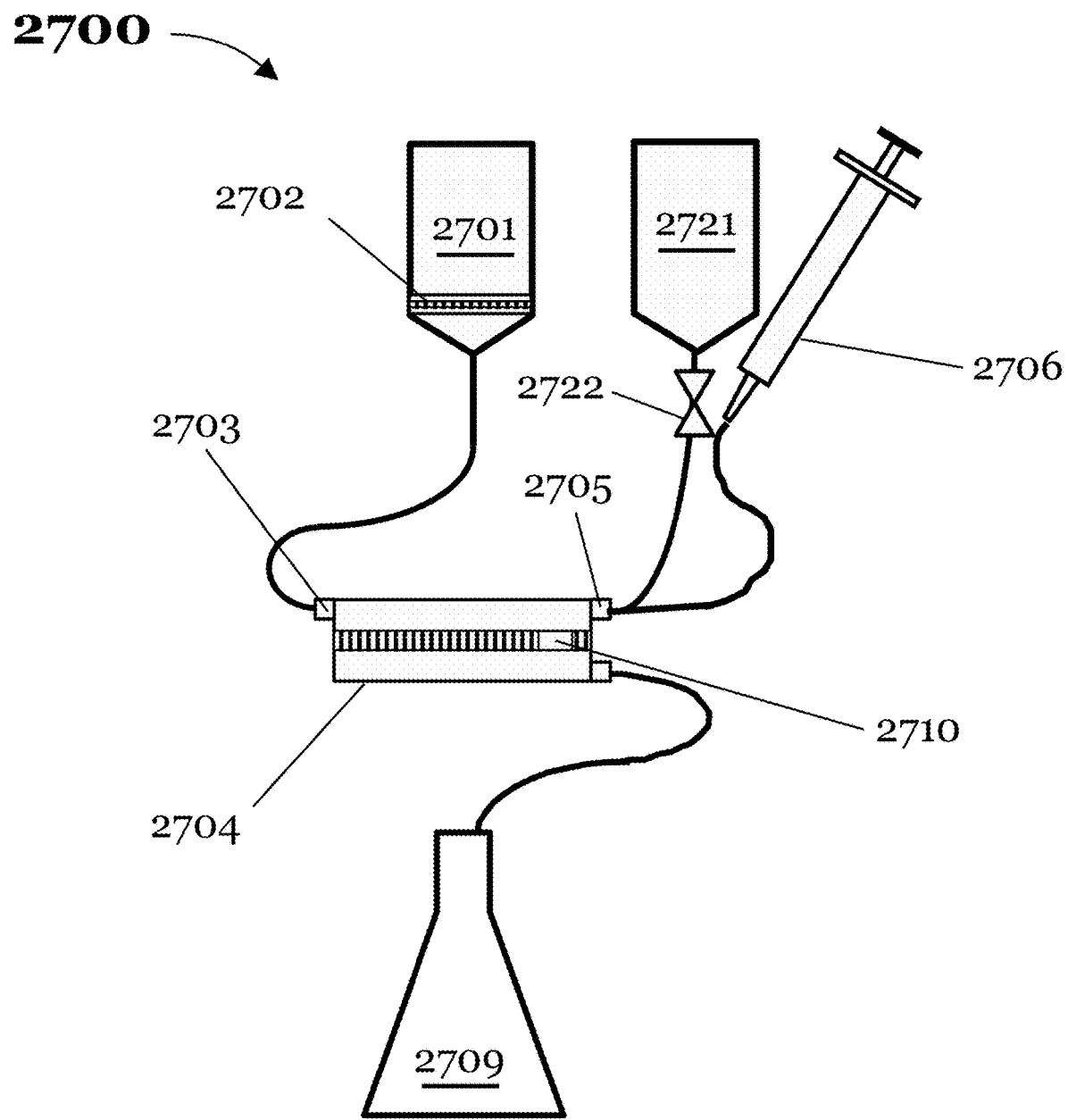
FIGS. 27A and 27B are schematic diagrams of exemplary sample separation devices suitable for in-situ washing of the retentate fraction according to embodiments disclosed herein.

In some applications, where washing of the retentate fraction is desired, it may be advantageous to add a second feed reservoir. Referring now to FIG. 27A, device 2700 is very similar to device 1600 of FIG. 16 having similar components as device 1600 including hydrophilic gate 2702, phobic vent 2710 etc., except for second feed reservoir 2721, which in this embodiment is connected to retentate port 2705, and second fluidic gate 2722 disposed between second fluidic reservoir 2721 and retentate port 2705. In use, the process proceeds similarly to that described earlier, except that after feed sample is consumed (and before disconnecting the pressure differential source, not shown) a first aliquot of wash buffer is added to second feed reservoir 2721. The permeate is collected into permeate reservoir 2709. The addition of wash buffer resumes permeation, washing the retentate fraction. When the wash buffer added to second feed reservoir 2721 is consumed, a second aliquot of wash buffer is added to first feed reservoir 2721. The operator can optionally add more than two aliquots of wash buffers, as long as the last aliquot is added to first feed reservoir 2701. In this method the retentate fraction is washed in situ. Embodiments having a philic gate may require some modifications to the method just described. In some embodiments more than two feed reservoirs may be provided, each connected to the separation module at a different location along the length of the retentate channels.

Figure 27B:
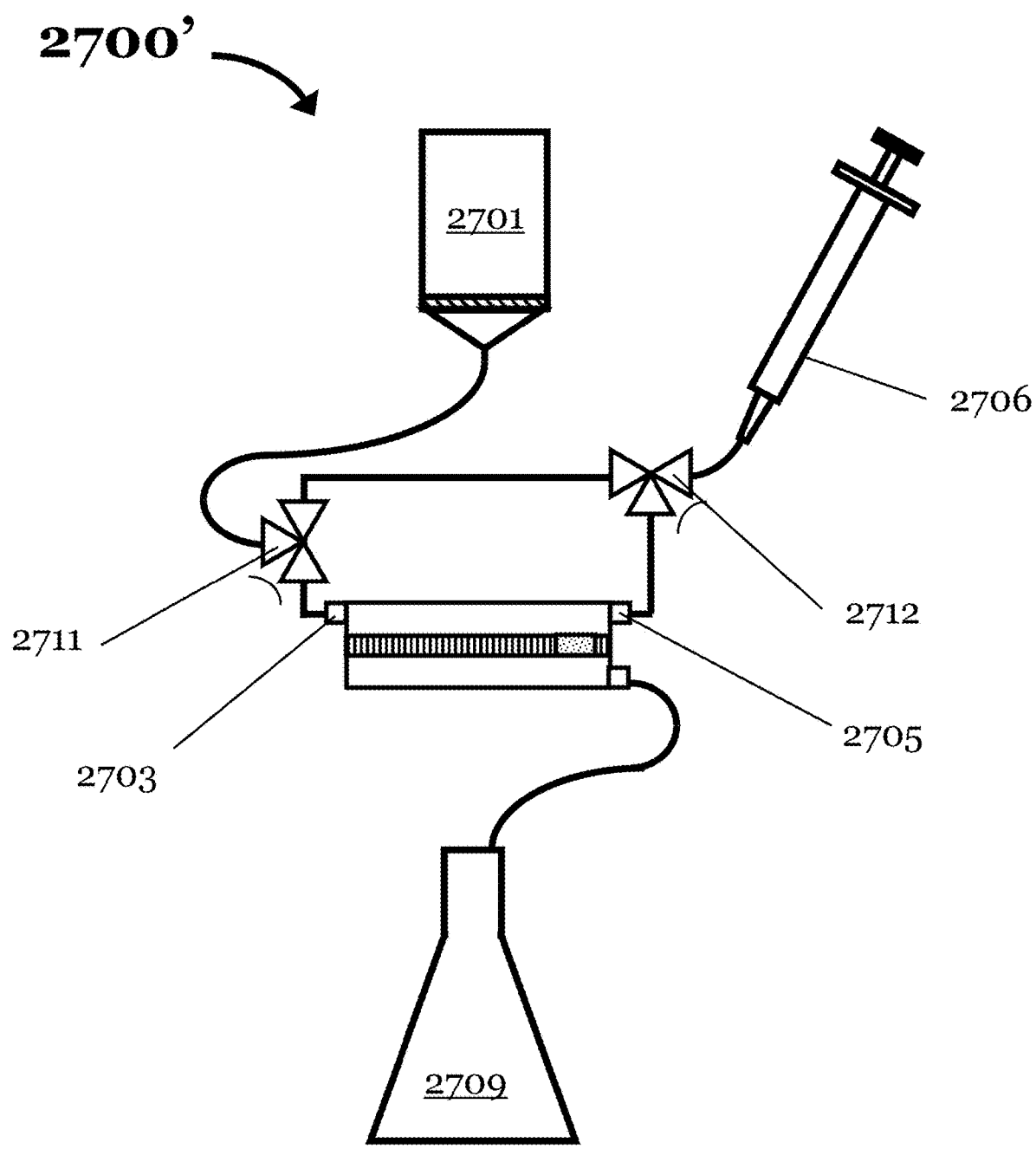

In some embodiments the same effect of having two reservoirs can be achieved with a single reservoir and additional valves. Referring now to FIG. 27B, device 2700' has a single feed reservoir 2701 in contrast to device 2700 of FIG. 27A. Device 2700' further includes 3-way valve 2711 disposed between the feed reservoir 2701 and feed port 2703, and 3-way valve 2712 disposed between the retentate collector 2706 and retentate port 2705. Valves 2711 and 2712 are also fluidically connected to each other, enabling the feed stream from feed reservoir 2701 to be diverted to retentate port 2705. The permeate is collected into permeate reservoir 2709. In use, a feed stream is added to feed reservoir 2701 with the 3-way valves in state A, the state shown in FIG. 27B (as shown by the indicator arc 2713); in state A, valve 2711 that directs the feed stream to feed port 2703, whereas valve 2712 connects the retentate collector to retentate port 2705. Once the feed stream is consumed and concentrated within the separation element, the user can manually switch the 3-way valves 2711 and 2712 to their respective alternative states and dispense a wash buffer to feed reservoir 2701, which is directs the buffer to retentate port 2705 and thereby effect a first washing step in "reverse." Alternatively the 3-way valves 2711 and 2712 can be switched automatically. Once the buffer is consumed, the user can switch the 3-way valves back to state A, dispense additional buffer into feed reservoir 2701 and effect an additional washing step "forward." Such washing steps can be repeated multiple times; of course, to obtain the highest recovery the last washing step should in "forward."

Figure 28:
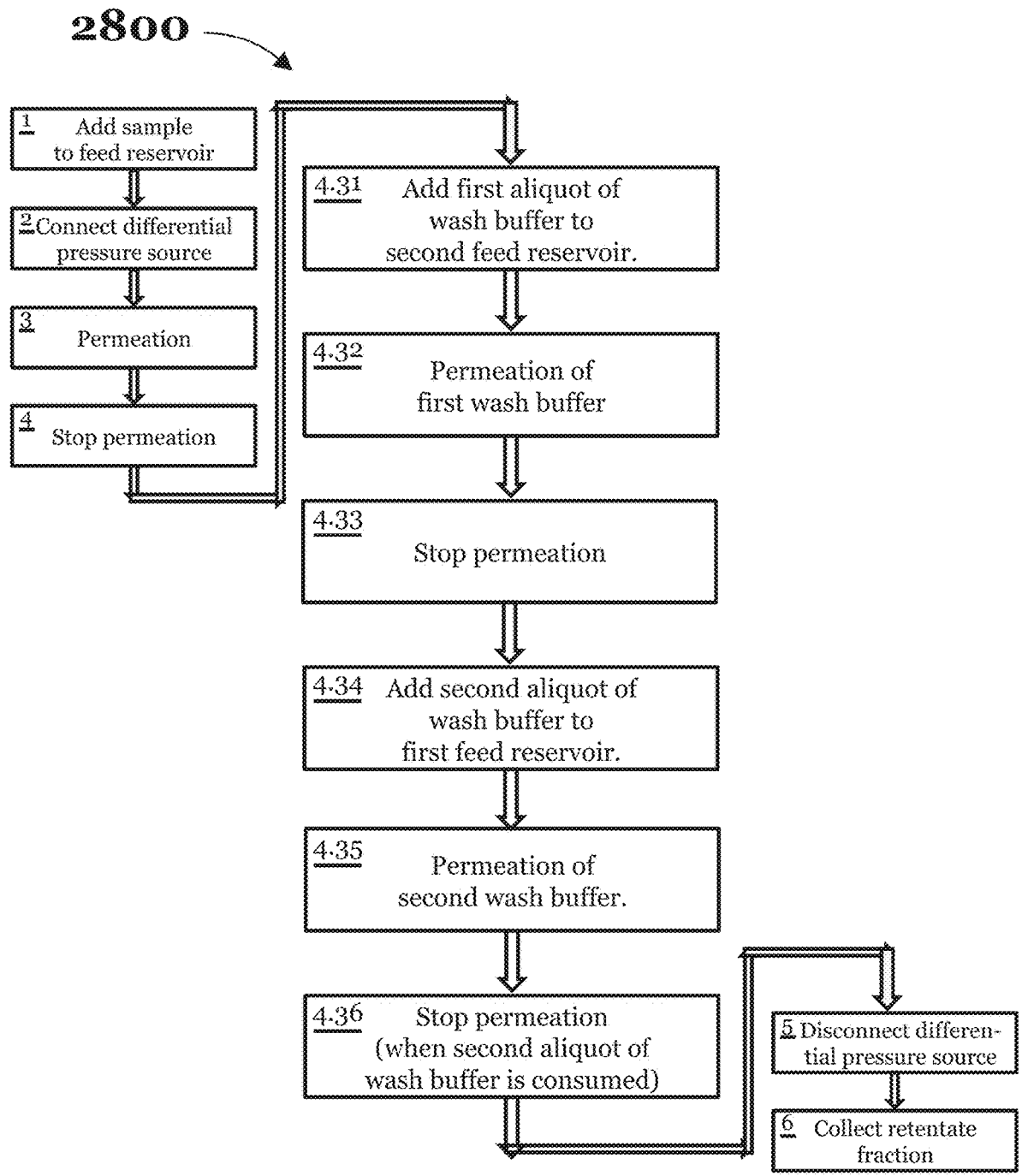
FIG. 28 is a flow diagram of methods suitable for washing using sample separation devices having two feed reservoirs according to embodiments disclosed herein.

In some embodiments optional washing steps may be added after the feed sample is consumed and permeation stops (Step 4), using device 2700 of FIG. 27A, having two feed reservoirs. Referring now to FIG. 28, method 2800 proceeds as follows:

Steps 1 to 4. Same as Steps 1 to 4 of method 2400 of FIG. 24.

Step 4.31. A first wash buffer aliquot is added to second feed reservoir.

Step 4.32. Permeation of first wash buffer aliquot proceeds without operator intervention.

Step 4.33. Permeation stops when first wash buffer aliquot is consumed. If a manual valve is used as the fluidic gate, then the operator must observe the feed reservoir to stop permeation when feed reservoir is consumed.

Step 3.34. A second wash buffer aliquot is added to first feed reservoir.

Step 4.33. Permeation of second wash buffer aliquot proceeds without operator intervention.

Step 4.33. Permeation stops when second wash buffer aliquot is consumed. If a manual valve is used as the fluidic gate, then the operator must observe the feed reservoir to stop permeation when feed reservoir is consumed.

Steps 5 to 6. Same as Steps 1 to 4 of method 2400 of FIG. 24.

In the same manner as method 2400 of FIG. 24, in some embodiments Steps 1 and 2 may be reversed; in still other embodiments Steps 5 and 6 may be reversed; and in still other embodiments both Steps 1 and 2 and Steps 5 and 6 are reversed.

Figure 29:
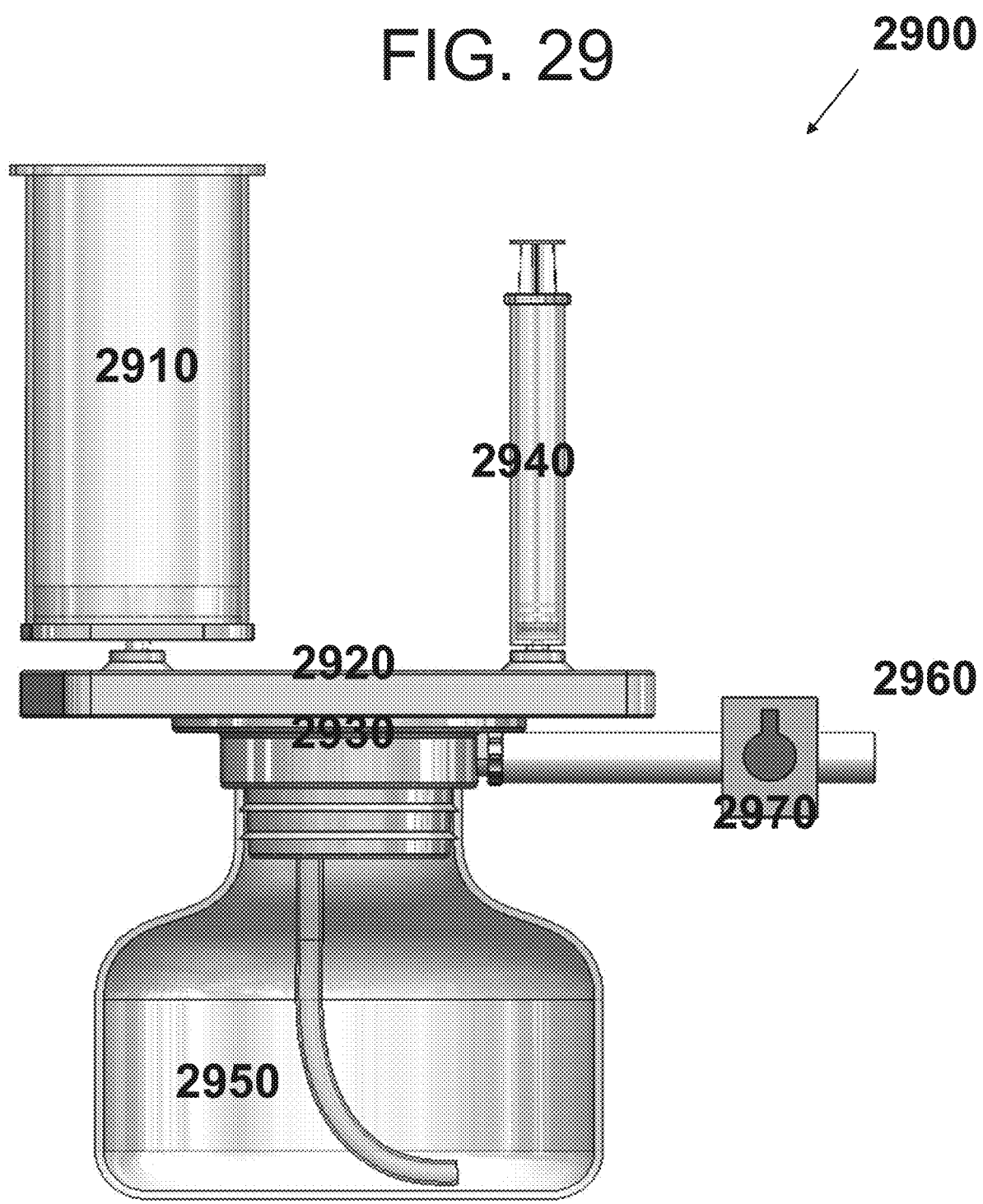
FIG. 29 is a schematic diagram of an exemplary VacuCon device according to embodiments disclosed herein.

Now referring to FIG. 29, separation device 2900 has a single-stack separation module with 60 $cm^2$ of membrane area capable of concentrating a 50-mL sample in about 10 minutes, a 100-mL sample in less than about 30 minutes, and a 200-mL sample in about 1 hour. Device 2900 includes:

Feed Reservoir 2910 including a philic gate, a hydrophilic microporous membrane filter as the bottom of the reservoir (not shown);

VacuCon Separation Module 2920;

Permeate Adaptor with Dip Tube 2930;

Syringe 2940 used to recover retentate fraction (i.e., concentrated sample);

Permeate reservoir 2950;

Vacuum port with tube 2960;

Vacuum On/Off Valve 2970; and

Optional wash reservoir (not shown).

Figure 30:
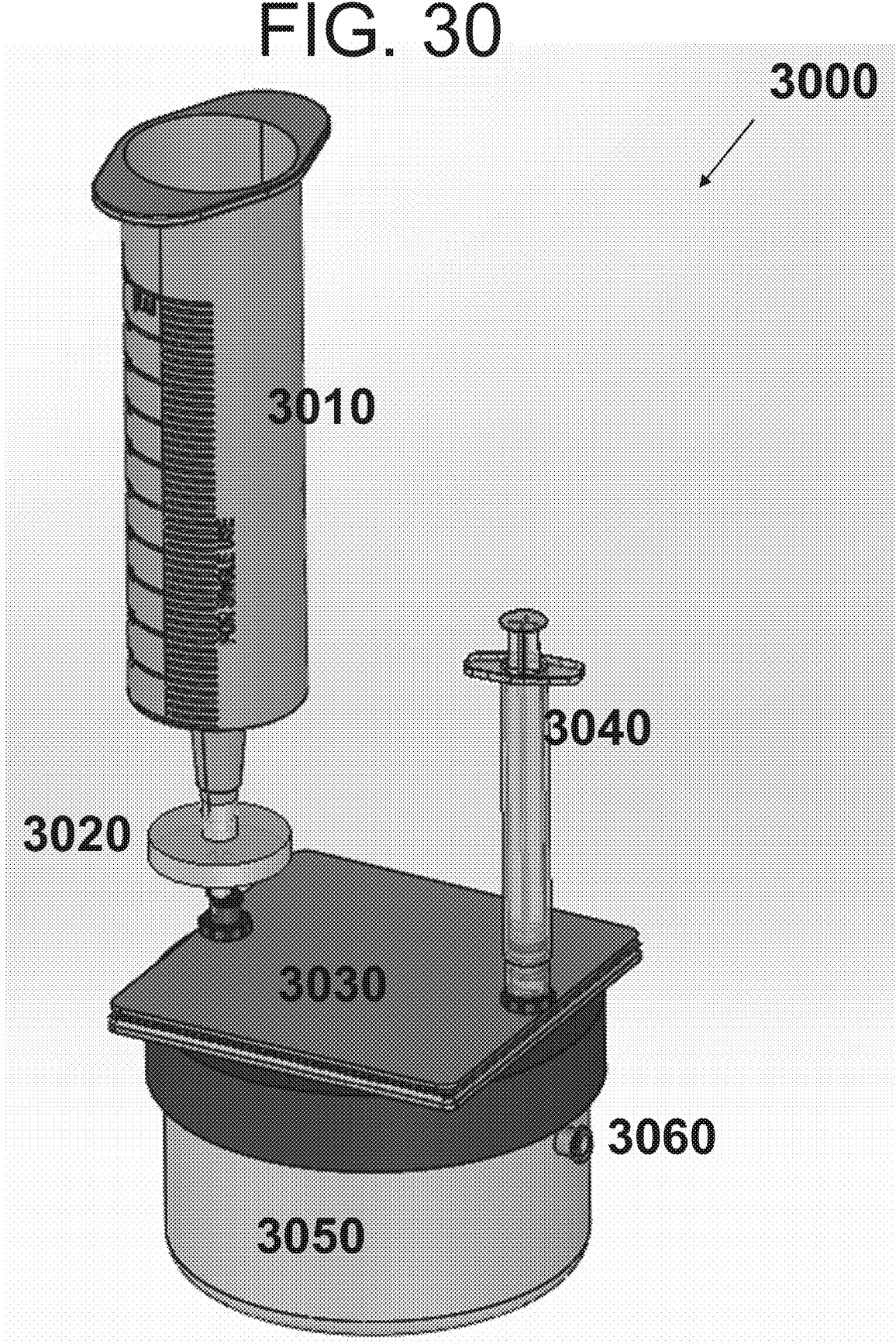
FIG. 30 is a schematic diagram of an exemplary VacuCon device according to embodiments disclosed herein.

Now referring to FIG. 30, another device 3000 includes

Feed Reservoir—a 100-ml syringe with luer lock 3010 (standard lab component).

PES syringe Filter (standard lab component)—a philic gate 3020 allows permeation to stop without operator intervention when feed sample is consumed.

The planar separation module 3030—a SP-TFF stack, similar to separation modules described above, which includes:
Retentate plate
Membrane
Internal PTFE hydrophobic membrane vent
Permeate plate
Feed and Retentate ports bonded to retentate plate (both luer connectors)
A single permeate port (on bottom bonded directly into container)

Retentate syringe 3040 (standard lab component)

Permeate reservoir 3050, a 250 ml screw top container (standard lab component)

Luer permeate port 3060 connection to vacuum source. Bonded to permeate reservoir.

The operation of device 3000 includes the following steps:
1. Add sample feed reservoir (3010).
2. Connect vacuum source to permeate port 3060. This induces a pressure differential that primes the retentate compartment and initiates permeation.
3. Permeation terminates without operator intervention when feed sample is consumed by virtue of philic gate 3020.
4. If desired, washing can be done by adding a wash buffer to feed reservoir. This immediately resumes permeation of the wash buffer. When wash buffer is consumed permeation terminates automatically by virtue of the philic gate.
5. Recover retentate fraction by pulling the contents of the retentate compartment with syringe 3040 attached to retentate port.
6. Permeate is collected in container (3050). The top can be unscrewed so the permeate may be disposed of (or recovered, if desired, or tested as appropriate).

Figure 31:
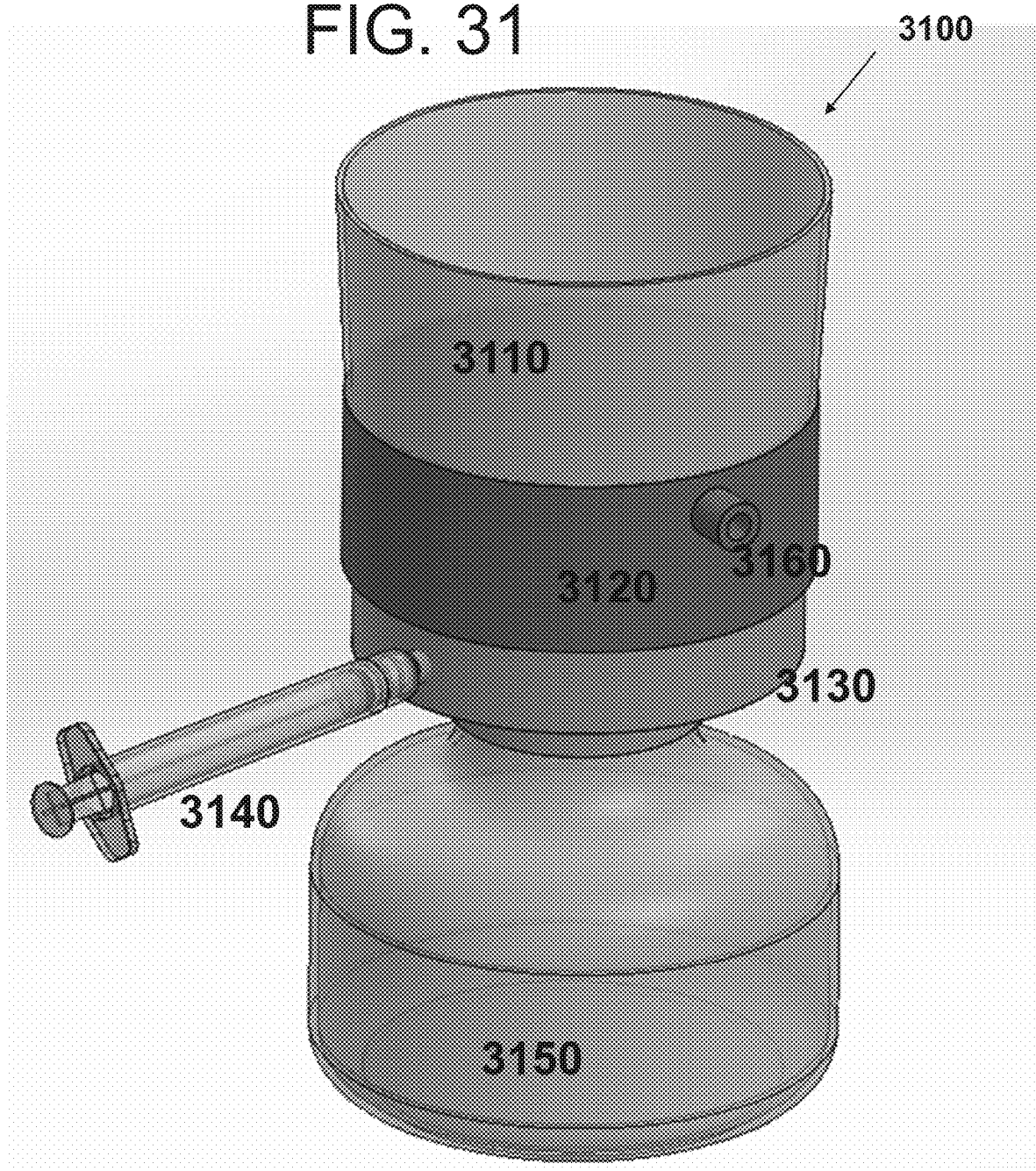
FIG. 31 is a schematic diagram of an exemplary VacuCon device according to embodiments disclosed herein.

Now referring to FIG. 31, another device 3100 includes
feed reservoir 3110;
A membrane assembly including MF filter 3120, which acts as philic gate (e.g., a Millipore Sigma Stericup®)'
The planar separation module, a SP-TFF stack separation module 3130, similar to separation modules described above, which includes:
Retentate plate;
Membrane;
Internal PTFE hydrophobic membrane as vent;
Permeate plate;
Threaded connections to Stericup cup;
Retentate port (luer connection);
Retentate syringe 3140 (standard lab component);
Permeate reservoir 3150, with threaded connector to Stericup cup; and
Connection to vacuum port 3160 (part of Stericup cup).

The operation of device 3100 includes the following steps:
1. Connect vacuum source to vacuum port 3160;
2. Load device by adding sample to feed reservoir 3110. Permeation is induced spontaneously by differential pressure differential induced within separation module 3130. Permeation terminates without operator intervention;
3. Disconnect vacuum source and recover retentate fraction with retentate syringe 3140; and
4. Permeate is collected in Permeate reservoir 3150 (here a container). The top can be unscrewed so the permeate may be disposed of (or tested for sample as appropriate).

Figure 32:
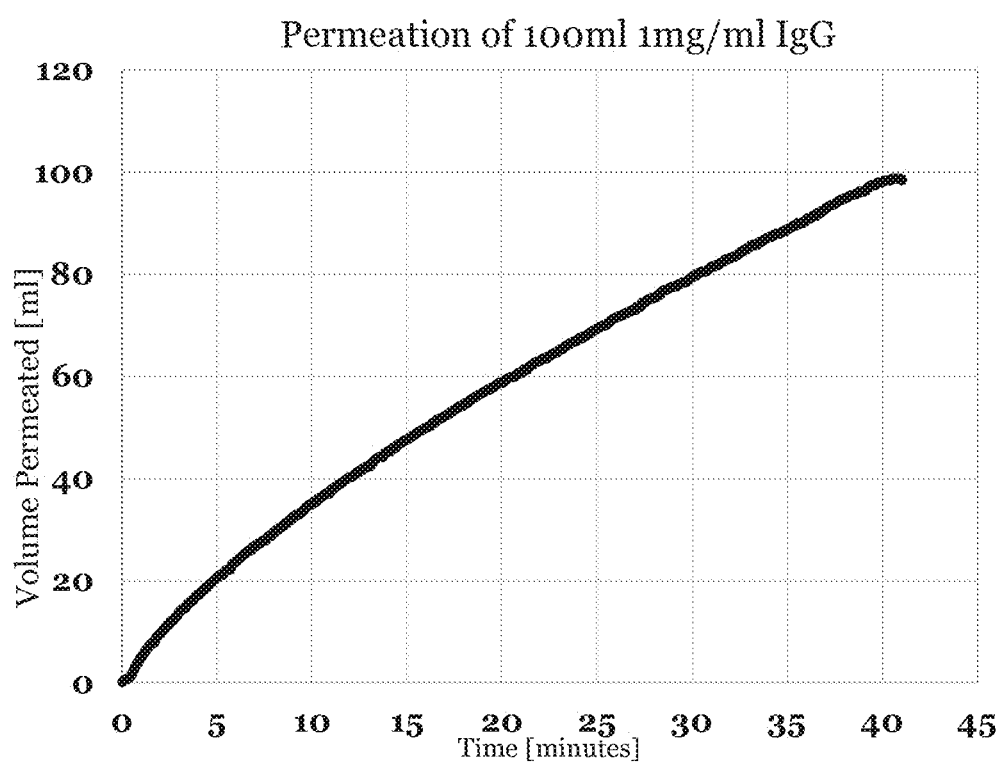
FIG. 32 is a graph of the performance of an exemplary VacuCon device according to embodiments disclosed herein.
Figure 33:
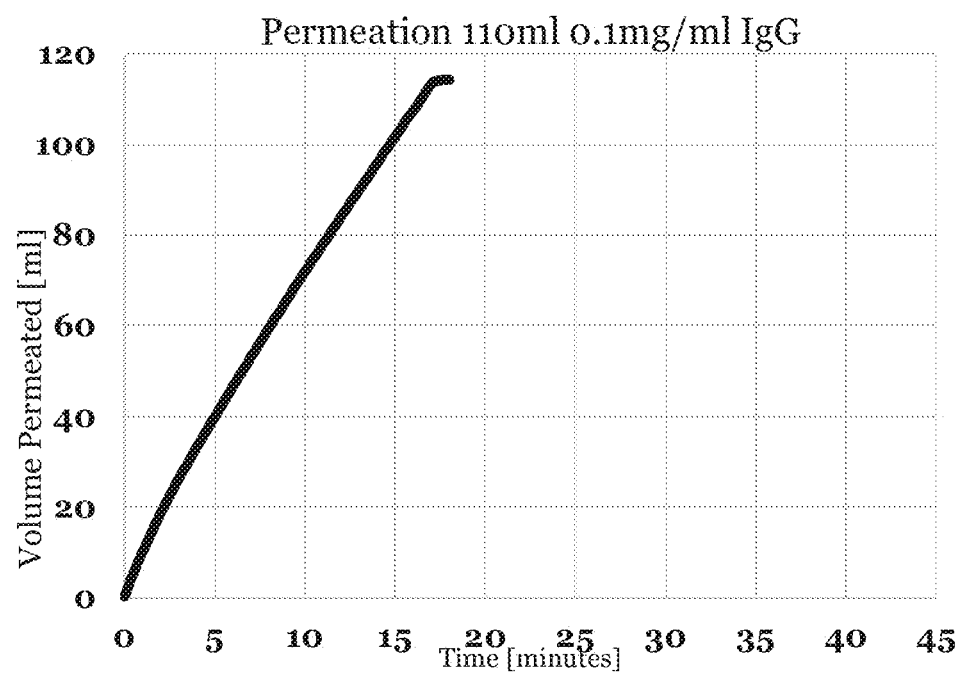
FIG. 33 is a graph of the performance of an exemplary VacuCon device according to embodiments disclosed herein.

Now referring now to FIGS. 32 and 33, these show in graphical form the volume permeated as a function of time for IgG samples being concentrated with a 60 $cm^2$ VacuCon concentrator connected to a conventional laboratory vacuum source. FIGS. 32 and 33 show the permeation curves for 100 mL feed samples having a protein concentration of 1 and 0.1 mg/mL IgG, respectively. At the lower feed concentration, the sample is consumed in less than 20 minutes, whereas at the higher concentration it takes slightly more than 40 minutes.

Figure 34:
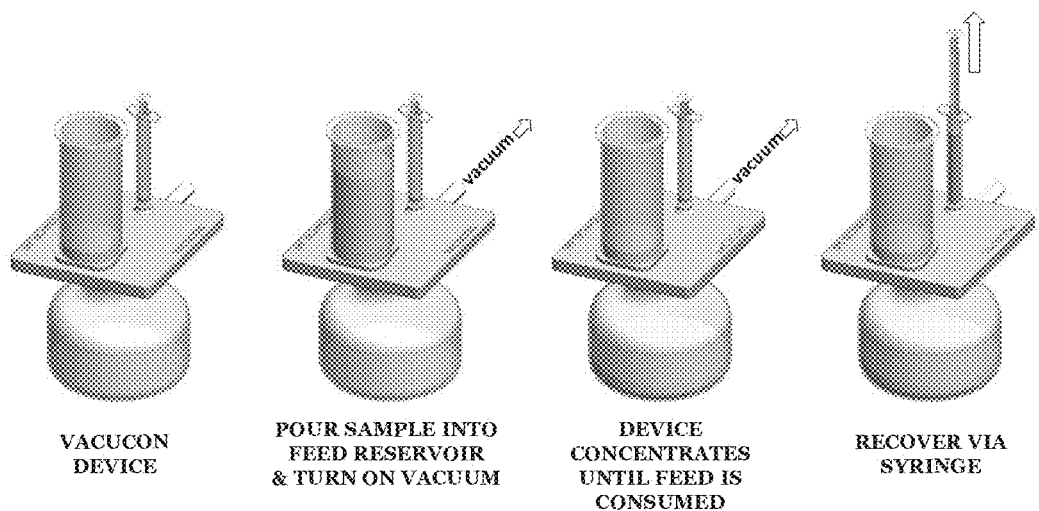
FIG. 34 is a schematic diagram of a method using an exemplary VacuCon device according to embodiments disclosed herein.

Referring now to FIGS. 34, is a schematic diagram of the steps in the sample concentration process operating with vacuum:
1. Pour feed sample into VacuCon concentrator and connect to vacuum source;
2. Permeation is induced and sample concentrates in retentate compartment; permeation stops automatically without operator intervention when feed sample is consumed;
3. Vacuum source is disconnected and retentate fraction is recovered with syringe. FIG. 34 illustrates how simple the concentration process is, in addition to being fast as shown in FIGS. 32 and 33.

Figure 35A:
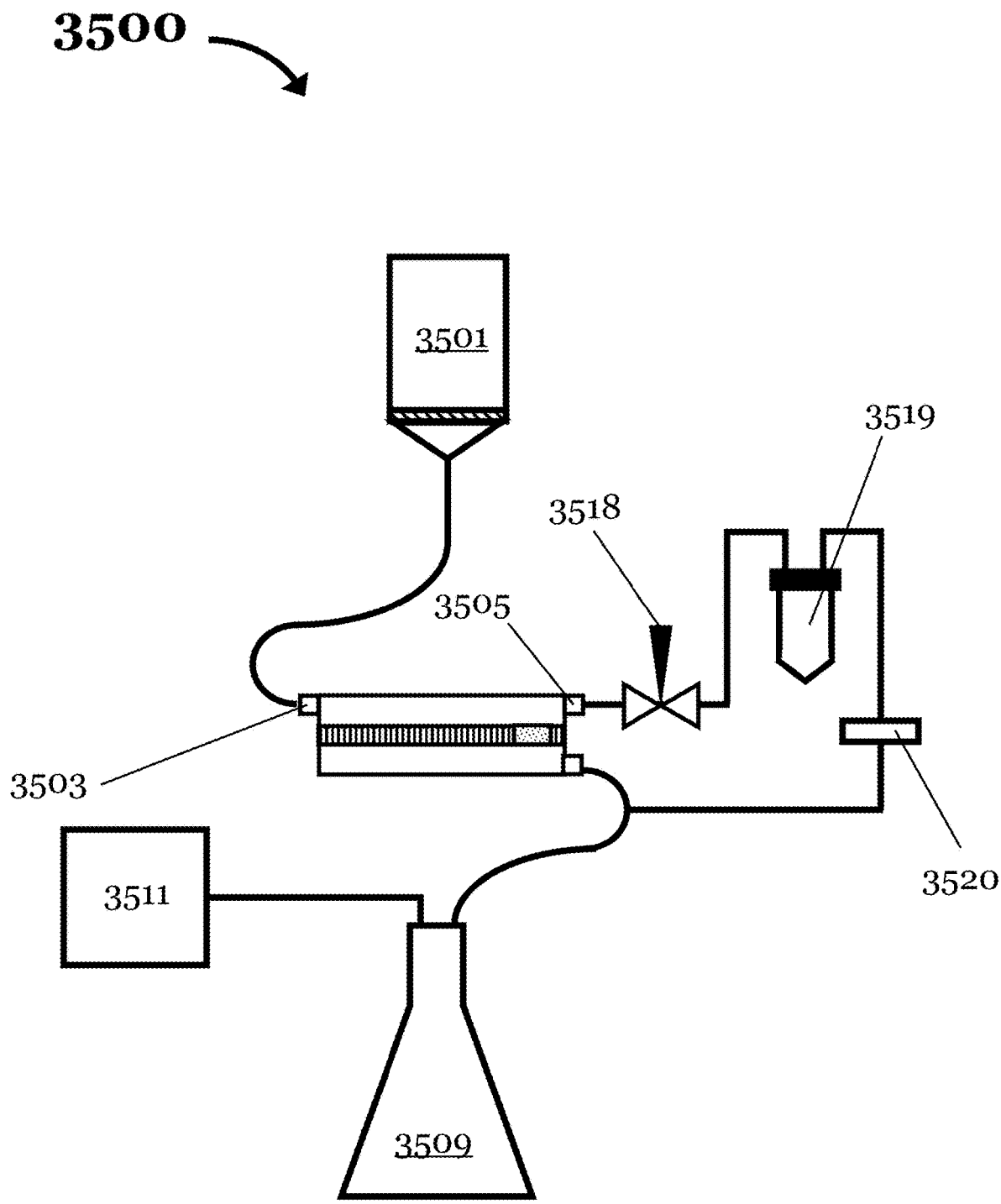
FIG. 35A is a schematic diagram of exemplary sample separation device similar to the device in FIG. 21 including a needle valve.
Figure 35B:
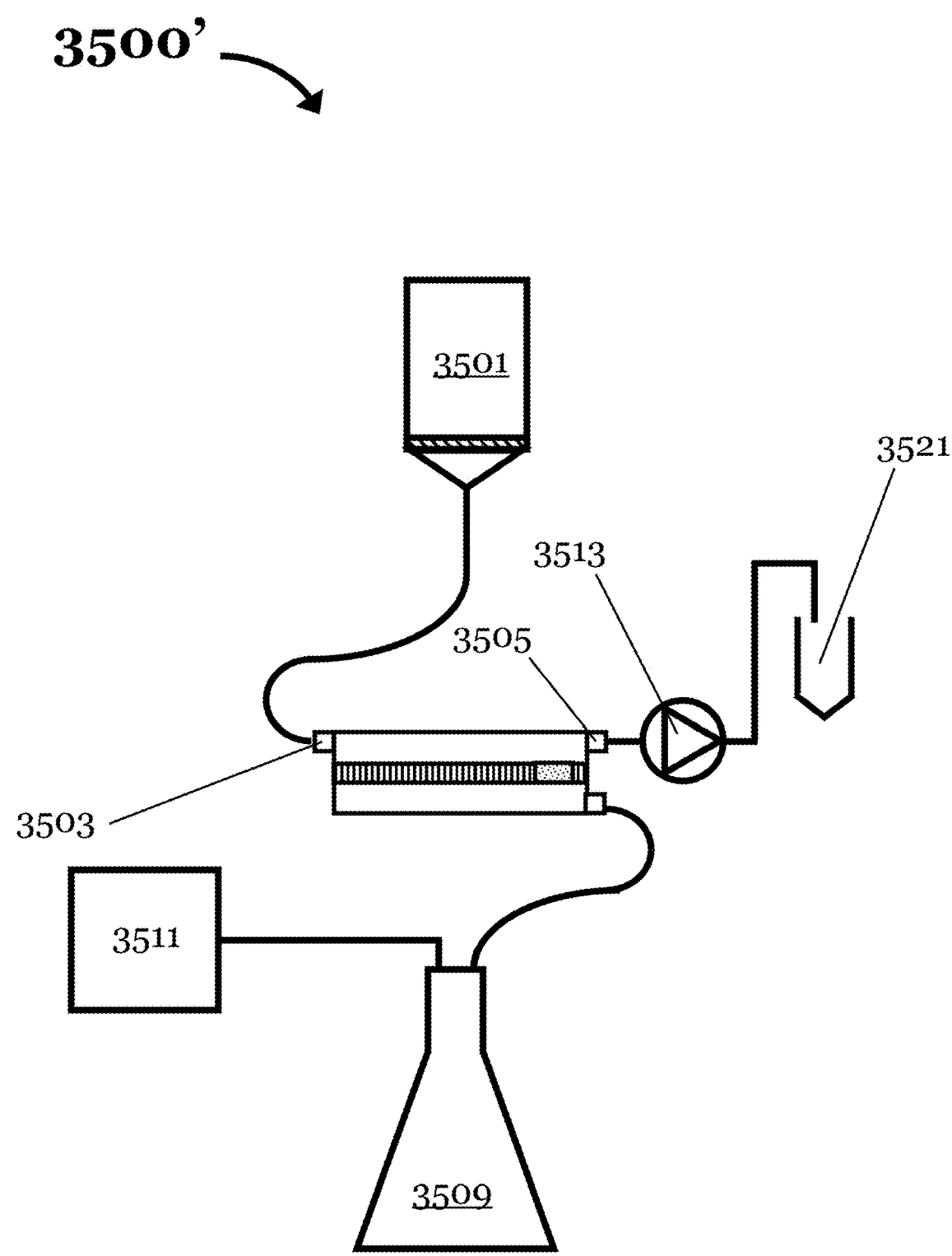
FIG. 35B is a schematic diagram of exemplary sample separation device similar to the device in FIG. 35A wherein the needle valve is replaced with a retentate pump.
Figure 35C:
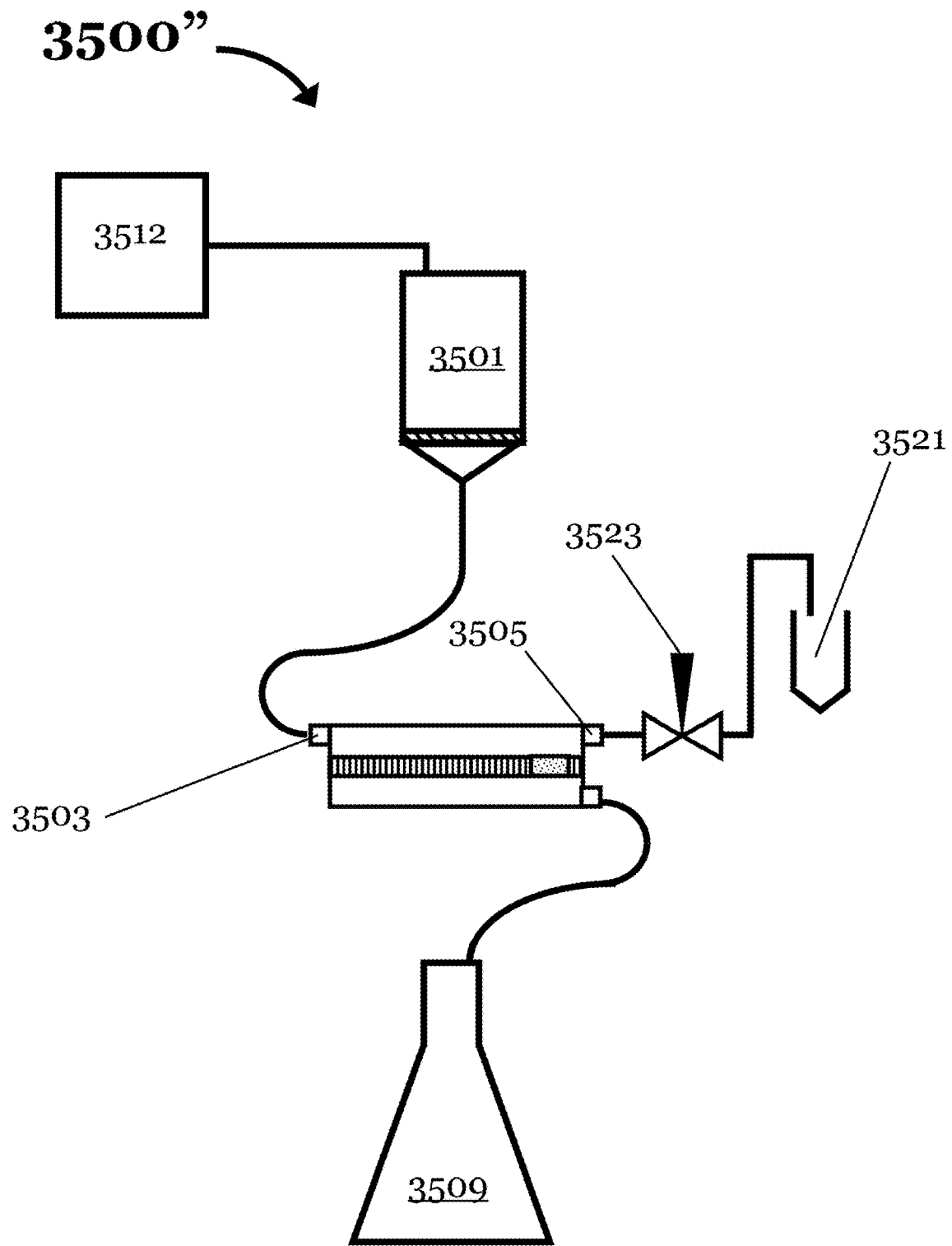
FIG. 35C is a schematic diagram of exemplary sample separation device similar to the device in FIG. 35A wherein the device is pressure-driven.

In some embodiments it is advantageous to collect the retentate fraction continuously instead of accumulating it within the separation module. FIGS. 35A, 35B and 35C are schematic diagrams of embodiments that collect the retentate fraction continuously.

Device 3500 of FIG. 35A is very similar to device 2100 of FIG. 21, differing only in that retentate valve 3518 of device 3500 is a needle valve (i.e., the retentate valve is an adjustable valve) capable of modulating the flow rate. In use, feed sample is dispensed into feed reservoir 3501 and vacuum source 3511 is connected. The vacuum induces permeation in the separation module; it also generates a vacuum in retentate reservoir 3519 through flooded phobic gate 3520. The user then adjusts retentate valve (here a needle valve) 3518 to obtain a desired retentate flow rate; if retentate flow rate is too high, then needle valve is adjusted to be less open; if retentate flow rate is too low, then needle valve is adjusted to be more open. Once needle valve 3518 is adjusted to the desired flow rate, user can walk away and allow device to operate unattended, the feed stream coming to a stop when the feed reservoir 3501 becomes empty by virtue of the philic gate. Flooded phobic gate 3520 prevents the retentate fraction from flowing into the permeate reservoir in the event that retentate reservoir 3519 becomes full; flooded phobic gate also prevents the permeate fraction from flowing into the retentate reservoir 3519 when the vacuum is released in permeate reservoir 3509 at the end of the run.

Device 3500" of FIG. 35B is similar to device 3500 of FIG. 35A, except that the needle valve is replaced with retentate pump 3513 capable of pumping with a vacuum upstream of the pump. In this embodiment there is no need for the retentate reservoir 3521 to be under vacuum, therefore, there is no need for a flooded phobic gate. In use, feed sample is dispensed into feed reservoir 3501, vacuum source 3511 is connected and pump 3513 is turned ON. The vacuum induces permeation in the separation module and the user adjusts the pump speed to get the desired retentate flow rate. In this embodiment the user needs to remain attentive of when the feed reservoir empties to turn OFF retentate pump 3513, otherwise retentate pump 3513 may start to induce reverse permeation within the separation module and dilute the collected retentate fraction with permeate. In some embodiments sensors may be added to detect the emptying of feed reservoir 3501 in order to turn off the retentate pump 3513 automatically, enabling the user to walk away.

Device 3500" of FIG. 35C is similar to device 3500 of FIG. 35A, except that device 3500" is pressure-driven instead of vacuum-driven. Referring to FIG. 35C, pressure source 3512 is connected to feed reservoir 3501, inducing permeation and retentate flow through retentate port 3505, modulated by needle valve 3523 and collected in retentate reservoir 3521, at atmospheric pressure. In use, feed sample is dispensed into feed reservoir 3501, then closed, and pressure source 3512 is connected to feed reservoir 3501. User then adjusts needle valve 3523 to get desired retentate flow rate, at which point user can walk away. Permeation stops automatically when feed reservoir empties, and therefore, does not require user attention.

Figure 35D:
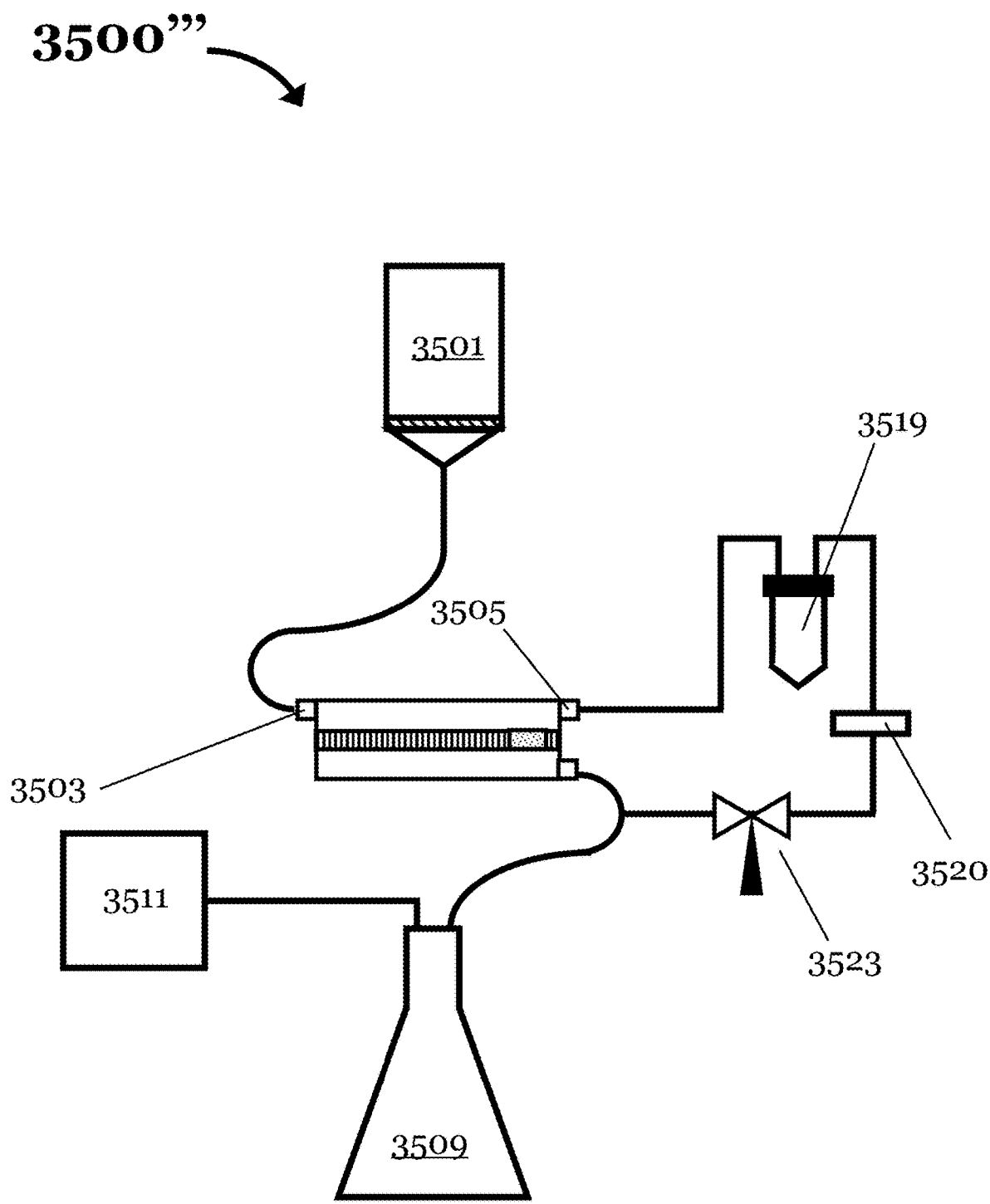
FIG. 35D is a schematic diagram of exemplary sample separation device similar to the device in FIG. 35A further including a valve to regulate the vacuum.

Device 3500"" of FIG. 35D is similar to device 3500 of FIG. 35A, except that valve 3523 is regulating the vacuum present at 3519 and 3520 such that it is less extreme then 3509. This embodiment includes a retentate vial; a flooded phobic vent disposed between the retentate vial and the permeate port; and the vacuum modulating valve 3523 disposed between the retentate vial and the vacuum source. This allows regulation of the differential pressure between 3503 and 3505. The regulation controls the rate of flow into retentate reservoir 3519.

In still other embodiments two pumps can be used, one on the feed stream and one on the retentate stream. In such embodiments there is no need for a vacuum source or a pressure source. It is advantageous to operate the two pumps with flow ratio control to control the concentration factor.

In some embodiments it is advantageous to add a prefilter to the feed reservoir upstream of the philic gate to prevent premature clogging of the philic gate. In some applications it may be advantageous to feed the clarified or the raw contents of a bioreactor. In such cases the prefilters are valuable to enable the effective removal of the biomass and other colloidal material that would clog the philic gate. In such embodiments it is advantageous for the prefilters to stack immediately above the philic gate to prevent the formation of an air pocket that could lead to air locking of the philic gate.

In still other embodiments the devices of this invention may include a reusable hardware with replaceable filters. Such reusable devices reduce the plastic waste while delivering the same benefits and performance of devices having all the elements integrated in consumable form. The replaceable elements in such devices could be the ultrafiltration membrane (e.g., a replaceable separation membrane), a replaceable phobic gate/vent, the ultrafiltration membrane with a replaceable phobic vent integrated into it, the philic gate, the retentate collector, or combinations thereof. Such devices need to be designed to enable easy and reliable cleaning of the reusable hardware, as well as insertion of the replaceable elements.

TABLE 1

CONCENTRATION EXPERIMENTS

| Protein | Feed Sample Concentration [mg/ml] | Feed Sample Volume [ml] | Retentate Volume Collected [ml] | Protein Fraction Recovered [%] | Volumetric Concentration Factor [ ] ("Recovery") |
|---|---|---|---|---|---|
| BSA | 1.00 | 33.9 | 1.12 | 86% | 30 |
| BSA | 1.00 | 50.4 | 1.14 | 88% | 44 |
| IGG | .01 | 107 | 1.12 | 94% | 95 |
| IGG | 1.00 | 52.6 | 1.10 | 85% | 48 |
| IGG | 1.00 | 97.8 | 1.14 | 80% | 86 |

Table 1 is a summary of exemplary concentration experiments with different protein samples of different volumes at different concentrations using the 60 cm2 VacuCon concentrator 2900 of FIG. 29. Concentration factors between 30- and 95-fold were obtained with samples of 30-100 mL, with protein recovery exceeding in all cases 80%, and in some tests as high as 94%. This is unparalleled performance of such samples, especially when one considers the simplicity and speed of the operation.

While the descriptions given have focused on the use of the invention for the recovery of retentate or permeate from a fluid, it is understood that these embodiments also are applicable to processes using microfiltration or ultrafiltration membranes used to separate molecular and cellular components in solution.

It is understood that although the embodiments described herein relate specifically to separations of interest in biomolecular applications, the principles, practice and designs described herein are also useful in other applications, including but not limited to the manufacture of vaccines and other macromolecules not necessarily of a biological nature.

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way. The descriptions and diagrams of the methods described herein can be performed in any suitable order unless otherwise indicated herein or otherwise clearly contradicted by context.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. What is claimed is:

The invention claimed is:

1. A separation device comprising:
    a separation module comprising:
        a separation membrane separating an interior of the separation module into a retentate compartment and a permeate compartment;
        the retentate compartment includes:
            at least one retentate channel disposed within the retentate compartment;
            a feed port fluidly coupled to the at least one retentate channel and disposed adjacent a first end of the retentate compartment; and
            a retentate port fluidly coupled to the at least one retentate channel, disposed opposite the first end and disposed adjacent a second end of the retentate compartment;
        the permeate compartment includes:
            at least one permeate channel disposed within the permeate compartment;
            a permeate port fluidly coupled to the at least one permeate channel;
    a retentate collector fluidly connected to the retentate port;
    a feed reservoir fluidly coupled to the feed port;
    a permeate reservoir fluidly coupled to the permeate port;
    a fluidic gate disposed between the feed reservoir and the separation module;
    a vent disposed adjacent the retentate port and adjacent the second end of the at least one retentate channel;
    wherein the vent is a flooded phobic vent and is disposed in one of:
        the separation module between the retentate compartment and the permeate compartment; and
        outside the separation module coupled between the retentate port and the permeate port; and
    a pressure differential source applied across the separation module.

2. The separation device of claim 1
    wherein the fluidic gate is a hydrophilic gate and is disposed in one of:
        at a bottom of the feed reservoir; and
        outside the feed reservoir disposed between feed reservoir and the feed port;
    wherein the retentate collector is one of
        a syringe; and
        a retentate vial; and
        wherein the pressure differential source is one of:
            a vacuum source coupled to the permeate reservoir; and
            a pressure source coupled to the feed reservoir.

3. The separation device of claim 1 wherein the flooded phobic vent is integrated into the separation membrane.

4. The separation device of claim 1 wherein the retentate collector comprises:
    a retentate vial;
    a flooded phobic gate disposed between the retentate vial and the permeate port; and
    one of:
        a retentate valve disposed between the retentate port and the retentate vial; and
        a vacuum modulating valve disposed between the retentate vial and the vacuum source.

5. The separation device of claim 4 wherein the retentate valve is an adjustable needle valve for modulating the flow rate.

6. The separation device of claim 2 further comprising:
a second feed reservoir fluidly connected to the retentate port; and
a retentate valve disposed between the retentate port and the second feed reservoir.

7. The separation device of claim 2 further comprising first and second 3-way valves wherein;
the first 3-way valve is fluidly connected to the feed reservoir, to the feed port and to the second 3-way valve; and
the second 3-way valve is fluidly connected to the retentate collector, to the retentate port and to the first 3-way valve.

8. The separation device of claim 2 wherein the retentate collector comprises:
a retentate vial; and
a retentate pump disposed between the retentate port and the retentate vial.

9. The separation device of claim 1 wherein the retentate compartment further comprises a grooved plate disposed adjacent the separation membrane and wherein the at least one retentate channel formed by the grooved plate has a depth dimension of about 0.15 millimeter to about one millimeter.

10. The separation device of claim 1 wherein the separation module accepts at least one of a replaceable separation membrane and a replaceable philic gate.

11. The separation device of claim 10 wherein the vent is a replaceable phobic vent coupled to the replaceable separation membrane.

12. A separation device comprising:
a separation element comprising:
a plurality of membrane stacks, each membrane stack comprising:
a first planar sheet having a first inner surface and a first plurality of grooves embedded in said first inner surface forming a first plurality of ribs each rib having a pair of sidewalls and an end;
a second planar sheet having a second inner surface and a second plurality of grooves embedded in said second inner surface forming a second plurality of ribs with the second inner surface, each rib having a pair of sidewalls and an end;
a planar membrane disposed between the first and second inner surfaces and having a first surface, a second surface and a sidewall;
at least one retentate channel formed by a portion of the first inner surface, sidewalls of two different ones of the first plurality of ribs and a portion of the planar membrane disposed between the first plurality of ribs,
at least one permeate channel formed by a portion of the second inner surface, sidewalls of two different ones of the second plurality of ribs and a portion of the planar membrane disposed between the second plurality of ribs;
a first peripheral seal disposed between the first planar sheet and the second planar sheet and surrounding the planar membrane by enclosing a planar membrane sidewall;
a second peripheral seal disposed between the planar membrane and at least one of the first inner surface and the second inner surface;
a feed inlet passageway fluidly coupled to a first end of the at least one retentate channel;
at least one permeate outlet passageway fluidly coupled to the at least one permeate channel; and
a feed manifold fluidly coupled to the feed inlet passageway of each of the plurality of the membrane stacks.

13. The separation device of claim 12 further comprising:
at least one permeate port in fluid communication with the at least one permeate outlet passageway;
a feed port in fluid communication with the feed inlet passageway; and
a retentate port in fluid communication with a retentate outlet passageway.

14. The separation device of claim 13, wherein the feed port and the retentate port are disposed in the first planar sheet; and
wherein the at least one permeate port is disposed in the second planar sheet.

15. The separation device of claim 14, further comprising a vacuum source and wherein the first planar sheet and the second planar sheet allow intimate contact of the planar membrane to the first and second planar sheets by hydrostatic forces induced by the vacuum source.

16. The separation device of claim 14, wherein the first planar sheet, the second planar sheet and planar membrane are laminated together, a lamination forming the first and second peripheral seals.

17. The separation device of claim 13, wherein the at least one retentate state channel further comprises a staged array of retentate channels comprising a plurality of stages, each stage comprising at least one retentate channel segment, thereby serializing retentate flow through the separation element.

18. The separation device of claim 17, wherein the at least one retentate channel segment is a converging channel.

19. The separation device of claim 12 wherein at least one of the plurality of membrane stacks comprises a double sided membrane stack.

* * * * *